(12) United States Patent
Urushihara et al.

(10) Patent No.: US 7,609,593 B2
(45) Date of Patent: Oct. 27, 2009

(54) DISC DRIVE APPARATUS

(75) Inventors: Kenji Urushihara, Yokohama (JP); Yuji Yamaguchi, Naka-gun (JP); Yoshihiko Maeda, Ayase (JP); Hiroto Nishida, Kahoku-gun (JP)

(73) Assignee: Panasonic Corporation, Osaka (JP)

( * ) Notice: Subject to any disclaimer, the term of this patent is extended or adjusted under 35 U.S.C. 154(b) by 670 days.

(21) Appl. No.: 10/855,655

(22) Filed: May 27, 2004

(65) Prior Publication Data

US 2005/0088922 A1    Apr. 28, 2005

(30) Foreign Application Priority Data

Oct. 28, 2003    (JP) ................. P.2003-367482

(51) Int. Cl.
*G11B 7/085* (2006.01)
(52) U.S. Cl. .................................................. 369/30.27
(58) Field of Classification Search ................ 720/626, 720/619, 616, 615
See application file for complete search history.

(56) References Cited

U.S. PATENT DOCUMENTS

| | | | | |
|---|---|---|---|---|
| 4,695,995 A | * | 9/1987 | Koizumi | 720/606 |
| 4,995,027 A | * | 2/1991 | Aoyagi et al. | 720/626 |
| 5,150,349 A | * | 9/1992 | Takai et al. | 720/626 |
| 5,828,641 A | * | 10/1998 | Abe et al. | 720/645 |
| 6,256,280 B1 | * | 7/2001 | Sakurai et al. | 720/620 |
| 6,288,982 B1 | * | 9/2001 | Kato | 369/30.36 |
| 6,574,171 B1 | * | 6/2003 | Furukawa et al. | 369/30.36 |
| 2004/0008602 A1 | * | 1/2004 | Suzuki | 369/77.1 |

FOREIGN PATENT DOCUMENTS

| | | |
|---|---|---|
| JP | 2-118955 A | 5/1990 |
| JP | 8-297907 A | 11/1996 |
| JP | 11-134760 | 5/1999 |
| JP | 2000-149367 | 5/2000 |
| JP | 2000-149367 A | 5/2000 |
| JP | 2000-163840 | 6/2000 |
| JP | 2000163840 A * | 6/2000 |
| JP | 2001-101746 A | 4/2001 |
| JP | 2001-209997 A | 8/2001 |
| JP | 2001-319403 | 11/2001 |
| JP | 2003-248995 | 9/2003 |

OTHER PUBLICATIONS

JP 2000-163840, English translation, Jul. 17, 2005, pp. 1-5.*
Japanese language Search Report for JP 2002-044195.

* cited by examiner

*Primary Examiner*—Joseph H Feild
*Assistant Examiner*—Henok G Heyi
(74) *Attorney, Agent, or Firm*—RatnerPrestia

(57) ABSTRACT

The present invention provides a disc drive apparatus capable of identifying a disc (12 cm) having a small data area (8 cm) in central as same as an ordinary 12 cm disc. The apparatus having a light receiving unit 105b and a push switch 106b. The unit 105b is arranged in a position where the unit 105b detects the disc having the small data area in central when the switch 106b detects the same, and where the unit 105b does not detect a disc (12 cm) having a hole (8 cm) in central when the 106b detects the same. The apparatus also has an disc identifier for identifying type of the disc based on the detected results of the light receiving units and/or the push switches.

12 Claims, 45 Drawing Sheets

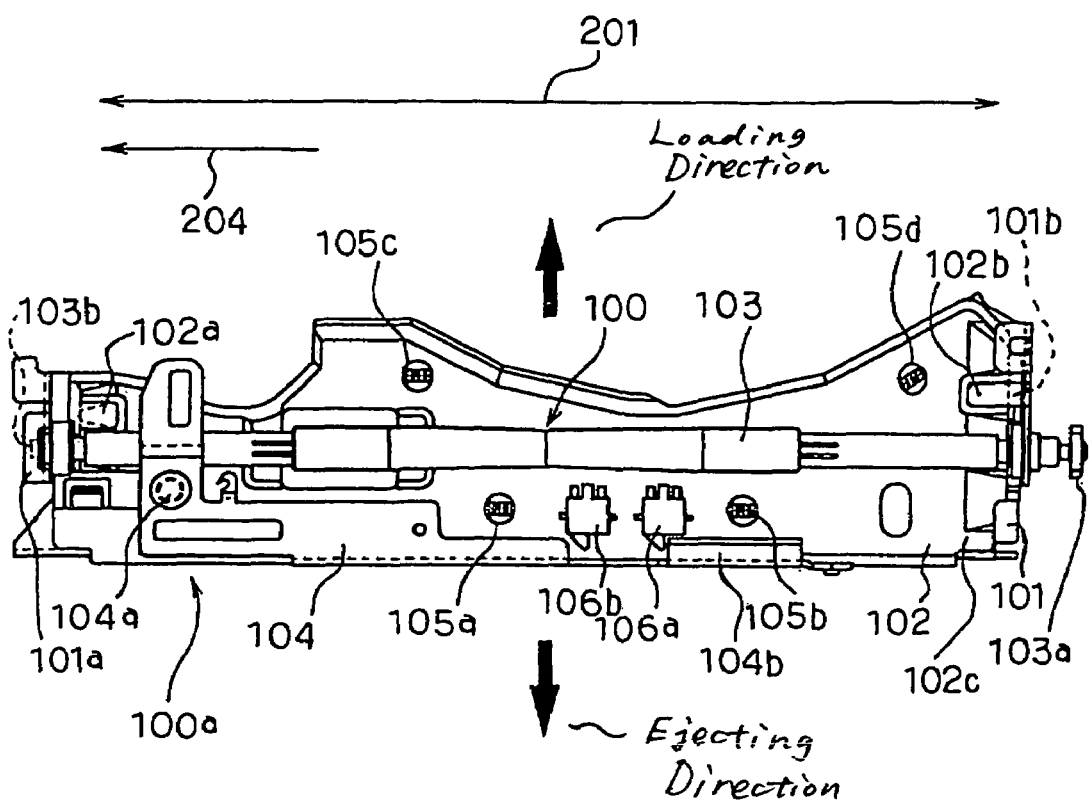

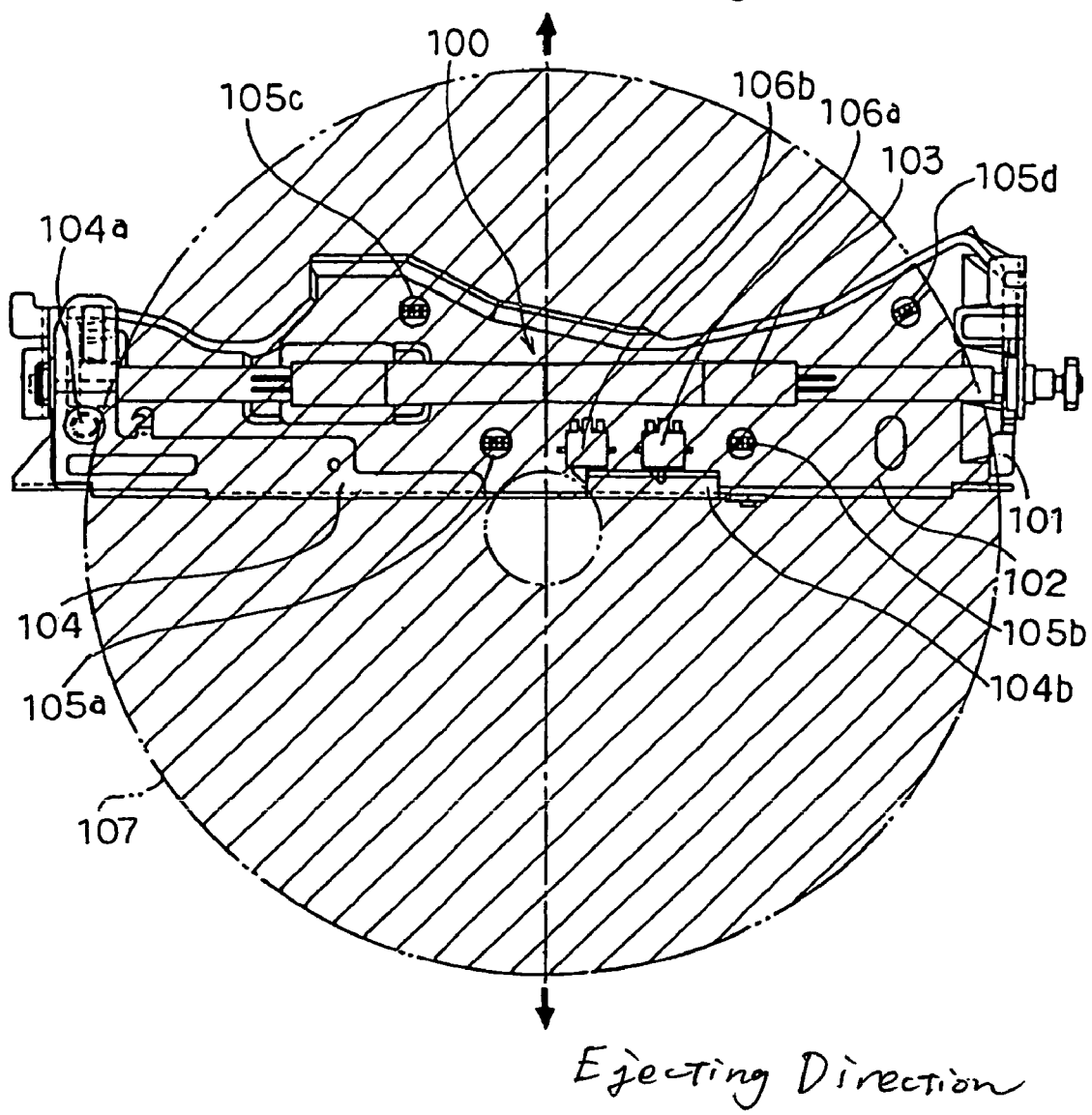

DISC DRIVE APPARATUS

BACKGROUND OF THE INVENTION

1. Field of the Invention

The present invention relates to a disc drive apparatus having a disc identifying mechanism for identifying type of a disc, especially, relates to a disc inserting and discharging portion having detecting means for detecting the disc passing or the like.

The term "disc drive apparatus" here indicates a disc recording apparatus, a disc reproducing apparatus, or a disc recording and reproducing apparatus.

2. Description of the Related Art

In a disc drive apparatus such as an on-vehicle audio apparatus comprising a disc identifying device for identifying the type of a disc, conventionally, a lever to be driven by a contact with a disc or an adaptor is used and a light to be transmitted to light detecting means is shielded by the lever, thereby controlling the start of loading and the completion of the loading and preventing an erroneous detection from being caused by the slit of the adaptor (for example, see Patent Document 1: JP-A-2000-163840).

Description will be given to a disc identifying device disclosed in the Patent Document 1.

In FIGS. 49 and 50, a lower board 911 is fixed to the housing of a disc changer device which is not shown, and an upper board 912 is rotatably supported on the lower board 911. A portion between the upper board 912 and the lower board 911 becomes a disc insertion port 910.

A light receiving unit 913A provided on a left end side in FIG. 50 in the transverse direction of the disc insertion port 910 and a light receiving unit 913B provided on an almost center in the transverse direction of the disc insertion port 910 are attached to the lower board 911. Moreover, a small hole 914A and a small hole 914B are formed on the upper board 912, and furthermore, a vibration plate (lever) 915 is slidably held in the transverse direction of the disc insertion port 910 on the opposite side of the disc insertion port 910.

In addition, a small hole 916A and a large hole 916B are formed on the vibration plate 915 and a spring 917 engaged with the upper board 912 is engaged with the vibration plate 915, and furthermore, the vibration plate 915 is provided with a pin 918 protruded into the disc insertion port 910 through the notch portion of the upper board 912. The vibration plate 915 is energized in a direction shown in an arrow 915a by the elastic force of the spring 917.

In the housing of the disc changer device, moreover, a light emitting unit 919A is attached into an opposed position to the light receiving unit 913A and a light emitting unit 919B is attached into an opposed position to the light receiving unit 913B.

By the structure described above, the disc identifying device constituted by the light receiving unit 913A and the light receiving unit 913B to be light detecting means can identify the type of a disc through outputs from the light receiving unit 913A and the light receiving unit 913B.

For example, when a disc (hereinafter referred to as an ordinary first disc) 920 (see FIG. 49 or 51) having an outside diameter of 12 cm, an adaptor 921 (see FIG. 52) having an outside diameter of 12 cm, capable of holding a disc (hereinafter referred to as a second disc) having an outside diameter of 8 cm in a central part and having a slit 924 (see FIG. 52) or the second disc held in the adaptor 921 is inserted in the disc insertion port 910 or when the second disc is inserted from a left side in the transverse direction of the disc insertion port 910, the pin 918 is driven by the inserted disc or adaptor so that the sliding plate 915 is slid in a direction shown in an arrow 915b from a position shown in FIG. 49 to a position shown in FIG. 51. Accordingly, the small hole 914A formed on the upper board 912 is blocked with the sliding plate 915 as shown in FIG. 51. For this reason, the light receiving unit 913A cannot receive a light from the light emitting unit 919A. Moreover, the small hole 914B formed on the upper board 912 is not blocked with the sliding plate 915 by the action of the large hole 916B formed on the sliding plate 915. Therefore, the light can be received from the light receiving unit 919B until the light receiving unit 913B is blocked with the disc or the adaptor.

On the other hand, when the second disc is inserted from a center or a right side in the transverse direction of the disc insertion port 910, the pin 918 is not driven by the inserted disc. Therefore, the small hole 914A and the small hole 914B formed on the upper board 912 are not blocked with the sliding plate 915 but the light receiving unit 913A can always receive the light from the light emitting unit 919A. Moreover, the light receiving unit 913B can receive the light from the light emitting unit 919B until it is blocked with the disc or the adaptor.

In an audio apparatus comprising the disc identifying device shown in FIGS. 49 and 51, accordingly, the, type of a disc can be identified by outputs from the light receiving unit 913A and the light receiving unit 913B. In the case in which the first disc 920 and the second disc held in the adaptor 921 are inserted, loading is continuously carried out to deliver the disc to a disc housing portion which is not shown. On the other hand, in the case in which the second disc or the adaptor 921 holding no second disc is inserted, it is discharged.

However, in the conventional disc identifying device, the forth disc whose diameter is 12 cm and which has a smaller data area (8 cm) than the first disc (which is an ordinal 12 cm disc) may be dealt with in a same manner to that of the second disc (8 cm). In other words, the conventional disc identifying device cannot distinct the forth disc form the second disc.

Moreover, in the conventional disc identifying device, however, the light detecting means is used for detecting a disc. For this reason, there is a possibility that the insertion of the disc in the device cannot be detected and the loading operation of the disc into the device might not be started when the light transmittance of the disc is high.

SUMMARY OF THE INVENTION

In order to solve the conventional problems, it is an object of the invention to provide a disc identifying device capable of identifying the forth disc as well as the first disc, and also provide a disc drive apparatus having the disc identifying device. Moreover, it is an object of the invention to provide a disc identifying device capable of implementing a stable disc identification irrespective of the light transmittance of a disc, and a disc drive apparatus having the disc identifying device.

The present invention provides a disc drive apparatus capable of loading and ejecting the discs those are: a first disc which has a light shielding effect; a second disc whose outside diameter is smaller than the that of the first disc; a third disc whose outside diameter is almost same as the first disc and which has a light shielding effect and a hollow hole whose outside diameter is almost same as the second disc in central; and a fourth disc whose outside diameter is almost same as the first disc, which has a small data area whose diameter is almost same as the second disc in central and has a light shielding effect, and whose rest area except the small data area is transparent; said apparatus comprising:

a disc inserting and discharging portion;

a first detector for detecting a disc passing through one end of the disc inserting and discharging portion by contacting with the disc;

a second detector for detecting the disc passing by the light shielding of the disc; and a disc identifier for identifying type of the disc based on a detected result by the second detector when the first detector detects the disc, wherein said second detector is arranged on a position where said second detector is capable of detecting the fourth disc when the first disc detects the fourth disc, and where said second detector does not detect the third disc when the first detector detects the third disc.

According to the present invention, the disc drive apparatus, wherein, in the position where said second detector is arranged, said second detector does not detect the second disc when the first detector detects the second disc.

According to the present invention, the disc drive apparatus, further comprising: a third detector for detecting the disc passing by the light shielding of the disc, wherein, in the position where the second detector is arranged, the second detector is capable of detecting the third disc when the third detector first detects the first disc or the third disc, the second detector is also capable of detecting the fourth disc when the third detector detects the fourth disc, and the second detector does not detect the second disc when the third detector first detects the second disc passing through the one end of the disc inserting and discharging portion, and wherein said disc identifier identifies type of the disc based on a detected result of the second detector when the third detector first detects the disc inserted into the disc inserting and discharging portion.

According to the present invention, the disc drive apparatus further comprising: a third detector for detecting the disc passing by the light shielding of the disc; and a fourth detector for detecting the disc passing by the light shielding of the disc, wherein a width of said disc inserting and discharging portion is about same as the outer diameter of the first disc, wherein said third detector is arranged on a position where the third detector is capable of detecting the first disc and the third disc when the fourth detector first detects the first disc and the third disc, and where the third detector does not detect the second disc when the fourth detector first detects the second disc passing through the other end of the disc inserting and discharging portion, and wherein said disc identifier identifies type of the disc based on a detected result of the third detector when the fourth detector first detects the disc inserted into the disc inserting and discharging portion.

According to the present invention, the disc drive apparatus further comprising: a fourth detector for detecting the disc passing by the light shielding of the disc; and a fifth detector for detecting the disc by contacting with the disc, wherein a width of said disc inserting and discharging portion is about same as the outer diameter of the first disc, wherein said fifth detector is arranged on a position where the fifth detector is capable of detecting the first disc or the third disc when the fourth detector first detects the first disc or the third disc, and where the fifth detector does not detect the second disc when the fourth detector first detects the second disc passing through the other end of the disc inserting and discharging portion, and wherein said disc identifier identifies type of the disc based on a detected result of the fifth detector when the fourth detector first detects the disc inserted into the disc inserting and discharging portion.

According to the present invention, the disc drive apparatus further comprising: a fourth detector for detecting the disc passing by the light shielding of the disc; a fifth detector for detecting the disc by contacting with the disc; and a sixth detector for detecting the disc passing by the light shielding of the disc, wherein said sixth detector is arranged on a position where the sixth detector is capable of detecting the second disc passing through the disc inserting and discharging portion and undetected by the second detector, wherein, in any cases of: 1) the first disc passes through the disc inserting and discharging portion; 2) the fourth disc passes through the disc inserting and discharging portion; 3) the second disc passes through the one end of the disc inserting and discharging portion; 4) the second disc passes through the other end of the disc inserting and discharging portion; and 5) the third disc passes through the disc inserting and discharging portion, said fourth detector and said fifth detector are arranged on portions where any one of the fourth detector and the fifth detector is capable of detecting the disc during the period form when any one of the sixth detector and the second detector first detects the disc to when neither the sixth detector nor the second detector detects the disc, and in a case of 6) the second disc passes through a central portion in width direction of the disc inserting and discharging portion, said fourth detector and said fifth detector are arranged on portions where neither the fourth detector nor the fifth detector detects the disc during the period form when any one of the sixth detector and the second detector first detects the disc to when both the sixth detector and the second detector do not detect the disc, and wherein said disc identifier identifies type of the disc based on both detected results of the fourth detector and the fifth detector during the period from when any of the sixth detector and the second detector first detects the disc to when both the sixth detector and the second detector do not detect the disc.

According to the present invention, the disc drive apparatus, further comprising: a fourth detector for detecting the disc passing by the light shielding of the disc; a fifth detector for detecting the disc by contacting with the disc; and a sixth detector for detecting the disc passing by the light shielding of the disc, wherein said sixth detector is arranged on a position where the sixth detector is capable of detecting the second disc passing through the disc inserting and discharging portion and undetected by the second detector, wherein, in any cases of: 1) the first disc passes through the disc inserting and discharging portion; 2) the fourth disc passes through the disc inserting and discharging portion; 3) the second disc passes through the one end of the disc inserting and discharging portion; 4) the second disc passes through the other end of the disc inserting and discharging portion; and 5) the third disc passes through the disc inserting and discharging portion, said fourth detector and said fifth detector are arranged on portions where any one of the fourth detector and the fifth detector is capable of detecting the disc during the period form when any one of the sixth detector and the second detector first detects the disc to when neither the sixth detector nor the second detector detects the disc, and in a case of 6) the second disc passes through a central portion in width direction of the disc inserting and discharging portion, said fourth detector and said fifth detector are arranged on portions where neither the fourth detector nor the fifth detector detects the disc during the period form when any one of the sixth detector and the second detector first detects the disc to when both the sixth detector and the second detector do not detect the disc, and wherein said disc identifier identifies type of the disc based on both detected results of the fourth detector and the fifth detector during the period from when any of the sixth detector and the second detector first detects the disc to when both the sixth detector and the second detector do not detect the disc.

According to the present invention, the disc drive apparatus, further comprising: a transporting portion for loading and ejecting a disc in the disc inserting and discharging portion by transporting the disc; and a controller for controlling the loading and ejecting operation of the disc transporting portion based on an identified result of the disc identifier, wherein, in a case of that the first detector multiple detects the disc inserted into the disc inserting and discharging portion, said controller controls the transporting portion to eject the disc.

According to the present invention, the disc drive apparatus, wherein said disc inserting and discharging portion has a regulating portion for regulating the plural discs passing.

According to the present invention, the disc drive apparatus, wherein said transporting portion has a limiting portion for limiting movement in the direction of the thickness of the disc passing through the disc inserting and discharging portion.

The present invention also provides a disc drive apparatus capable of loading and ejecting the discs those are: a first disc which has a light shielding effect; a second disc whose outside diameter is smaller than that of the first disc and which has a light shielding effect; a third disc whose outside diameter is almost same to the first disc and which has a light shielding effect and a hollow hole whose outside diameter is almost same as the second disc in central; said apparatus comprising:

a disc inserting and discharging portion;

a first detector for detecting a disc passing through one end of the disc inserting and discharging portion by contacting with the disc;

a seventh detector for detecting thickness of a disc by contacting with the disc in the direction of the thickness of the disc; and a disc identifier for identifying type of the disc based on a detected result of the seventh detector when the first detector detects the disc, wherein said seventh detector is arranged on a position where the seventh detector does not detect the third disc when the first disc detects the third disc passing through the one end of the disc inserting and discharging portion.

According to the present invention, the disc drive apparatus, wherein, in the position where said seventh detector is arranged, said seventh detector does not detect the second disc when the first detector detects the second disc.

According to the present invention, the disc drive apparatus further comprising: an eighth detector for detecting the disc passing by contacting with the disc in the direction of the thickness of the disc, wherein, in the position where said seventh detector is arranged, said seventh detector is capable of detecting the first disc or the third disc when the first detector first detects the first disc or the third disc, and said seventh detector does not detect the second disc passing through the one end in the direction of width of the disc inserting and discharging portion when the eighth detector detects the second disc, and wherein said disc identifier identifies type of the disc based on a detected result of the seventh detector when the eighth detector first detects the disc inserted into the disc inserting and discharging portion.

According to the present invention, the disc drive apparatus further comprising: an eighth detector for detecting the disc passing by contacting with the disc in the direction of the thickness of the disc; a ninth detector for detecting the disc passing by contacting with the disc in the direction of the thickness of the disc, wherein a width of said disc inserting and discharging portion is almost same as the outer diameter of the first disc, wherein, in the position where said eighth detector is arranged, said eighth detector is capable of detecting the first disc or the third disc when the ninth detector first detects the first disc of the third disc, and said eighth detector does not detect the second disc passing through the other end of the disc inserting and discharging portion when the ninth detector first detects the second disc, and wherein said disc identifier identifies type of the disc based on the detected result of the eighth detector when the ninth detector detects the disc inserted into the disc inserting and discharging portion.

According to the present invention, the disc drive apparatus further comprising: a fifth detector for detecting the disc by contacting with the disc; and a ninth detector for detecting the disc passing through the disc inserting and discharging portion by contacting with the disc in the direction of the thickness of the disc, wherein a width of said disc inserting and discharging portion is almost same as the outer diameter of the first disc, wherein said fifth detector is arranged on a position where said fifth detector is capable of detecting the first disc or the third disc when the ninth detector first detects the first disc or the third disc, and where said fifth detector does not detect the second disc passing through the other end in the direction of the width of the disc inserting and discharging portion when the ninth detector first detects the second disc, and wherein said disc identifier identifies type of the disc based on the detected result of the fifth detector when the ninth detector first detects the disc inserted into the disc inserting and discharging portion.

According to the present invention, the disc drive apparatus further comprising: a fifth detector for detecting the disc by contacting with the disc; a ninth detector for detecting the disc passing through the disc inserting and discharging portion by contacting with the disc in the direction of the thickness of the disc; and a tenth detector for detecting the disc passing through the disc inserting and discharging portion by contacting with the disc in the direction of the thickness of the disc, wherein a width of said disc inserting and discharging portion is almost same as the outer diameter of the first disc, wherein said tenth detector is arranged on a position where said tenth detector is capable of detecting the second disc passing through the disc inserting and discharging portion and undetected by the seventh detector, wherein, in any cases of: 1) the first disc passes through the disc inserting and discharging portion; 2) the second disc passes through the one end of the disc inserting and discharging portion; 3) the second disc passes through the other end of the disc inserting and discharging portion; and 4) the third disc passes through the disc inserting and discharging portion, said ninth detector and fifth detector are arranged on positions where any one of the ninth detector and the fifth detector is capable of detecting the disc during the period from when any one of the seventh detector and the tenth detector detects the disc to when neither the seventh detector nor the tenth detector detects the disc, and in a case of 5) the second disc passes through the central portion of the width of the disc inserting and discharging portion, said ninth detector and fifth detector are arranged on positions where neither the ninth detector nor the fifth detector detects the disc during the period from when any one of the seventh detector and the tenth detector detects the disc to when neither the seventh detector nor the tenth detector detects the disc, and wherein said disc identifier identifies type of the disc based on both the detected results of the ninth detector and the fifth detector during the period from when at least one of the seventh detector and the tenth detector detects the disc to when neither the seventh detector nor the tenth detector detects the disc.

According to the present invention, the disc drive apparatus further comprising: a transporting portion for loading and ejecting disc in the disc inserting and discharging portion by transporting the disc; a controller for controlling the loading and ejecting operation of the transporting portion based on an identified result of the disc identifier, wherein, in a case of that the first detector multiple detects the disc inserted into the disc inserting and discharging portion, said controller controls the transporting portion to stop loading the disc.

According to the present invention, the disc drive apparatus, wherein, in a case of that the first detector multiple detects the disc inserted into the disc inserting and discharging portion, said controller controls the transporting portion to eject the disc.

According to the present invention, the disc drive apparatus, wherein, in a case of that the fifth detector multiple detects the disc inserted into the disc inserting and discharging portion, said controller controls the transporting portion to stop loading the disc.

According to the present invention, the disc drive apparatus, wherein, in a case of that the fifth detector multiple detects the disc inserted into the disc inserting and discharging portion, said controller controls the transporting portion to eject the disc.

According to the present invention, the disc drive apparatus, wherein, in a case of that the disc loading operation is not completed within a predetermined period after insertion of the disc, said controller controls the transporting portion to eject the disc.

BRIEF DESCRIPTION OF THE DRAWINGS

FIG. 1 is a top view showing the main part of a disc drive apparatus according to a first embodiment of the invention;

FIG. 3 is a top view showing the main part of the disc drive apparatus illustrated in FIG. 1 in the passage of an ordinary first disc through a disc inserting and discharging portion;

Figure 2A:
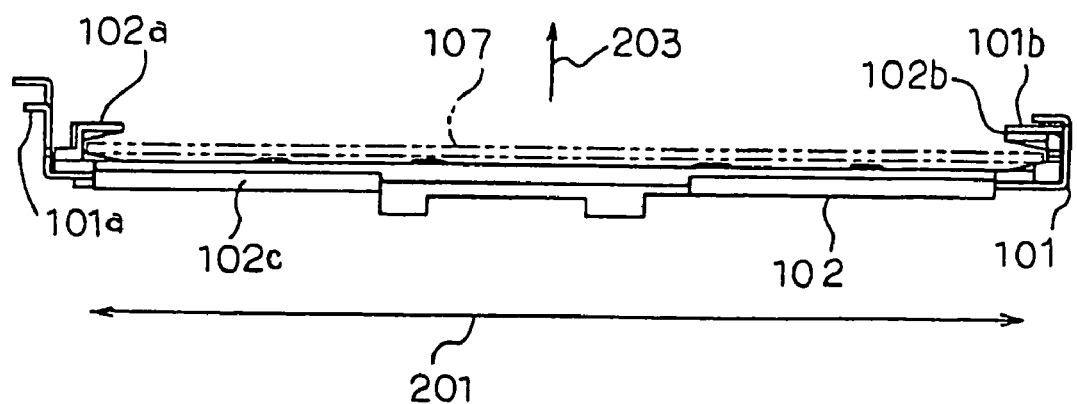
FIG. 2(*a*) is a front view showing the main part of the disc drive apparatus illustrated in FIG. 1 and FIG. 2(*b*) is a front view showing the main part of the disc drive apparatus illustrated in FIG. 1 in a different state from the state of FIG. 2(*a*)

In the drawings, a reference numeral 100 refers to a disc inserting and discharging portion; 100a to an one end; 100b to a central portion; 100c to the other end; 101a to a projection (limiting means); 102a, 102b to a projection (regulating portion); 103 to a roller member (delivery means); 104 to a lever member (fifth detecting means, first detecting means); 105a to a light receiving unit (sixth detecting means, light detecting means); 105b to a light receiving unit (second detecting means, light detecting means); 105c to a light receiving unit (third detecting means, light detecting means); 105d to a light receiving unit (fourth detecting means, light detecting means); 106a to a push switch (fifth detecting means); 106b to a push switch (first detecting means); 107 to an ordinary first disc (first disc, disc); 108 to a 12 cm disc having small data area (forth disc); 108a to a data area; 109 to an ordinary second disc (second disc); 110 to a 12 cm disc adaptor (third disc); 110a to an hollow hole; 111 to a transparent 12 cm disc (transparent disc); and 112, 113 to a first disc (disc).

Moreover, the reference numeral 1100 to a disc inserting and discharging portion; 1100a to one end; 1100b to a central portion; 1100c to the other end; 101a, 1102a, 1102b, 1106b, 1107b, 1108b, 1109b to a projection; 1103, 1106a, 1107a, 1108a, 1109a to a roller member; 1104, 1106, 1107, 1108, 1109 to a lever member; 1105a, 1105b, 1110a, 1110b, 1110c, 1110d to a push switch; 1106c, 1107c, 1108c, 1109c to a shaft member; 1111, 1114, 1115 to a first disc (12 cm); 1112 to a second disc (8 cm); 1113 to a 12 cm disc adaptor (third disc); and 1113a to an hollow hole.

DETAILED DESCRIPTION OF THE PREFERRED EMBODIMENTS

Figure 53:
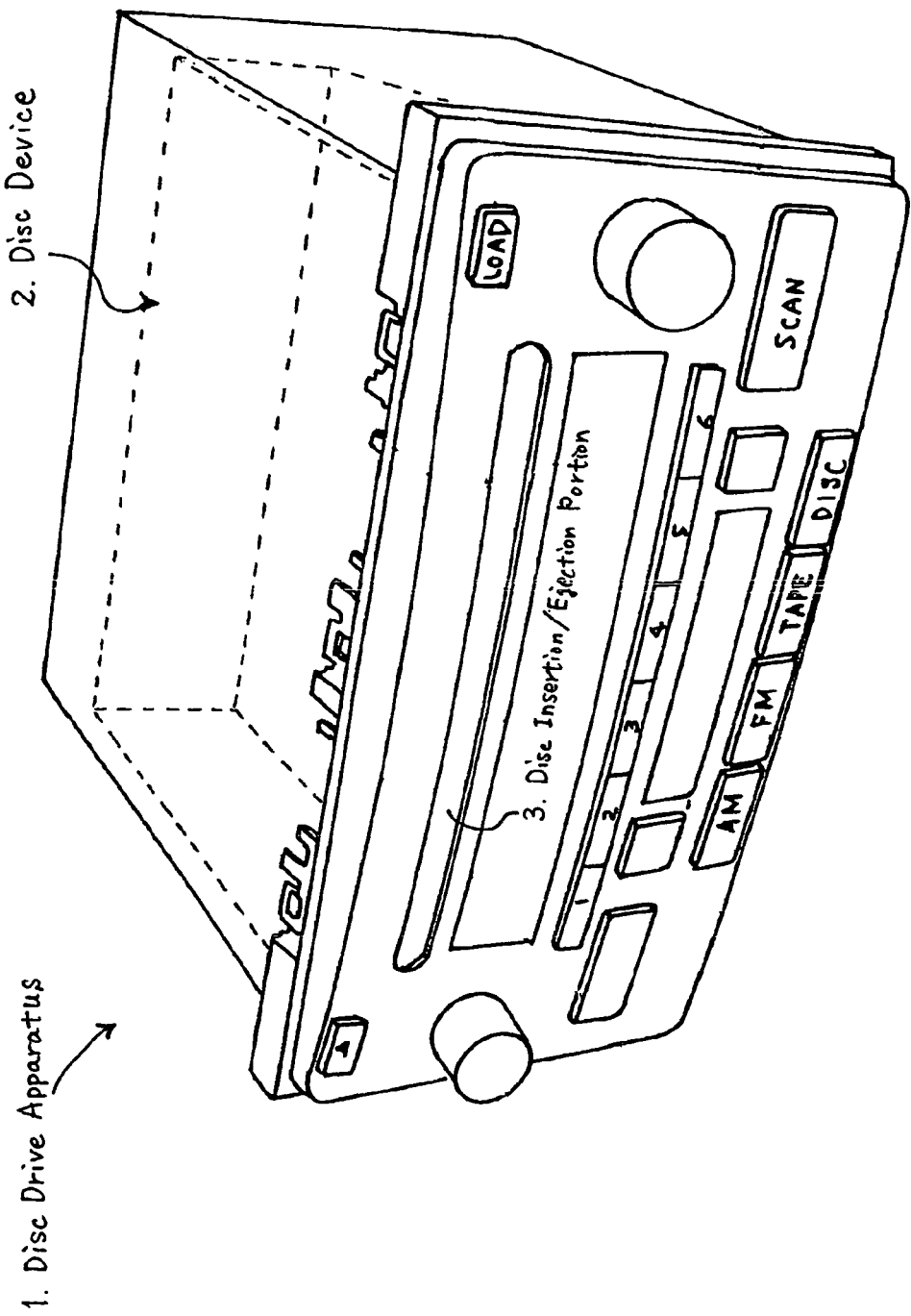
FIG. 53 is an external view showing an example of a disc drive apparatus having a disc device of the first embodiment or the second embodiment.

FIG. 53 shows an external view of a disc drive apparatus having a disc identifying mechanism (disc device) described in the first or second embodiment. Additionally, in those embodiments, the "disc drive apparatus" indicates a disc recording apparatus, a disc reproducing apparatus, or a disc recording and reproducing apparatus.

Each disc identifying mechanism (disc device) of the embodiments is explained in the followings.

First Embodiment

An embodiment of the invention will be described below with reference to FIGS. 1 to 25(b), and FIG. 53.

First of all, description will be given to the structure of a disc device of a disc drive apparatus according to the embodiment.

Figure 2B:
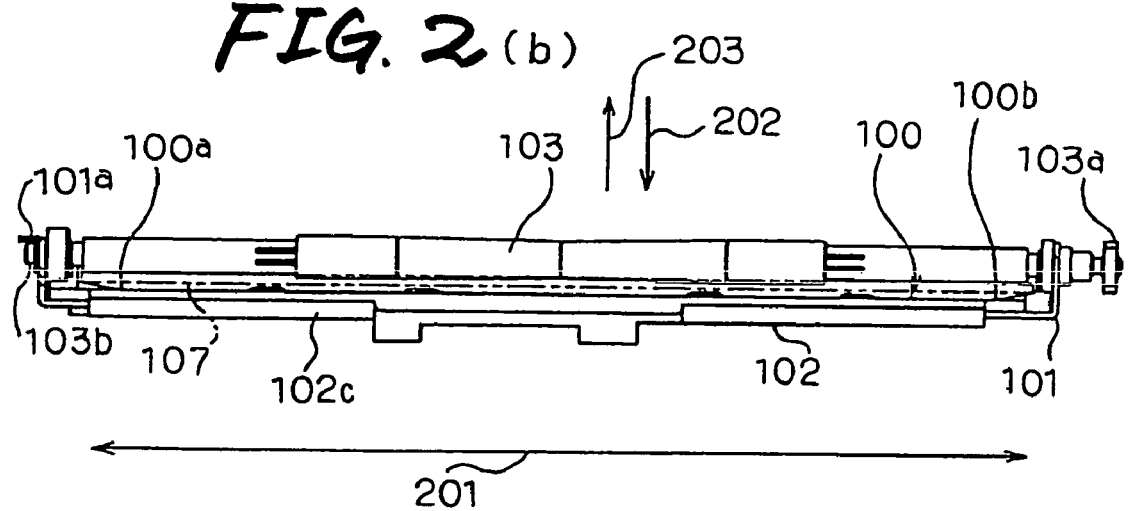

In FIGS. 1 and 2, a disc device of the disc drive apparatus according to the embodiment comprises a base 101, and the base 101 is provided with a disc guide member 102 for regulating a movement in a transverse direction (a direction shown in an arrow 201) which is almost orthogonal to a direction of the passage of a disc such as an first disc 107 (ordinary 12 cm disc) (that is, a loading direction and an ejecting direction) which is inserted and for forming an insertion path, a roller member 103 to be delivery means for coming in contact with the inserted disc to transmit a power, thereby delivering the disc and inserting (loading) and discharging (ejecting) the disc, an elastic member (not shown) for energizing the roller member 103 in a downward direction with respect to the inserted disc (in a direction shown in an arrow 202), and a power source (not shown) engaged with a gear 103a provided on the roller member 103 and serving to rotate the roller member 103.

The disc guide member 102 and the roller member 103 interpose a disc inserted in the disc drive apparatus therebetween and serve to deliver the disc in the loading direction or the ejecting direction, and form a disc inserting and discharging portion 100 for inserting and discharging the disc. The disc inserting and discharging portion 100 has a width (approximately 12 cm) which is almost equal to the outside diameter of the ordinary first disc in such a manner that discs such as the ordinary first disc including a data area having a light shielding property and an ordinary second disc having a smaller outside diameter than that of the ordinary first disc and including a data area having the light shielding property can pass therethrough.

In the disc inserting and discharging portion 100, moreover, the disc guide member 102 is provided with projections 102a and 102b to be regulating portions for coming in contact with a disc to be inserted, thereby regulating the direction of the thickness of the disc to be inserted and controlling the passage of a plurality of discs which is superposed. Thus, a plurality of discs can be prevented from being simultaneously inserted in the disc drive apparatus. More detailed description will be given. When one disc is inserted in the disc drive apparatus, the inserted disc can pass between a body 102c and the projections 102a and 102b in the disc guide member 102. When a plurality of discs is inserted, the inserted discs cannot pass between the body 102c and the projections 102a and 102b in the disc guide member 102.

Furthermore, the base 101 is provided with a projection 101a to be limiting means for coming in contact with a shaft member 103b provided on the center of the roller member 103, thereby limiting the movement of the roller member 103 in the direction of the thickness of the disc passing through the disc inserting and discharging portion 100 (a direction shown in an arrow 203), and a projection 101b for regulating the displacement of the projection 102b in an upward direction (the direction shown in the arrow 203). Thus, a plurality of discs can be prevented from being simultaneously inserted in the disc drive apparatus. More detailed description will be given. When one disc is inserted in the disc drive apparatus, the inserted disc can pass between the disc guide member 102 and the roller member 103. When a plurality of discs is inserted, the projection 101a of the base 101 and the shaft member 103b of the roller member 103 come in contact with each other so that the inserted disc cannot pass between the disc guide member 102 and the roller member 103.

In addition, the disc drive apparatus comprises a housing (not shown). On the roller member 103 side with respect to the disc guide member 102, the housing is provided with a lever member 104 having a shaft portion 104a for coming in contact with the outer periphery of a disc when the disc is inserted in the disc drive apparatus, an upper board (not shown) including a plurality of light receiving units 105a, 105b, 105c and 105d and push switches 106a and 106b for coming in contact with a projection 104b provided on the lever member 104, thereby detecting the displacement of the lever member 104, and an elastic member (not shown) for energizing the lever member 104 to a position shown in FIG. 1 in the direction shown in the arrow 201.

The light receiving units 105a, 105b, 105c and 105d and the push switches 106a and 106b serve to output Hi in a state in which the disc is detected, and to output Lo in a state in which the disc is not detected.

Moreover, a lower board (not shown) including a plurality of light emitting units (not shown) making a pair with the light receiving units 105a, 105b, 105c and 105d is provided between the base 101 and the disc guide member 102.

The shaft portion 104a of the lever member 104 is provided on an upstream side in the direction of insertion (loading) of the disc from the roller member 103, and the push switch 106a is provided in such a position as to detect the displacement of the lever member 104 immediately after the movement of the lever member 104 in a leftward direction (a direction shown in an arrow 204) is started by the contact of the outer periphery of the inserted disc with the shaft portion 104a of the lever member 104.

Furthermore, the push switch 106b is provided in such a position as to detect the maximum displacement of the lever member 104 in the direction shown in the arrow 204 when the outer periphery of the inserted first disc 107 (ordinary 12 cm disc) comes in contact with the shaft portion 104a of the lever member 104, and the lever member 104 and the push switch 106b constitute first detecting means for detecting a disc passing through one end 100a of the disc inserting and discharging portion 100 in a transverse direction by a contact with the disc.

Figure 4:
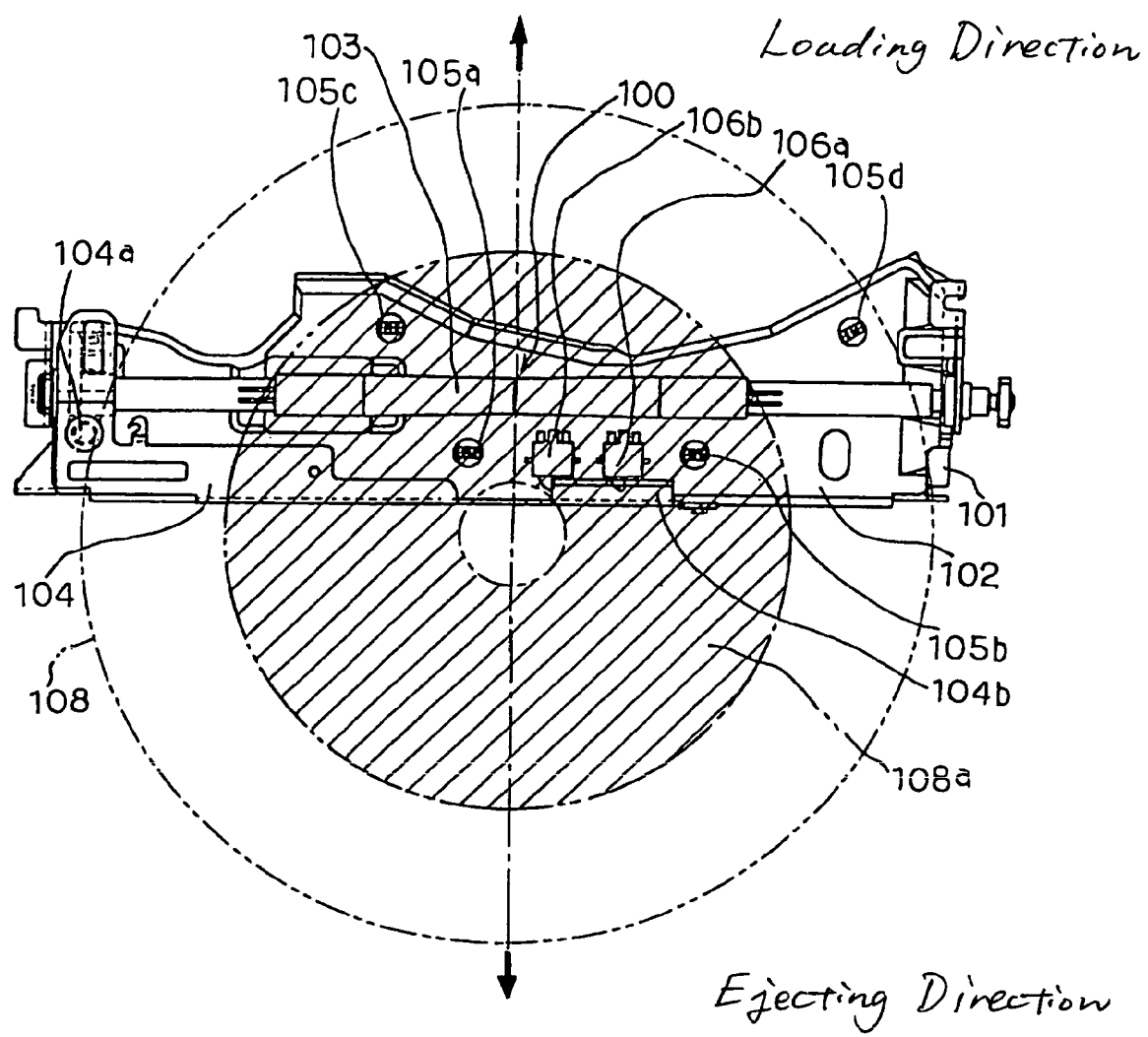
FIG. 4 is a top view showing the main part of the disc drive apparatus illustrated in FIG. 1 in the passage of a 12 cm disc having a small data area (fourth disc) through the disc inserting and discharging portion.
Figure 5:
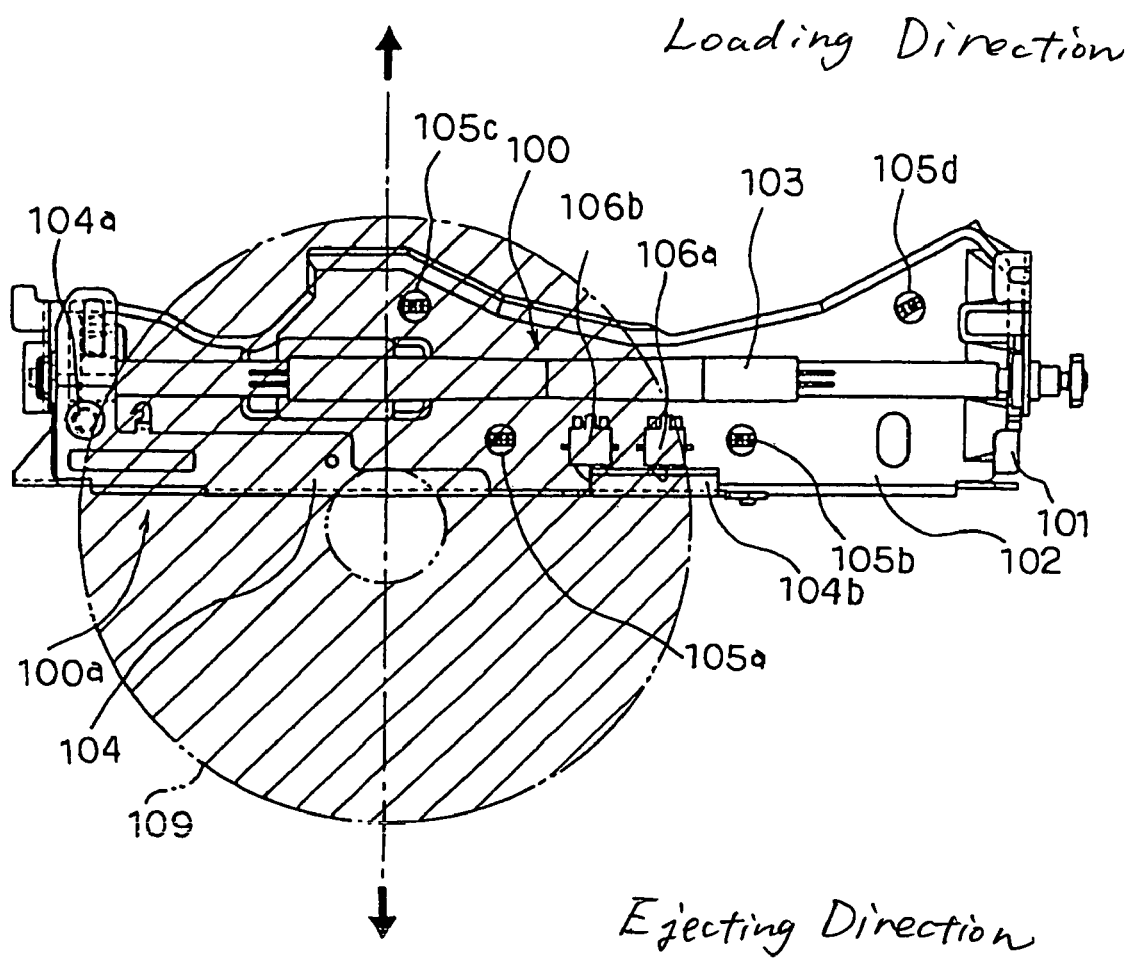
FIG. 5 is a top view showing the main part of the disc drive apparatus illustrated in FIG. 1 in the passage of an ordinary second disc through one end of the disc inserting and discharging portion in a transverse direction.
Figure 6:
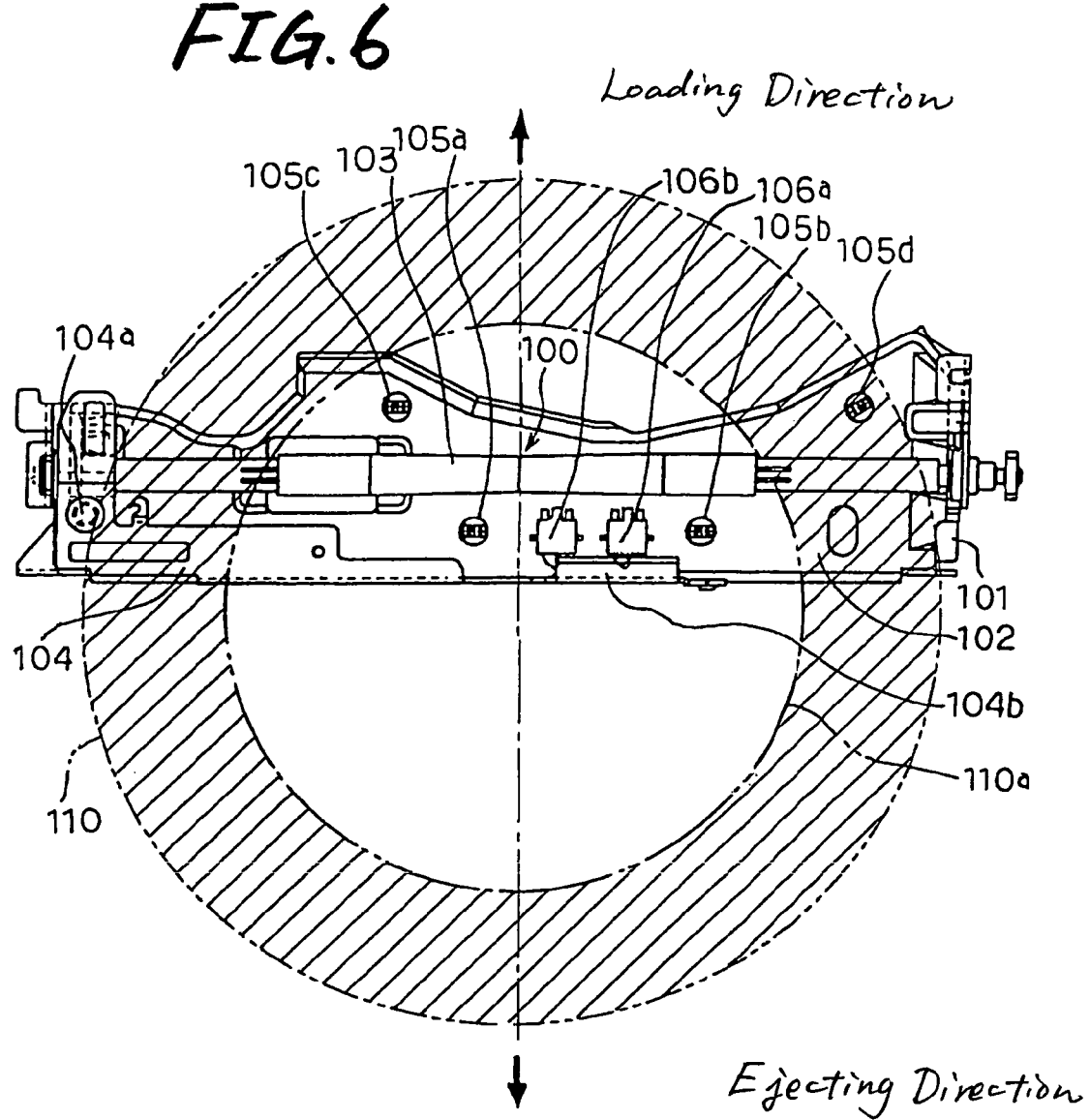
FIG. 6 is a top view showing the main part of the disc drive apparatus illustrated in FIG. 1 in the passage of a 12 cm disc adaptor through the disc inserting and discharging portion.
Figure 7:
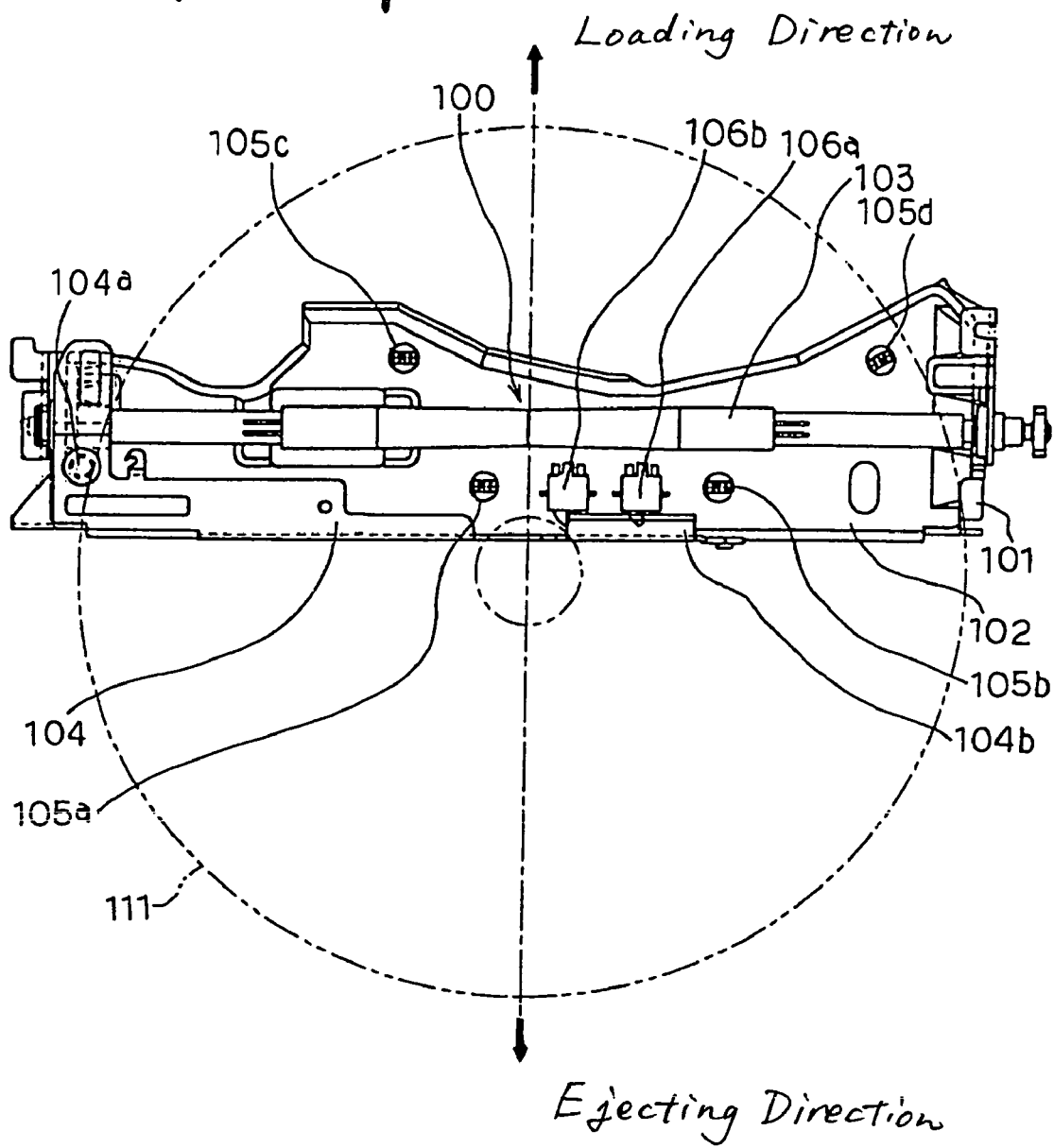
FIG. 7 is a top view showing the main part of the disc drive apparatus illustrated in FIG. 1 in the passage of a transparent first disc through the disc inserting and discharging portion.

More specifically, the push switch 106b serves to detect the first disc 107 (ordinary 12 cm disc) passing through the disc inserting and discharging portion 100 as shown in FIG. 3, a small data area first disc 108 to be a fourth disc passing through the disc inserting and discharging portion 100 as shown in FIG. 4, an second disc 109 (ordinary 8 cm disc) passing through the end 100a of the disc inserting and discharging portion 100 in the transverse direction as shown in FIG. 5, a third disc 110 (12 cm disc adaptor) to be a third disc passing through the disc inserting and discharging portion 100 as shown in FIG. 6, and a transparent 12 cm disc 111 to be a transparent disc passing through the disc inserting and discharging portion 100 as shown in FIG. 7. In FIGS. 3 to 6, a portion shown in a slanting line in the disc represents a portion having a light shielding property such as a data area.

Moreover, the light receiving unit 105b is provided in such a position as to detect the disc passing by the light shielding of the disc, to detect the fourth disc 108 (12 cm disc having a small data area) when the fourth disc 108 (12 cm disc having a small data area) is to be detected by the push switch 106b as shown in FIG. 4, not to detect the second disc 109 (ordinary 8 cm disc) passing through the end 100a of the disc inserting and discharging section 100 in the transverse direction when the second disc 109 (ordinary 8 cm disc) is to be detected by the push switch 106b as shown in FIG. 5, and not to detect the third disc 110 (12 cm disc adaptor) when the third disc 110 (12 cm disc adaptor) is to be detected by the push switch 106b as shown in FIG. 6, and constitutes second detecting means to be light detecting means.

The first disc 107 (ordinary 12 cm disc) (see FIG. 3) has a larger data area than a data area 108a (see FIG. 4) of the fourth disc 108 (12 cm disc having a small data area) (see FIG. 4). In the case in which the light receiving unit 105b is provided in such a position as to detect the fourth disc 108 (12 cm disc having a small data area) when the fourth disc 108 (12 cm disc having a small data area) is to be detected by the push switch 106b as shown in FIG. 4, it detects the first disc 107 (ordinary 12 cm disc) when the first disc 107 (ordinary 12 cm disc) is to be detected by the push switch 106b as shown in FIG. 3.

Moreover, the whole transparent 12 cm disc 111 shown in FIG. 7 is transparent. In the case in which the light receiving unit 105b is provided in such a position as to detect the first disc 107 (ordinary 12 cm disc) when the S first disc 107 (ordinary 12 cm disc) is to be detected by the push switch 106b as shown in FIG. 3, therefore, it does not detect the transparent 12 cm disc 111 when the transparent 12 cm disc 111 is to be detected by the push switch 106b as shown in FIG. 7.

Figure 8:
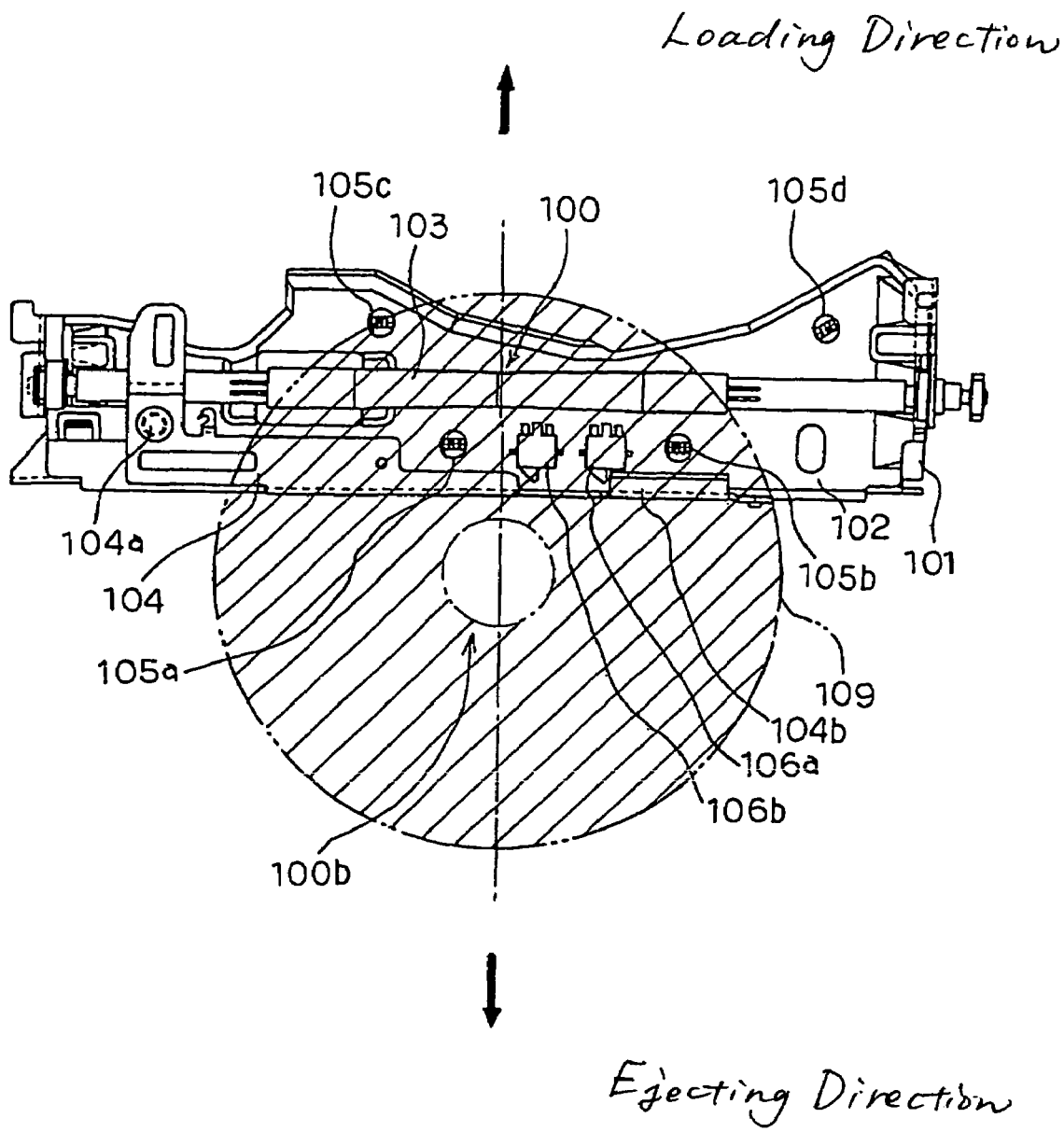
FIG. 8 is a top view showing the main part of the disc drive apparatus illustrated in FIG. 1 in the passage of the ordinary second disc through the central portion of the disc inserting and discharging portion in the transverse direction.
Figure 9:
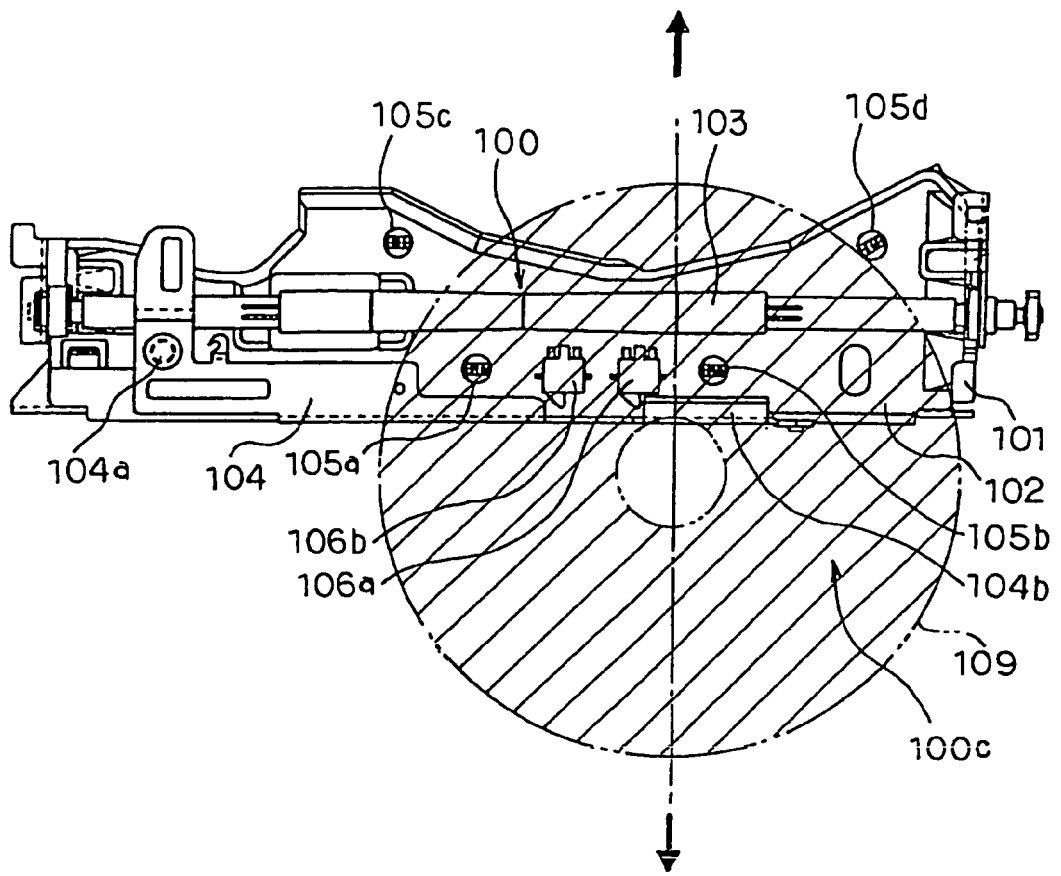
FIG. 9 is a top view showing the main part of the disc drive apparatus illustrated in FIG. 1 in the passage of the ordinary second disc through the other end of the disc inserting and discharging portion in the transverse direction.

In the case in which the push switch 106b is provided in such a position as to detect a maximum displacement in the direction shown in the arrow 204 (see FIG. 1) of the lever member 104 when the outer periphery of the inserted first disc 107 (ordinary 12 cm disc) (see FIG. 3) and the shaft portion 104a of the lever member 104 come in contact with each other, moreover, it detects neither the second disc 109 (ordinary 8 cm disc) passing through a central portion 100b of the disc inserting and discharging portion 100 in the transverse direction as shown in FIG. 8 nor the second disc 109 (ordinary 8 cm disc) passing through the other end 100c of the disc inserting and discharging portion 100 in the transverse direction as shown in FIG. 9.

Figure 10:
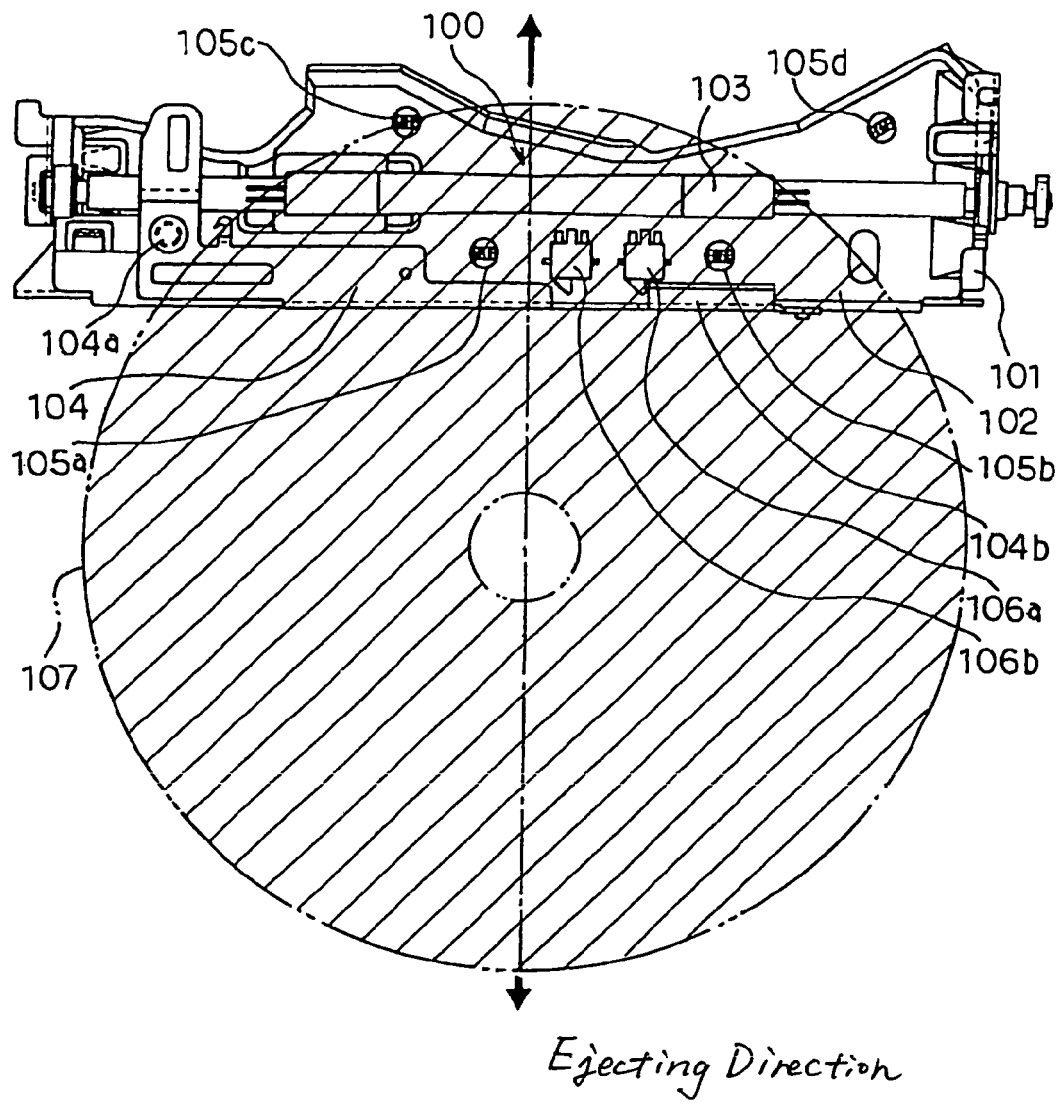
FIG. 10 is a top view showing the main part of the disc drive apparatus illustrated in FIG. 1 in the passage of the ordinary first disc through the disc inserting and discharging portion in a different state from the state shown in FIG. 3.
Figure 11:
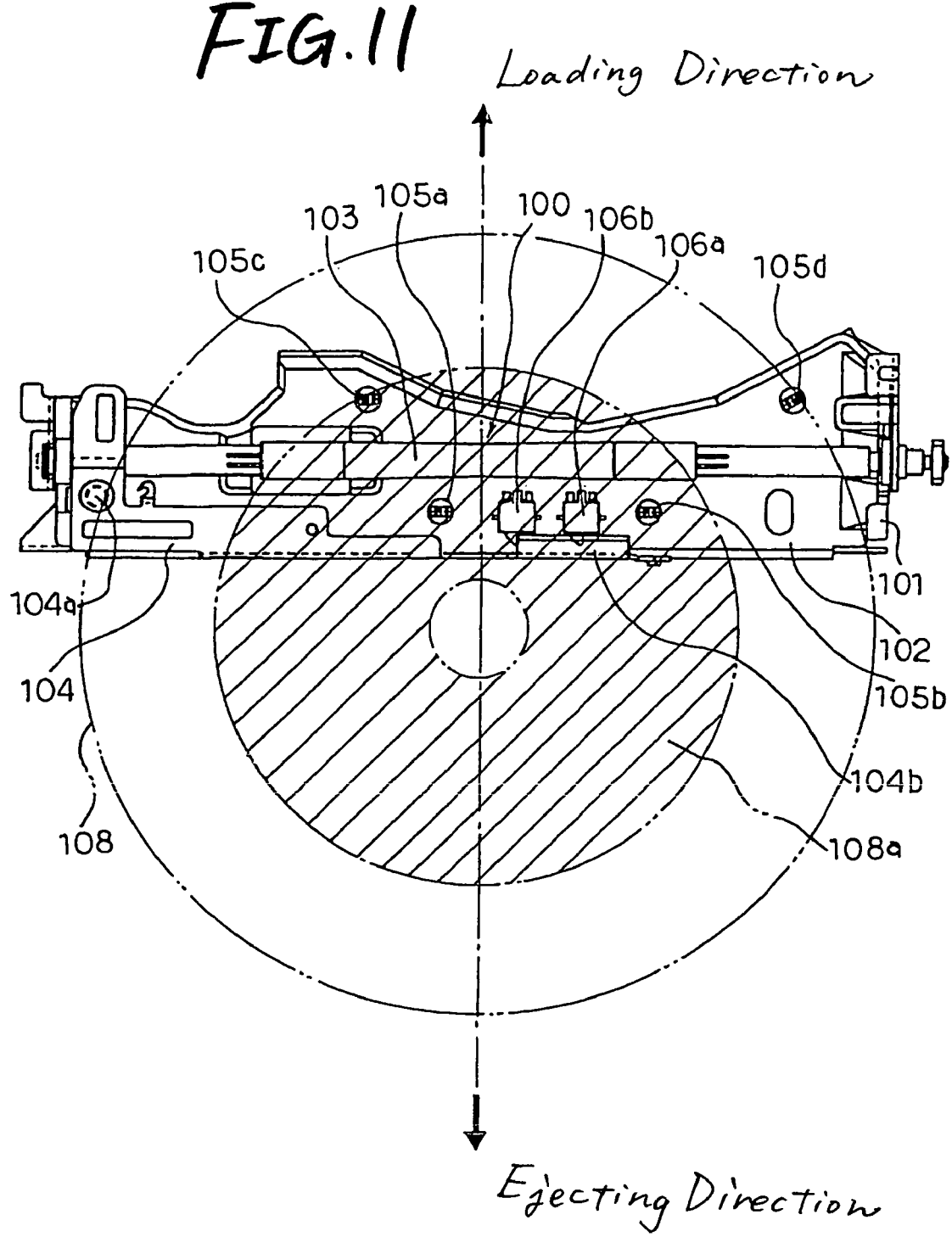
FIG. 11 is a top view showing the main part of the disc drive apparatus illustrated in FIG. 1 in the passage of the 12 cm disc having a small data area (fourth disc) through the disc inserting and discharging portion in a different state from the state shown in FIG. 4.
Figure 12:
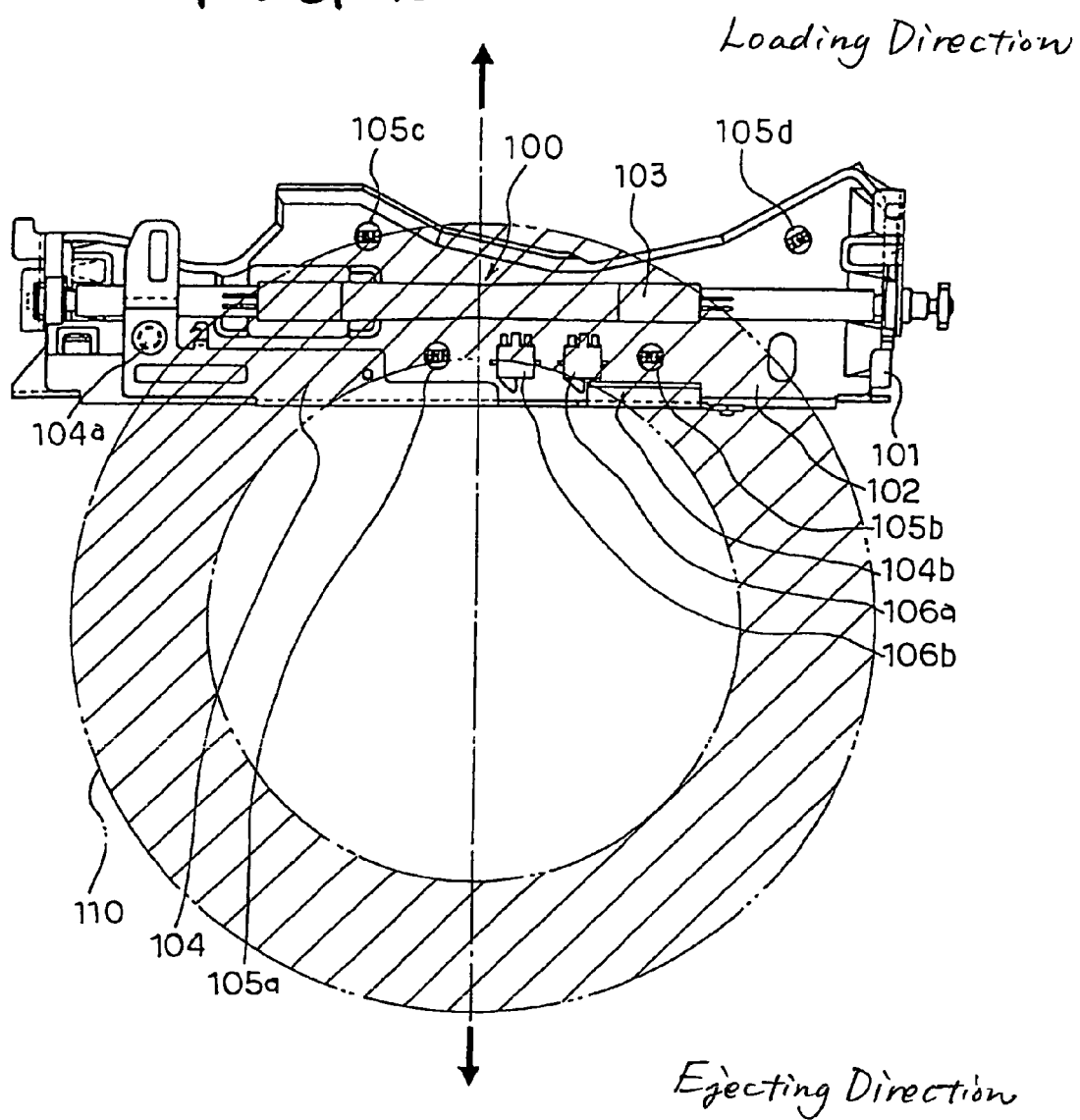
FIG. 12 is a top view showing the main part of the disc drive apparatus illustrated in FIG. 1 in the passage of the 12 cm disc adaptor through the disc inserting and discharging portion in a different state from the state shown in FIG. 6.
Figure 13:
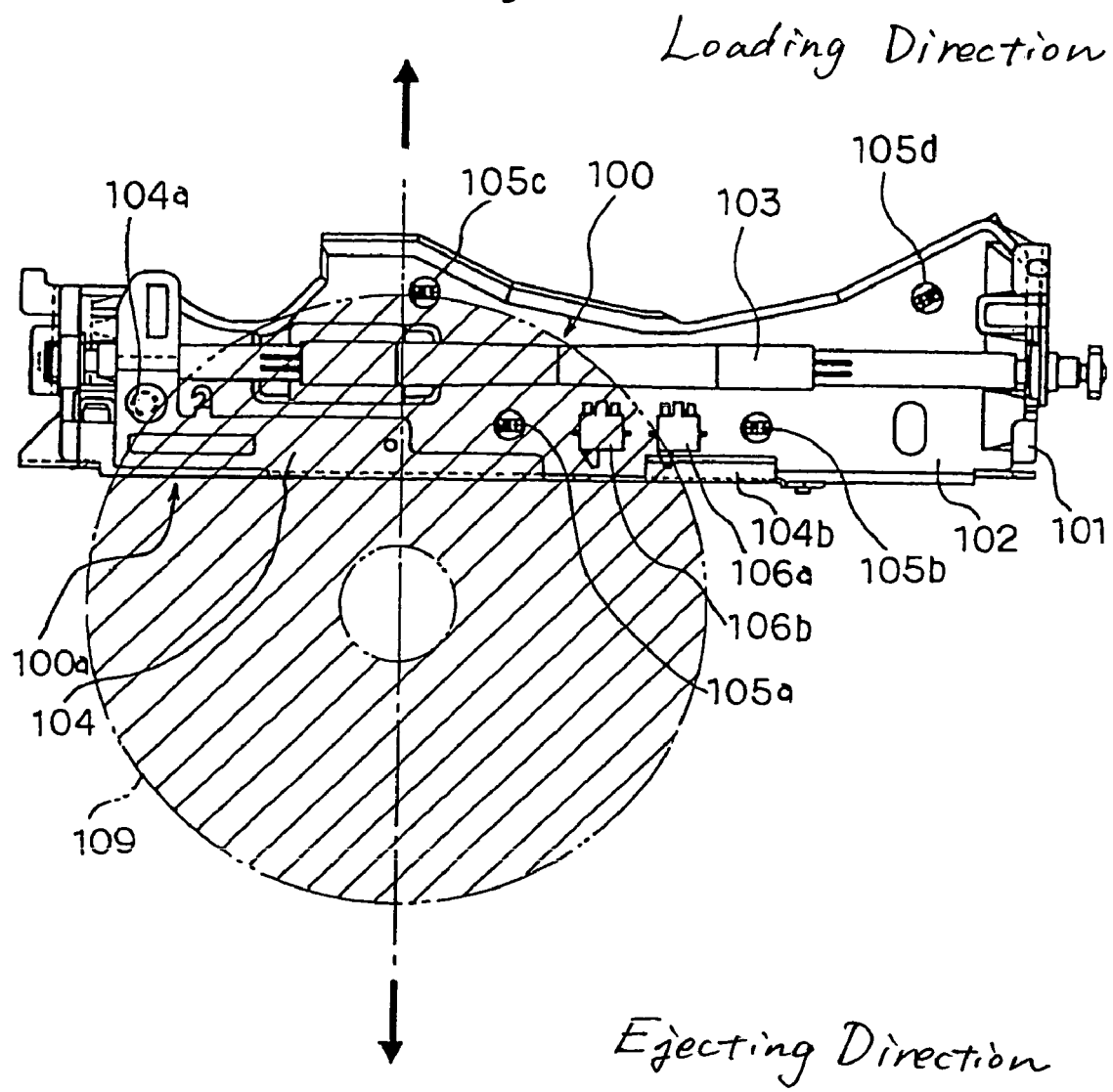
FIG. 13 is a top view showing the main part of the disc drive apparatus illustrated in FIG. 1 in the passage of the ordinary second disc through one end of the disc inserting and discharging portion in the transverse direction in a different state from the state shown in FIG. 5.

Furthermore, the light receiving unit 105c constitutes third detecting means to be light detecting means for detecting a disc passing by the light shielding of the disc, and the light receiving unit 105b and the light receiving unit 105c are provided in such positions that the first disc 107 (ordinary 12 cm disc), the fourth disc 108 (12 cm disc having a small data area) and the third disc 110 (12 cm disc adaptor) are inserted in the disc inserting and discharging portion 100 and are detected by the light receiving unit 105b when they are to be first detected by the light receiving unit 105c as shown in FIGS. 10 to 12, and the second disc 109 (ordinary 8 cm disc) passing through the end 100a of the disc inserting and discharging portion 100 in the transverse direction is inserted in the disc inserting and discharging portion 100 and is not detected by the light receiving unit 105b when it is to be first detected by the light receiving unit 105c as shown in FIG. 13.

The track of the second disc 109 (ordinary 8 cm disc) passing through the central portion 100b of the disc inserting and discharging portion 100 in the transverse direction shown in FIG. 8 is almost the same as that of a data area 108b of the fourth disc 108 (12 cm disc having a small data area) passing through the disc inserting and discharging portion 100 shown in FIG. 11. As shown in FIG. 8, therefore, the second disc 109 (ordinary 8 cm disc) passing through the central portion 100b of the disc inserting and discharging portion 100 in the transverse direction is also inserted in the disc inserting and discharging portion 100 in the same manner as the fourth disc 108 (12 cm disc having a small data area) (see FIG. 11) and is detected by the light receiving unit 105b when it is to be first detected by the light receiving unit 105c.

Since the transparent 12 cm disc 111 is transparent, moreover, it can be prevented from being detected by the light receiving unit 105c.

Figure 14:
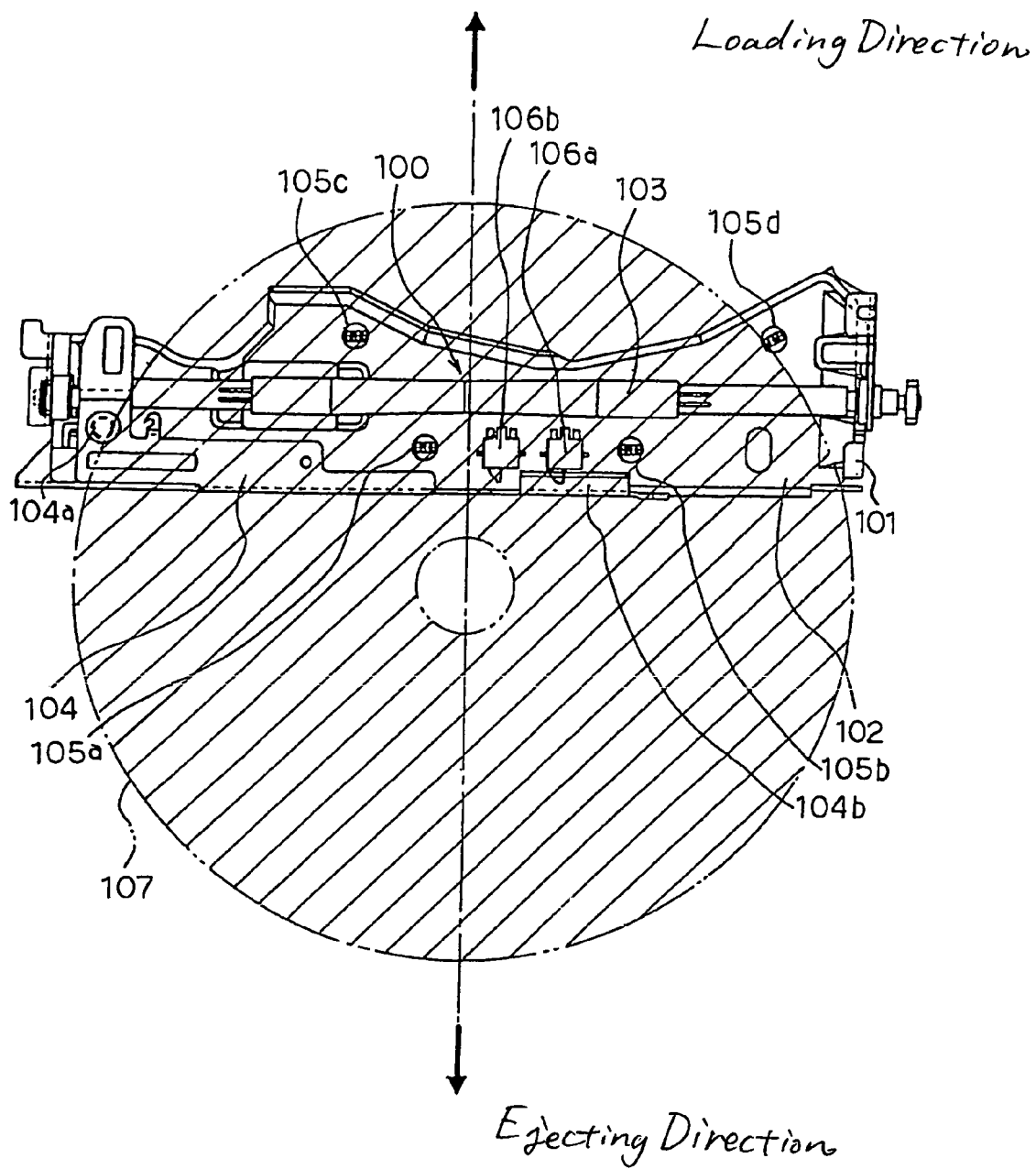
FIG. 14 is a top view showing the main part of the disc drive apparatus illustrated in FIG. 1 in the passage of the ordinary first disc through the disc inserting and discharging portion in a different state from the states shown in FIGS. 3 and 10.
Figure 15:
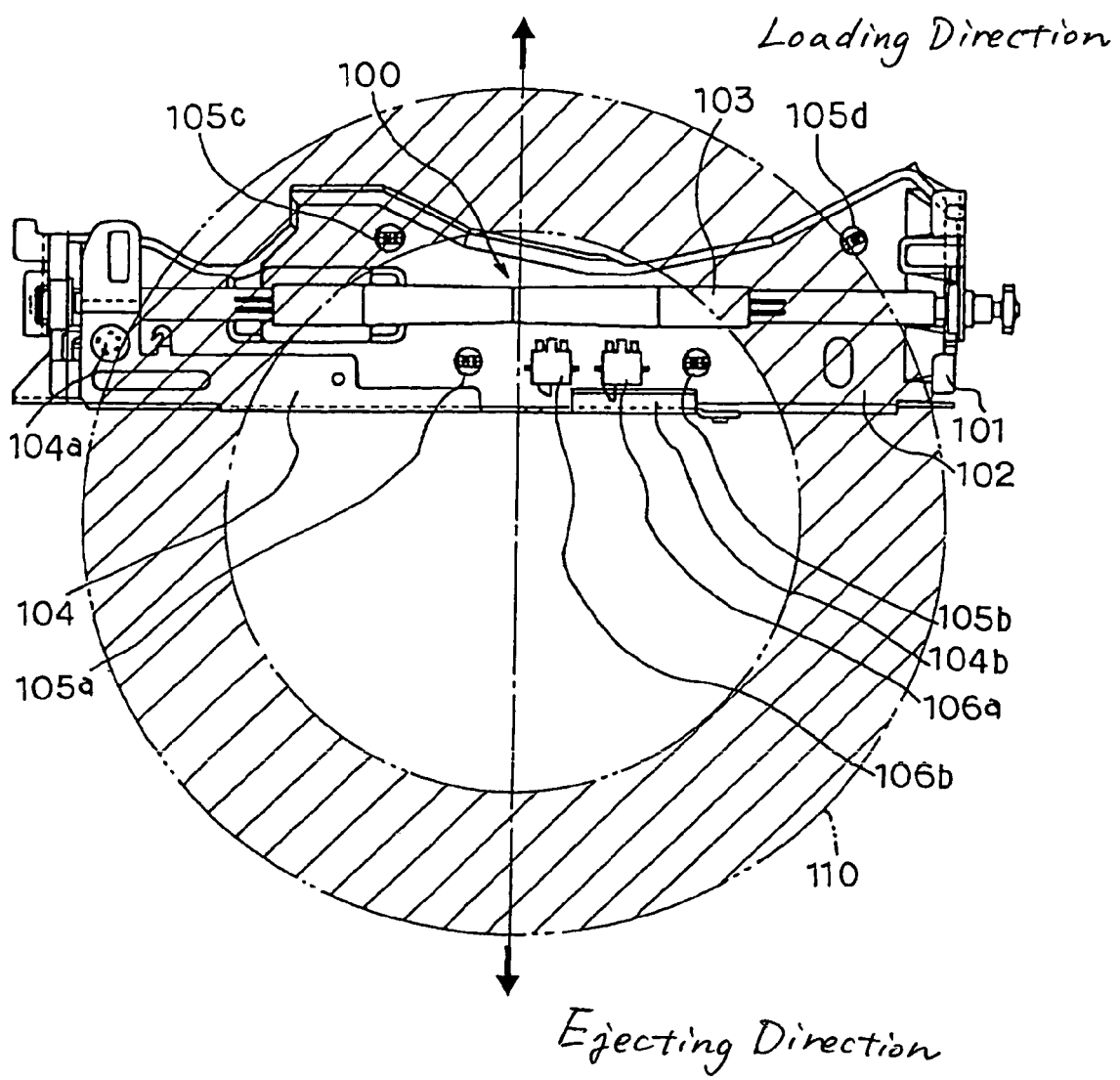
FIG. 15 is a top view showing the main part of the s disc drive apparatus illustrated in FIG. 1 in the passage of the 12 cm disc adaptor through the disc inserting and discharging portion in a different state from the states shown in FIGS. 6 and 12.

Furthermore, the light receiving unit 105d constitutes fourth detecting means to be light detecting means for detecting a disc passing by the light shielding of the disc, and the light receiving unit 105d and the light receiving unit 105c are provided in such positions that the first disc 107 (ordinary 12 cm disc) and the third disc 110 (12 cm disc adaptor) are inserted in the disc inserting and discharging portion 100 and are detected by the light receiving unit 105c when they are to be first detected by the light receiving unit 105d as shown in FIGS. 14 and 15, and the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100b of the disc inserting and discharging portion 100 in the transverse direction are not detected by the light receiving unit 105d as shown in FIGS. 4, 5 and 8, and the second disc 109 (ordinary 8 cm disc) passing through the other end 100c of the disc inserting and discharging portion 100 in the transverse direction is inserted in the disc inserting and discharging portion 100, and is not detected by the light receiving unit 105c when it is to be first detected by the light receiving unit 105d as shown in FIG. 9.

Since the transparent 12 cm disc 111 is transparent, it can be prevented from being detected by the light receiving unit 105d.

Moreover, the lever member 104 and the push switch 106a constitute fifth detecting means for detecting a disc passing by a contact with the disc, and the shaft portion 104a of the lever member 104 and the light receiving unit 105d are provided in such positions that the first disc 107 (ordinary 12 cm disc) and the third disc 110 (12 cm disc adaptor) are inserted in the disc inserting and discharging portion 100 and are detected by the push switch 106a when they are to be first detected by the light receiving unit 105d as shown in FIGS. 14 and 15, and the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100b of the disc inserting and discharging portion 100 in the transverse direction are not detected by the light receiving unit 105d as shown in FIGS. 4, 5 and 8, and the second disc 109 (ordinary 8 cm disc) passing through the other end 100c of the disc inserting and discharging portion 100 in the transverse direction is inserted in the disc inserting and discharging portion 100, and is not detected by the push switch 106a when it is to be first detected by the light receiving unit 105d as shown in FIG. 9.

Since the transparent 12 cm disc 111 is transparent, it can be prevented from being detected by the light receiving unit 105d as described above.

Furthermore, the light receiving unit 105a constitutes sixth detecting means to be light detecting means which is provided in such a position as to detect a disc passing by the light shielding of the disc and to detect at least the second disc 109 (ordinary 8 cm disc) which is not detected by the light receiving unit 105b as shown in FIG. 5 in the ordinary second discs 109 passing through the disc inserting and discharging portion 100, and the shaft portion 104a of the lever member 104, the light receiving unit 105a, the light receiving unit 105b and the light receiving unit 105d are provided in such positions that the first disc 107 (ordinary 12 cm disc), the fourth disc 108 (12 cm disc having a small data area), the second disc 109 (ordinary 8 cm disc) passing through the end 100a of the disc inserting and discharging portion 100 in the transverse direction, the third disc 110 (12 cm disc adaptor) and the second disc 109 (ordinary 8 cm disc) passing through the other end 100c of the disc inserting and discharging portion 100 in the transverse direction are inserted in the disc inserting and discharging portion 100, are detected by at least one of the light receiving unit 105a and the light receiving unit 105b and are detected by at least one of the light receiving unit 105d and the push switch 106a before they are detected by neither the light receiving unit 105a nor the light receiving unit 105b as shown in FIGS. 3, 4, 5, 6 and 9, and the second disc 109 (ordinary 8 cm disc) passing through the central portion 100b of the disc inserting and discharging portion 100 in the transverse direction is inserted in the disc inserting and discharging portion 100, and is detected by at least one of the light receiving unit 105a and the light receiving unit 105b and is detected by neither the light receiving unit 105d nor the push switch 106a before it is detected by neither the light receiving unit 105a nor the light receiving unit 105b as shown in FIG. 8.

Since the transparent 12 cm disc 111 is transparent, it can be prevented from being detected by the light receiving unit 105a and the light receiving unit 105b.

Moreover, the light detecting means, that is, the light receiving units 105a, 105b, 105c and 105d are provided in such positions that the first disc 107 (ordinary 12 cm disc), the fourth disc 108 (12 cm disc having a small data area), the second disc 109 (ordinary 8 cm disc) and the third disc 110 (12 cm disc adaptor) which are to be detected by the push switch 106b are detected by any of the light receiving units 105a, 105b, 105c and 105d as shown in FIGS. 3 to 6.

Furthermore, the light receiving unit 105a is provided on an upstream side in the direction of the insertion of the disc from the roller member 103 and in such a position as to detect the first disc 107 (ordinary 12 cm disc) (see FIG. 3) inserted in the disc inserting and discharging portion 100, the second disc 109 (ordinary 8 cm disc) (see FIG. 5) passing through the end 100a of the disc inserting and discharging portion 100 in the transverse direction and the second disc 109 (ordinary 8 cm disc) (see FIG. 8) passing through the central portion 100b of the disc inserting and discharging portion 100 in the transverse direction before the first disc 107 (ordinary 12 cm disc) (see FIG. 3), the second disc 109 (ordinary 8 cm disc) (see FIG. 5) passing through the end 100a of the disc inserting and discharging portion 100 in the transverse direction and the second disc 109 (ordinary 8 cm disc) (see FIG. 8) passing through the central portion 100b of the disc inserting and discharging portion 100 in the transverse direction come in contact with the roller member 103.

The third disc 110 (12 cm disc adaptor) (see FIG. 6) has an outside diameter which is almost equal to that of the first disc 107 (ordinary 12 cm disc) (see FIG. 3). In the case in which the light receiving unit 105a is provided in such a position as to detect the first disc 107 (ordinary 12 cm disc) inserted in the disc inserting and discharging portion 100 before the first disc 107 (ordinary 12 cm disc) comes in contact with the roller member 103 as shown in FIG. 3, therefore, the third disc 110 (12 cm disc adaptor) inserted in the disc inserting and discharging portion 100 is detected before the third disc 110 (12 cm disc adaptor) comes in contact with the roller member 103 as shown in FIG. 6.

As shown in FIG. 9, moreover, the light receiving unit 105b is provided on the upstream side in the direction of the insertion of the disc from the roller member 103 and in such a position as to detect the second disc 109 (ordinary 8 cm disc) inserted in the disc inserting and discharging portion 100 and passing through the other end 100c of the disc inserting and discharging portion 100 in the transverse direction before the second disc 109 (ordinary 8 cm disc) comes in contact with the roller member 103.

As shown in FIGS. 8, 10, 11 and 13, moreover, the light receiving unit 105c is provided in such a position that the second disc 109 (ordinary 8 cm disc) passing through the central portion 100b of the disc inserting and discharging portion 100 in the transverse direction, the first disc 107 (ordinary 12 cm disc), the fourth disc 108 (12 cm disc having a small data area) and the second disc 109 (ordinary 8 cm disc) passing through the end 100a of the disc inserting and discharging portion 100 in the transverse direction are detected and the second disc 109 (ordinary 8 cm disc) passing through the central portion 100b of the disc inserting and discharging portion 100 in the transverse direction which is provided in contact with the roller member 103, the first disc 107 (ordinary 12 cm disc), the fourth disc 108 (12 cm disc having a small data area) and the second disc 109 (ordinary 8 cm disc) passing through the end 100a of the disc inserting and discharging portion 100 in the transverse direction are not detected when the second disc 109 (ordinary 8 cm disc) passing through the central portion 100b of the disc inserting and discharging portion 100 in the transverse direction, the first disc 107 (ordinary 12 cm disc), the fourth disc 108 (12 cm disc having a small data area) and the second disc 109 (ordinary 8 cm disc) passing through the end 100a of the disc inserting and discharging portion 100 in the transverse direction are to be discharged from the disc inserting and discharging portion 100.

The third disc 110 (12 cm disc adaptor) (see FIG. 12) has an outside diameter which is almost equal to that of the first disc 107 (ordinary 12 cm disc) (see FIG. 10). In the case in which the light receiving unit 105c is provided in such a position as to detect the first disc 107 (ordinary 12 cm disc) and not to then detect the first disc 107 (ordinary 12 cm disc) which is provided in contact with the roller member 103 when the first disc 107 (ordinary 12 cm disc) is to be discharged from the disc inserting and discharging portion 100 as shown in FIG. 10, therefore, it detects the third disc 110 (12 cm disc adaptor) and does not then detect the third disc 110 (12 cm disc adaptor) which is provided in contact with the roller member 103 when the third disc 110 (12 cm disc adaptor) is to be discharged from the disc inserting and discharging portion 100 as shown in FIG. 12.

As shown in FIG. 9, moreover, the light receiving unit 105d is provided in such a position as to detect the second disc 109 (ordinary 8 cm disc) and not to then detect the second disc 109

(ordinary 8 cm disc) which is provided in contact with the roller member 103 when the second disc 109 (ordinary 8 cm disc) passing through the other end 100c of the disc inserting and discharging portion 100 in the transverse direction is to be discharged from the disc inserting and discharging portion 100.

Figure 16:
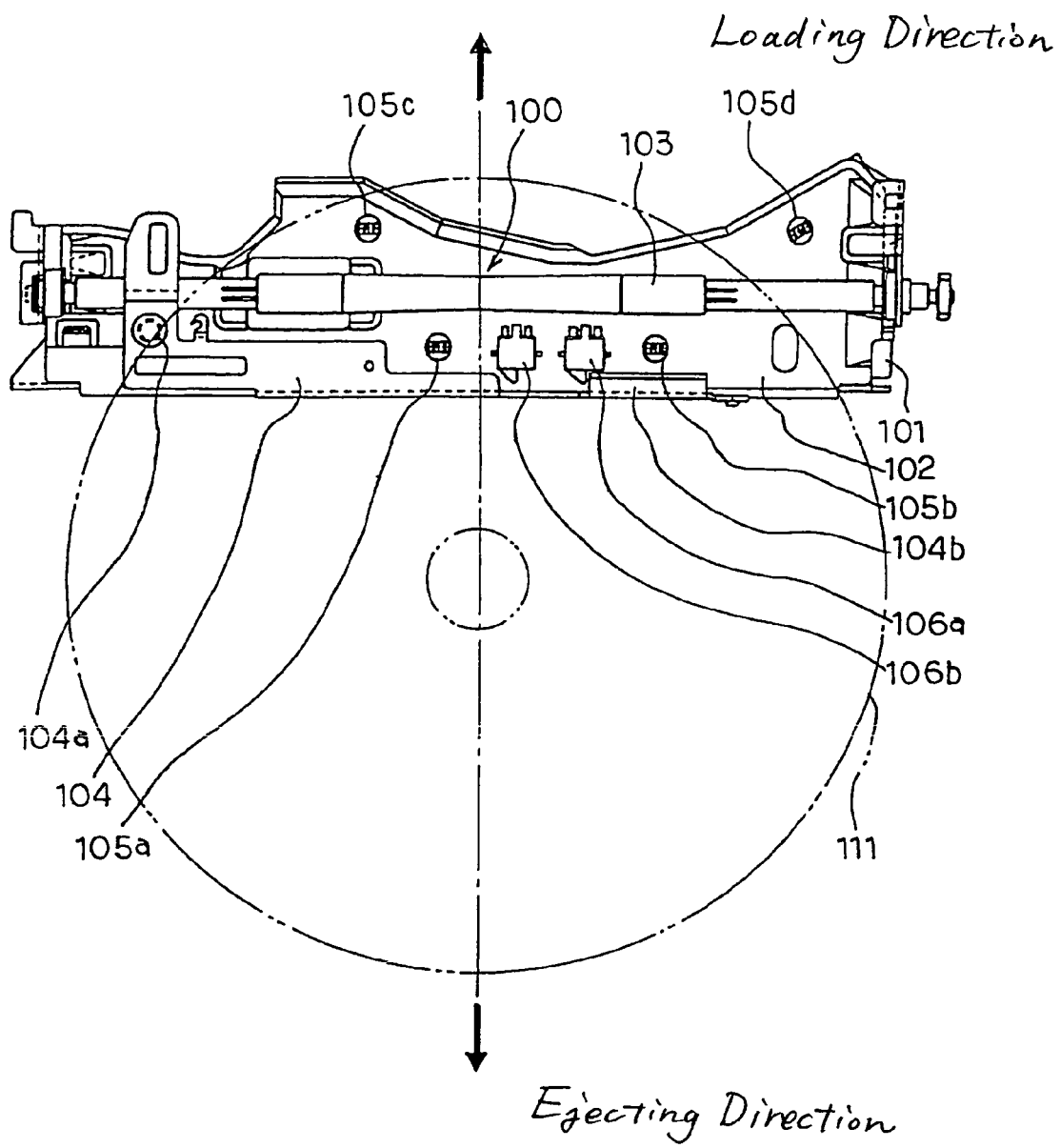
FIG. 16 is a top view showing the main part of the disc drive apparatus illustrated in FIG. 1 in the passage of the transparent first disc through the disc inserting and discharging portion in a different state from the state shown in FIG. 7.

As shown in FIG. 16, furthermore, the shaft portion 104a of the lever member 104 is provided in such a position that the push switch 106a detects the transparent 12 cm disc 111 and does not detect the transparent 12 cm disc 111 which is provided in contact with the roller member 103 when the transparent 12 cm disc 111 is to be discharged from the disc inserting and discharging portion 100.

The disc guide member 102, the roller member 103, a plurality of light receiving units 105a, 105b, 105c and 105d, a plurality of light emitting units making pairs with the light receiving units 105a, 105b, 105c and 105d, the lever member 104, the push switches 106a and 106b, and a control device which is not shown constitute a disc identifying device and a disc inserting and discharging apparatus. The control device constitutes identifying means for identifying the type of the disc passing through the disc inserting and discharging portion 100 based on the outputs of the light receiving units 105a, 105b, 105c and 105d and the push switches 106a and 106b and control means for controlling the disc inserting and discharging operation of the roller member 103 based on the result of an identification which is obtained by the identifying means.

The roller member 103 is provided in such a position that the identification of the disc by the control device is ended before the contact with the inserted disc is released.

Next, description will be given to the operation of the disc drive apparatus according to the embodiment. In the following, description will be given to an operation to be carried out in the case in which the disc drive apparatus delivers the first disc 107 (ordinary 12 cm disc), the fourth disc 108 (12 cm disc having a small data area) and the third disc 110 (12 cm disc adaptor) holding the second disc 109 (ordinary 8 cm disc) in a central part to a position in which loading is to be completed and forcibly discharges the third disc 110 (12 cm disc adaptor), the second disc 109 and the transparent 12 cm disc 111.

(1) An Operation for the First Disc 107 (Ordinary 12 cm Disc)

First of all, description will be given to the operation of the disc drive apparatus for the first disc 107. The disc drive apparatus according to the embodiment treats the third disc 110 (12 cm disc adaptor) holding the second disc 109 (ordinary 8 cm disc) in the central part in the same manner as the first disc 107 (ordinary 12 cm disc). For this reason, the description of the operation of the disc drive apparatus for the third disc 110 (12 cm disc adaptor) holding the second disc 109 in the central part will be omitted.

Figure 17:
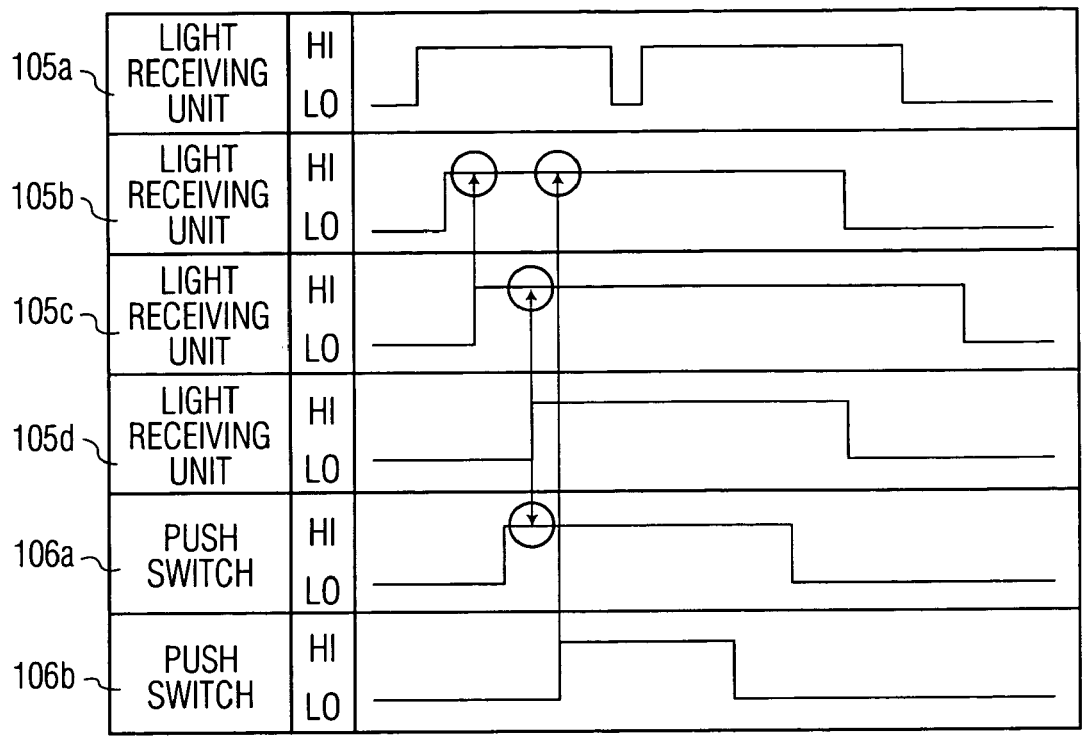
FIG. 17 is a timing chart showing the output of each detecting means of the disc drive apparatus illustrated in FIG. 1 in the passage of the ordinary first disc through the disc inserting and discharging portion.

When the first disc 107 (ordinary 12 cm disc) is inserted in the disc inserting and discharging portion 100 of the disc drive apparatus by a user, the light receiving unit 105a is provided on the upstream side in the direction of the insertion of the disc from the roller member 103 and in such a position as to detect the first disc 107 (ordinary 12 cm disc) inserted in the disc inserting and discharging portion 100 before the first disc 107 (ordinary 12 cm disc) comes in contact with the roller member 103 as described above. As shown in FIG. 17, therefore, the output of the light receiving unit 105a becomes Hi.

In the disc drive apparatus, the first disc 107 (ordinary 12 cm disc) is inserted in the disc inserting and discharging portion 100 by the user and the operation of a power source is started to begin the rotation of the roller member 103 when the output of the light receiving unit 105a becomes Hi.

When the first disc 107 (ordinary 12 cm disc) is further inserted by the user, the first disc 107 (ordinary 12 cm disc) and the roller member 103 come in contact with each other. Consequently, the auto-loading of the first disc 107 (ordinary 12 cm disc) is started so that the first disc 107 (ordinary 12 cm disc) is delivered to a posit-ion shown in FIG. 10, and furthermore, the outputs of the light receiving units 105b and 105c become Hi in order as shown in FIG. 17.

As described above, the light receiving unit 105b and the light receiving unit 105c are provided in such positions that the first disc 107 (ordinary 12 cm disc), the fourth disc 108 (12 cm disc having a small data area) and the third disc 110 (12 cm disc adaptor) are inserted in the disc inserting and discharging portion 100 and are detected by the light receiving unit 105b when they are to be first detected by the light receiving unit 105c as shown in FIGS. 10 to 12, and the second disc 109 (ordinary 8 cm disc) passing through the end 100a of the disc inserting and discharging portion 100 in the transverse direction is inserted in the disc inserting and discharging portion 100 and is not detected by the light receiving unit 105b when it is to be first detected by the light receiving unit 105c as shown in FIG. 13.

Since the output of the light receiving unit 105b is Hi when the output of the light receiving unit 105c becomes Hi, accordingly, the control device identifies that any of the first disc 107 (ordinary 12 cm disc), the fourth disc 108 (12 cm disc having a small data area), the second 15 disc 109 (ordinary 8 cm disc) passing through the central portion 100b of the disc inserting and discharging portion 100 in the transverse direction and the third disc 110 (12 cm disc adaptor) is inserted in the disc inserting and discharging portion 100 and causes the roller member 103 to continuously carry out the auto-loading of the first disc 107 (ordinary 12 cm disc).

When the first disc 107 (ordinary 12 cm disc) is further inserted by the roller member 103, the outputs of the push switch 106a and the light receiving unit 105d become Hi in order as shown in FIG. 17 while the first disc 107 (ordinary 12 cm disc) is delivered to a position shown in FIG. 14.

As described above, the shaft portion 104a of the lever member 104 and the light receiving unit 105d are provided in such positions that the first disc 107 (ordinary 12 cm disc) and the third disc 110 (12 cm disc adaptor) are inserted in the disc inserting and discharging portion 100 and are detected by the push switch 106a when they are to be first detected by the light receiving unit 105d as shown in FIGS. 14 and 15, and the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100b of the disc inserting and discharging portion 100 in the transverse direction are not detected by the light receiving unit 105d as shown in FIGS. 4, 5 and 8, and the second disc 109 (ordinary 8 cm disc) passing through the other end 100c of the disc inserting and discharging portion 100 in the transverse direction is inserted in the disc inserting and discharging portion 100, and is not detected by the push switch 106a when it is to be first detected by the light receiving unit 105d as shown in FIG. 9.

Since the output of the push switch 106a is Hi when the output of the light receiving unit 105d becomes Hi, accordingly, the control device identifies that the first disc 107 (ordinary 12 cm disc) or the third disc 110 (12 cm disc adaptor) is inserted in the disc inserting and discharging portion 100 and causes the roller member 103 to continuously carry out the auto-loading of the first disc 107 (ordinary 12 cm disc).

As described above, moreover, the light receiving unit 105d and the light receiving unit 105c are provided in such positions that the first disc 107 (ordinary 12 cm disc) and the third disc 110 (12 cm disc adaptor) are inserted in the disc inserting and discharging portion 100 and are detected by the light receiving unit 105*c* when they are to be first detected by the light receiving unit 105*d* as shown in FIGS. 14 and 15, and the fourth disc 108 (12 cm disc having a small data area), the second disc 109 (ordinary 8 cm disc) passing through the end 100*a* of the disc inserting and discharging portion 100 in the transverse direction and the second disc 109 (ordinary 8 cm disc) passing through the central portion 10Db of the disc inserting and discharging portion 100 in the transverse direction are not detected by the light receiving unit 105*d* as shown in FIGS. 4, 5 and 8, and the second disc 109 (ordinary 8 cm disc) passing through the other end 100*c* of the disc inserting and discharging portion 100 in the transverse direction is inserted in the disc inserting and discharging portion 100 and is not detected by the light receiving unit 105*c* when it is to be first detected by the light receiving unit 105*d* as shown in FIG. 9.

Since the output of the light receiving unit 105*c* is Hi when the output of the light receiving unit 105*d* becomes Hi, accordingly, the control device can also decide that a disc other than the second disc 109 (ordinary 8 cm disc) passing through the other end 100*c* of the disc inserting and discharging portion 100 in the transverse direction is inserted in the disc inserting and discharging portion 100.

When the first disc 107 (ordinary 12 cm disc) is further inserted by the roller member 103, the output of the push switch 106*b* becomes Hi as shown in FIG. 17 while the first disc 107 (ordinary 12 cm disc) is delivered to a position shown in FIG. 3.

As described above, the light receiving unit 105*b* is provided in such a position as to detect the fourth disc 108 (12 cm disc having a small data area) when the fourth disc 108 (12 cm disc having a small data area) is to be detected by the push switch 106*b* as shown in FIG. 4, not to detect the second disc 109 (ordinary 8 cm disc) when the second disc 109 (ordinary 8 cm disc) passing through the end 100*a* of the disc inserting and discharging portion 100 in the transverse direction is to be detected by the push switch 106*b* as shown in FIG. 5, and not to detect the third disc 110 (12 cm disc adaptor) when the third disc 110 (12 cm disc adaptor) is to be detected by the push switch 106*b* as shown in FIG. 6.

Since the output of the light receiving unit 105*b* is Hi when the output of the push switch 106*b* becomes Hi, accordingly, the control device identifies that either the first disc 107 (ordinary 12 cm disc) or the first disc 108 having a small area is inserted in the disc inserting and discharging portion 100 and causes the roller member 103 to continuously carry out the auto-loading of the first disc 107 (ordinary 12 cm disc), thereby delivering the first disc 107 (ordinary 12 cm disc) to the position in which the loading is to be completed.

The completion of the loading of the first disc 107 (ordinary 12 cm disc) is detected by detecting means which is not shown.

In the case in which the disc drive apparatus discharges the first disc 107 (ordinary 12 cm disc) from an inside thereof, moreover, it is detected that the first disc 107 (ordinary 12 cm disc) is discharged from a disc housing portion (not shown) or a disc recording and reproducing portion (not shown) by detecting means which is not shown before the first disc 107 (ordinary 12 cm disc) comes in contact with the roller member 103.

When the disc drive apparatus detects that the first disc 107 (ordinary 12 cm disc) is discharged from the disc housing portion (not shown) or the disc recording and reproducing portion (not shown), it starts the operation of the power source, thereby beginning the rotation of the roller member 103.

When the first disc 107 (ordinary 12 cm disc) is further discharged by a mechanism which is not shown, the first disc 107 (ordinary 12 cm disc) and the roller member 103 come in contact with each other so that the auto-ejection of the first disc 107 (ordinary 12 cm disc) is started and the first disc 107 (ordinary 12 cm disc) is delivered to a position shown in FIG. 10.

When the first disc 107 (ordinary 12 cm disc) is delivered to the position shown in FIG. 10, the output of the light receiving unit 105*c* becomes Lo because the light receiving unit 105*c* is provided in such a position as to detect the first disc 107 (ordinary 12 cm disc) and not to then detect the first disc 107 (ordinary 12 cm disc) which is provided in contact with the roller member 103 when the first disc 107 (ordinary 12 cm disc) is to be discharged from the disc inserting and discharging portion 100 as described above.

Accordingly, the control device receives the fact that the output of the light receiving unit 105*c* becomes Lo and stops the operation of the power source, thereby completing the auto-ejection of the first disc 107 (ordinary 12 cm disc).

As shown in FIG. 10, when the output of the light receiving unit 105*c* becomes Lo, the contact of the first disc 107 (ordinary 12 cm disc) with the roller member 103 is not released. Consequently, the first disc 107 (ordinary 12 cm disc) can be prevented from being dropped from the disc drive apparatus and the auto-loading can also be started again by the manipulation of the user.

(2) An Operation for the 12 cm Disc having a Small Data Area (Fourth Disc)

Next, description will be given to the operation of the disc drive apparatus for the fourth disc 108 (12 cm disc having a small data area).

As described above, the fourth disc 108 (12 cm disc having a small data area) has only the second data area 108*a* (see FIG. 4), and the outer peripheral portion of the data area 108*a* is transparent. When the fourth disc 108 (12 cm disc having a small data area) is inserted in the disc inserting and discharging portion 100 of the disc drive apparatus by the user, a light from the light emitting unit to the light receiving unit is transmitted through the outer peripheral portion of the data area 108*a* of the fourth disc 108 (12 cm disc having a small data area), and therefore, the output of each light receiving unit is Lo before the fourth disc 108 (12 cm disc having a small data area) and the roller member 103 come in contact with each other.

Even if the fourth disc 108 (12 cm disc having a small data area) and the roller member 103 come in contact with each other, the operation of the power source is not started so that the auto-loading is not started until the data area 108*a* passes through the position of the light receiving unit 105*a* provided on the upstream side in the direction of the insertion of the disc from the roller member 103 as described above.

Figure 18:
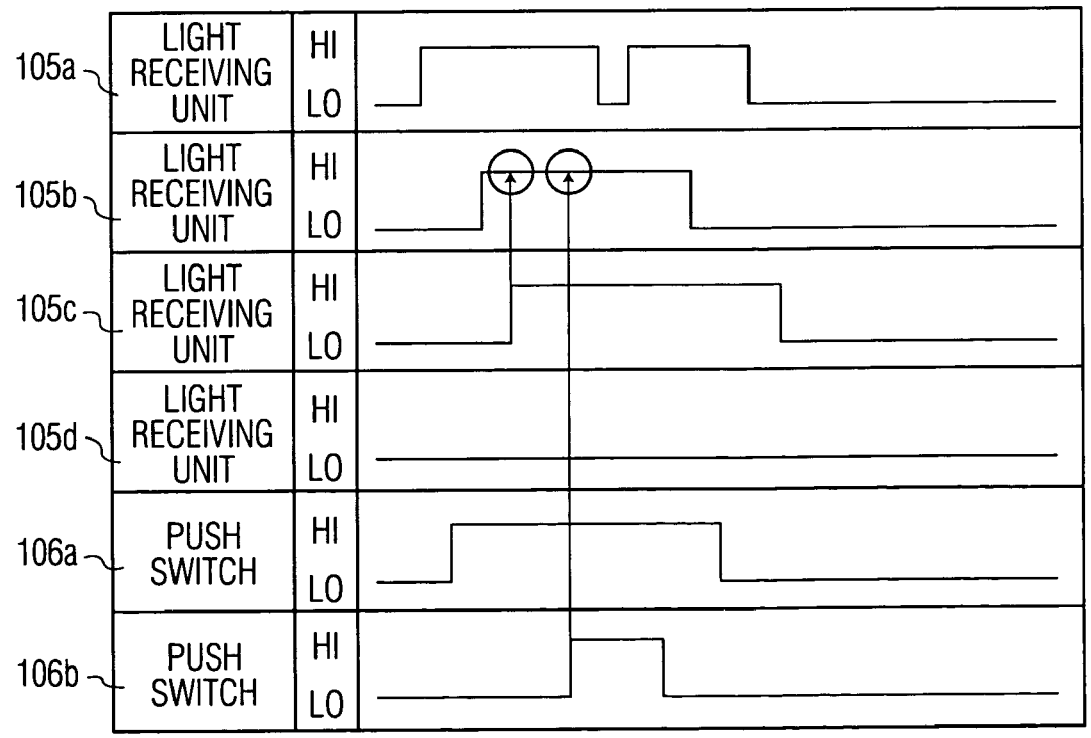
FIG. 18 is a timing chart showing the output of each detecting means of the disc drive apparatus illustrated in FIG. 1 in the passage of the 12 cm disc having a small data area (fourth disc) through the disc inserting and discharging portion.

In the disc drive apparatus, the fourth disc 108 (12 cm disc having a small data area) is inserted in the disc inserting and discharging portion 100 by the user, and the operation of the power source is started to begin the rotation of the roller member 103 when the output of the light receiving unit 105*a* becomes Hi as shown in FIG. 18.

When the rotation of the roller member 103 is started, the auto-loading of the fourth disc 108 (12 cm disc having a small data area) is started and the outputs of the push switch 106*a* and the light receiving units 105*b* and 105*c* become Hi in order because the fourth disc 108 (12 cm disc having a small data area) and the roller member 103 have already come in contact with each other.

As described above, the light receiving unit 105b and the light receiving unit 105c are provided in such positions that the first disc 107 (ordinary 12 cm disc), the fourth disc 108 (12 cm disc having a small data area) and the third disc 110 (12 cm disc adaptor) are inserted in the disc inserting and discharging portion 100 and are detected by the light receiving unit 105b when they are to be first detected by the light receiving unit 105c as shown in FIGS. 10 to 12, and the second disc 109 (ordinary 8 cm disc) passing through the end 100a of the disc inserting and discharging portion 100 in the transverse direction is inserted in the disc inserting and discharging portion 100 and is not detected by the light receiving unit 105b when it is to be first detected by the light receiving unit 105c as shown in FIG. 13.

Since the output of the light receiving unit 105b is Hi when the output of the light receiving unit 105c becomes Hi, accordingly, the control device identifies that any of the first disc 107 (ordinary 12 cm disc), the fourth disc 108 (12 cm disc having a small data area), the second disc 109 (ordinary 8 cm disc) passing through the central portion 100b of the disc inserting and discharging portion 100 in the transverse direction and the third disc 110 (12 cm disc adaptor) is inserted in the disc inserting and discharging portion 100 and causes the roller member 103 to continuously carry out the auto-loading of the fourth disc 108 (12 cm disc having a small data area).

When the fourth disc 108 (12 cm disc having a small data area) is further inserted by the roller member 103 and is delivered to a position shown in FIG. 4, the output of the push switch 106b becomes Hi as shown in FIG. 18.

As described above, the light receiving unit 105b is provided in such a position as to detect the fourth disc 108 (12 cm disc having a small data area) when the fourth disc 108 (12 cm disc having a small data area) is to be detected by the push switch 106b as shown in FIG. 4, not to detect the second disc 109 (ordinary 8 cm disc) when the second disc 109 (ordinary 8 cm disc) passing through the end 100a of the disc inserting and discharging portion 100 in the transverse direction is to be detected by the push switch 106b as shown in FIG. 5, and not to detect the third disc 110 (12 cm disc adaptor) when the third disc 110 (12 cm disc adaptor) is to be detected by the push switch 106b as shown in FIG. 6.

Since the output of the light receiving unit 105b is Hi when the output of the push switch 106b becomes Hi, accordingly, the control device identifies that either the first disc 107 (ordinary 12 cm disc) or the fourth disc 108 (12 cm disc having a small data area) is inserted in the disc inserting and discharging portion 100 and causes the roller member 103 to continuously carry out the auto-loading of the fourth disc 108 (12 cm disc having a small data area), thereby delivering the fourth disc 108 (12 cm disc having a small data area) to a position in which the loading is to be completed.

In the same manner as the case of the first disc 107 (ordinary 12 cm disc), the completion of the loading of the fourth disc 108 (12 cm disc having a small data area) is detected by detecting means which is not shown.

In the case in which the disc drive apparatus discharges the fourth disc 108 (12 cm disc having a small data area) from an inside thereof, moreover, it detects that the fourth disc 108 (12 cm disc having a small data area) is discharged from a disc housing portion (not shown) or a disc recording and reproducing portion (not shown) by detecting means which is not shown before the fourth disc 108 (12 cm disc having a small data area) comes in contact with the roller member 103.

When the disc drive apparatus detects that the fourth disc 108 (12 cm disc having a small data area) is discharged from the disc housing portion (not shown) or the disc recording and reproducing portion (not shown), it starts the operation of the power source, thereby beginning the rotation of the roller member 103.

When the fourth disc 108 (12 cm disc having a small data area) is further discharged by a mechanism which is not shown, the fourth disc 108 (12 cm disc having a small data area) and the roller member 103 come in contact with each other so that the auto-ejection of the fourth disc 108 (12 cm disc having a small data area) is started and the fourth disc 108 (12 cm disc having a small data area) is delivered to a position shown in FIG. 11.

When the fourth disc 108 (12 cm disc having a small data area) is delivered to the position shown in FIG. 11, the output of the light receiving unit 105c becomes Lo because the light receiving unit 105c is provided in such a position as to detect the fourth disc 108 (12 cm disc having a small data area) and not to then detect the fourth disc 108 (12 cm disc having a small data area) which is provided in contact with the roller member 103 when the fourth disc 108 (12 cm disc having a small data area) is to be discharged from the disc inserting and discharging portion 100 as described above.

Accordingly, the control device receives the fact that the output of the light receiving unit 105c becomes Lo and stops the operation of the power source, thereby completing the auto-ejection of the fourth disc 108 (12 cm disc having a small data area).

As shown in FIG. 11, when the output of the light receiving unit 105c becomes Lo, the contact of the fourth disc 108 (12 cm disc having a small data area) with the roller member 103 is not released. Consequently, the fourth disc 108 (12 cm disc having a small data area) can be prevented from being dropped from the disc drive apparatus and the auto-loading can also be started again by the manipulation of the user.

(3) An Operation for the Second Disc 109 (Ordinary 8 cm Disc) Passing Through the End 100a of the Disc Inserting and Discharging Portion 100 in the Transverse Direction Next, description will be given to the operation of the disc drive apparatus for the second disc 109 (ordinary 8 cm disc) passing through the end 100a of the disc inserting and discharging portion 100 in the transverse direction.

Figure 19:
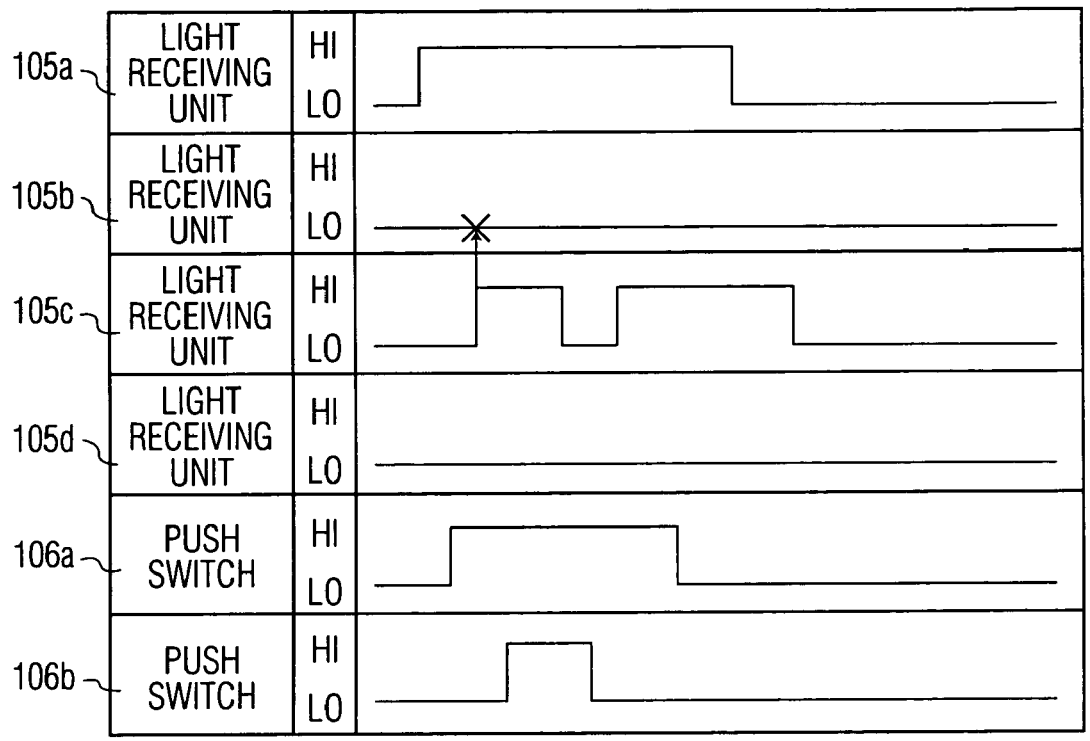
FIG. 19 is a timing chart showing the output of each detecting means of the disc drive apparatus illustrated in FIG. 1 in the passage of the ordinary second disc through one end of the disc inserting and discharging portion in the transverse direction.

When the second disc 109 (ordinary 8 cm disc) is inserted from the end 100a of the disc inserting and discharging portion 100 in the transverse direction into the disc inserting and discharging portion 100 in the disc drive apparatus by the user, the light receiving unit 105a is provided on the upstream side in the direction of the insertion of the disc from the roller member 103 and in such a position as to detect the second disc 109 (ordinary 8 cm disc) inserted in the disc inserting and discharging portion 100 and passing through the end 100a of the disc inserting and discharging portion 100 in the transverse direction before the second disc 109 (ordinary 8 cm disc) comes in contact with the roller member 103 as described above. As shown in FIG. 19, therefore, the output of the light receiving unit 105a becomes Hi.

In the disc drive apparatus, the second disc 109 (ordinary 8 cm disc) is inserted from the end 100a of the disc inserting and discharging portion 100 in the transverse direction into the disc inserting and discharging portion 100 by the user, and the operation of the power source is started to begin the rotation of the roller member 103 when the output of the light receiving unit 105a becomes Hi.

When the second disc 109 (ordinary 8 cm disc) is further inserted by the user, the second disc 109 (ordinary 8 cm disc)

and the roller member 103 come in contact with each other. Consequently, the auto-loading of the second disc 109 (ordinary 8 cm disc) is started so that the second disc 109 (ordinary 8 cm disc) is delivered to a position shown in FIG. 13, and furthermore, the outputs of the push switch 106a and the light receiving unit 105c become Hi in order as shown in FIG. 19.

As described above, the light receiving unit 105b and the light receiving unit 105c are provided in such positions that the first disc 107 (ordinary 12 cm disc), the fourth disc 108 (12 cm disc having a small data area) and the third disc 110 (12 cm disc adaptor) are inserted in the disc inserting and discharging portion 100 and are detected by the light receiving unit 105b when they are to be first detected by the light receiving unit 105c as shown in FIGS. 10 to 12, and the ordinary first disc 109 passing through the end 100a of the disc inserting and discharging portion 100 in the transverse direction is inserted in the disc inserting and discharging portion 100 and is not detected by the light receiving unit 105b when it is to be first detected by the light receiving unit 105c as shown in FIG. 13.

Since the output of the light receiving unit 105b is Lo when the output of the light receiving unit 105c becomes Hi, accordingly, the control device identifies that the second disc 109 (ordinary 8 cm disc) passing through the S end 100a of the disc inserting and discharging portion 100 in the transverse direction is inserted into the disc inserting and discharging portion 100, causes the roller member 103 to stop the auto-loading of the second disc 109 (ordinary 8 cm disc), and furthermore, reverses the rotating direction of a driving source, thereby starting the auto-ejection of the second disc 109 (ordinary 8 cm disc).

When the auto-ejection of the second disc 109 (ordinary 8 cm disc) is started and the second disc 109 (ordinary 8 cm disc) is delivered, the output of the light receiving unit 105c becomes Lo because the light receiving unit 105c is provided in such a position as to detect the second disc 109 (ordinary 8 cm disc) and not to then detect the second disc 109 (ordinary 8 cm disc) which is provided in contact with the roller member 103 when the second disc 10.9 (ordinary 8 cm disc) passing through the end 100a of the disc inserting and discharging portion 100 in the transverse direction is to be discharged from the disc inserting and discharging portion 100 as described above.

Accordingly, the control device receives the fact that the output of the light receiving unit 105c becomes Lo and stops the operation of the power source, thereby completing the auto-ejection of the second disc 109 (ordinary 8 cm disc).

As shown in FIG. 13, when the output of the light receiving unit 105c becomes Lo, the contact of the second disc 109 (ordinary 8 cm disc) with the roller member 103 is not released. Consequently, the second disc 109 (ordinary 8 cm disc) can be prevented from being dropped from the disc drive apparatus.

(4) An Operation for the Second Disc 109 (Ordinary 8 cm Disc) Passing Through the Central Portion 100b of the Disc Inserting and Discharging Portion 100 in the Transverse Direction Next, description will be given to the operation of the disc drive apparatus for the second disc 109 (ordinary 8 cm disc) passing through the central portion 100b of the disc inserting and discharging portion 100 in the transverse direction.

When the second disc 1.09 (ordinary 8 cm disc) is inserted from the central portion 100b of the disc inserting and discharging portion 100 in the transverse direction into the disc inserting and discharging portion 100 in the disc drive apparatus by the user, the output of the light receiving unit 105a becomes Hi as shown in Fib. 20 because the light receiving unit 105a is provided on the upstream side in the direction of the insertion of the disc from the roller member 103 and in such a position as to detect the second disc 109 (ordinary 8 cm disc) inserted in the disc inserting and discharging portion 100 and passing through the central portion 100b of the disc inserting and discharging portion 100 in the transverse direction before the second disc 109 (ordinary 8 cm disc) comes in contact with the roller member 103 as described above.

In the disc drive apparatus, the second disc 109 (ordinary 8 cm disc) is inserted from the central portion 100b of the disc inserting and discharging portion 100 in the transverse direction into the disc inserting and discharging portion 100 by the user and the operation of the power source is started to begin the rotation of the roller member 103 when the output of the light receiving unit 105a becomes Hi.

Figure 20:
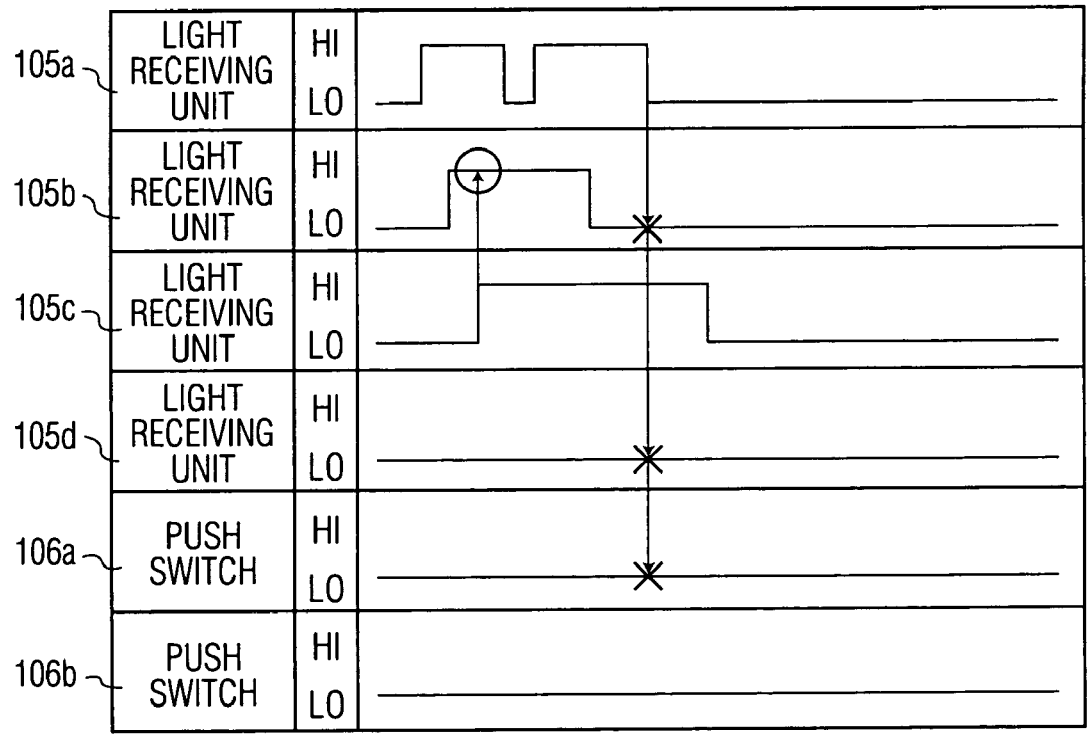
FIG. 20 is a timing chart showing the output of each detecting means of the disc drive apparatus illustrated in FIG. 1 in the passage of the ordinary second disc through the central portion of the disc inserting and discharging portion in the transverse direction.

When the second disc 109 (ordinary 8 cm disc) is further inserted by the user, the second disc 109 (ordinary 8 cm disc) and the roller member 103 come in contact with each other. Consequently, the auto-loading of the second disc 109 (ordinary 8 cm disc) is started so that the second disc 109 (ordinary 8 cm disc) is delivered to a position shown in FIG. 8, and furthermore, the outputs of the light receiving units 105b and 105c become Hi in order as shown in FIG. 20.

As described above, the light receiving unit 105b and the light receiving unit 105c are provided in such positions that the first disc 107 (ordinary 12 cm disc), the fourth disc 108 (12 cm disc having a small data area) and the third disc 110 (12 cm disc adaptor) are inserted in the disc inserting and discharging portion 100 and are detected s by the light receiving unit 105b when they are to be first detected by the light receiving unit 105c as shown in FIGS. 10 to 12, and the second disc 109 (ordinary 8 cm disc) passing through the end 100a of the disc inserting and discharging portion 100 in the transverse direction is inserted in the disc inserting and discharging portion 100 and is not detected by the light receiving unit 105b when it is to be first detected by the light receiving unit 105c as shown in FIG. 13.

Since the output of the light receiving unit 105b is Hi when the output of the light receiving unit 105c becomes Hi, accordingly, the control device identifies that a disc other than the second disc 109 (ordinary 8 cm disc) passing through the end 100a of the disc inserting and discharging portion 100 in the transverse direction is inserted into the disc inserting and discharging portion 100 and causes the roller member 103 to continuously carry out the auto-loading of the second disc 109 (ordinary 8 cm disc).

When the second disc 109 (ordinary 8 cm disc) is further inserted by the roller member 103, a light from the light emitting unit to the light receiving unit 105a passes through the central hole of the second disc 109 (ordinary 8 cm disc). As shown in FIG. 20, consequently, the output of the light receiving unit 105a is changed from Hi to Lo and is changed from Lo to Hi again, and the outputs of the light receiving units 105b and 105a become Lo in order as shown in FIG. 20.

The shaft portion 104a of the lever member 104, the light receiving unit 105a, the light receiving unit 105b and the light receiving unit 105d are provided in such positions that the first disc 107 (ordinary 12 cm disc), the fourth disc 108 (12 cm disc having a small data area), the second disc 109 (ordinary 8 cm disc) passing through the end 100a of the disc inserting and discharging portion 100 in the transverse direction, the third disc 110 (12 cm disc adaptor) and the second disc 109 (ordinary 8 cm disc) passing through the other end 100c of the disc inserting and discharging portion 100 in the transverse direction are inserted into the disc inserting and discharging portion 100, and are detected by at least one of the light receiving unit 105a and the light receiving unit 105b and are detected by at least one of the light receiving unit 105d and the push switch 106a before they are detected by neither the light receiving unit 105a nor the light receiving unit 105b as shown in FIGS. 3, 4, 5, 6 and 9, and the second disc 109 (ordinary 8 cm disc) passing through the central portion 100b of the disc inserting and discharging portion 100 in the transverse direction is inserted in the disc inserting and discharging portion 100, and is detected by at least one of the light receiving unit 105a and the light receiving unit 105b and is detected by neither the light receiving unit 105d nor the push switch 106a before it is detected by neither the light receiving unit 105a nor the light receiving unit 105b as shown in FIG. 8.

As shown in FIG. 20, accordingly, the second disc 109 (ordinary 8 cm disc) is inserted in the disc inserting and discharging portion 100, is detected by at least one of the light receiving unit 105a and the light receiving unit 105b and is detected by neither the light receiving unit 105d nor the push switch 106a before it is detected by neither the light receiving unit 105a nor the light receiving unit 105b. For this reason, the control device identifies that the second disc 109 (ordinary 8 cm disc) passing through the central portion 100b of the disc inserting and discharging portion 100 in the transverse direction is inserted into the disc inserting and discharging portion 100, causes the roller member 103 to stop the auto-loading of the second disc 109 (ordinary 8 cm disc), and furthermore, reverses the rotating direction of a driving source, thereby starting the auto-ejection of the second disc 109 (ordinary 8 cm disc).

When the auto-ejection of the second disc 109 (ordinary 8 cm disc) is started and the second disc 109 (ordinary 8 cm disc) is delivered to the position shown in FIG. 8, the output of the light receiving unit 105c becomes Lo because the light receiving unit 105c is provided in such a position as to detect the second disc 109 (ordinary 8 cm disc) and not to then detect the second disc 109 (ordinary 8 cm disc) which is provided in contact with the roller member 103 when the second disc 109 (ordinary 8 cm disc) passing through the central portion 100b of the disc inserting and discharging portion 100 in the transverse direction is to be discharged from the disc inserting and discharging portion 100 as described above.

Accordingly, the control device receives the fact that the output of the light receiving unit 105c becomes Lo and stops the operation of the power source, thereby completing the auto-ejection of the second disc 109 (ordinary 8 cm disc).

As shown in FIG. 8, when the output of the light receiving unit 105c becomes Lo, the contact of the second disc 109 (ordinary 8 cm disc) with the roller member 103 is not released. Consequently, the second disc 109 (ordinary 8 cm disc) can be prevented from being dropped from the disc drive apparatus.

(5) An Operation for the Second Disc 109 (Ordinary 8 cm disc) Passing Through the Other End 100c of the Disc Inserting and Discharging Portion 100 in the Transverse Direction Next, description will be given to the operation of the disc drive apparatus for the second disc 109 (ordinary 8 cm disc) passing through the other end 100c of the disc inserting and discharging portion 100 in the transverse direction.

Figure 21:
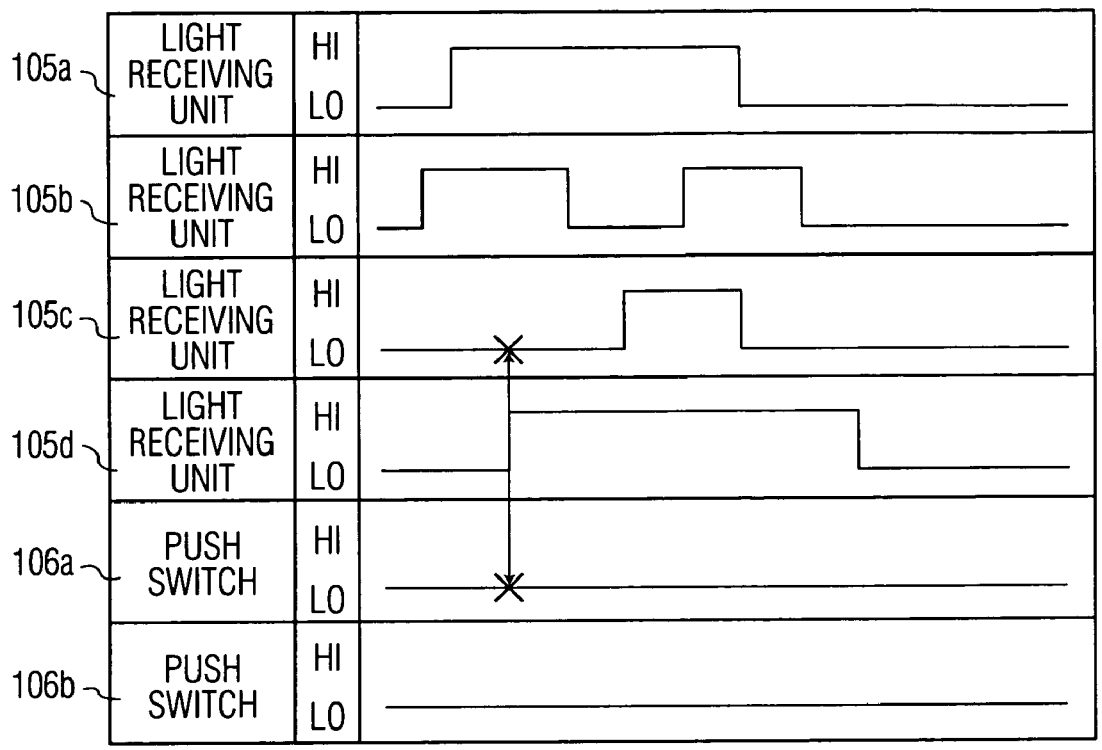
FIG. 21 is a timing chart showing the output of each detecting means of the disc drive apparatus illustrated in FIG. 1 in the passage of the ordinary second disc through the other end of the disc inserting and discharging portion in the transverse direction.

When the second disc 109 (ordinary 8 cm disc) is inserted from the other end 100c of the disc inserting and discharging portion 100 in the transverse direction into the disc inserting and discharging portion 100 in the disc drive apparatus by the user, the output of the light receiving unit 105b becomes Hi as shown in FIG. 21 because the light receiving unit 105b is provided on the upstream side in the direction of the insertion of the disc from the roller member 103 and in such a position as to detect the second disc 109 (ordinary 8 cm disc) inserted in the disc inserting and discharging portion 100 and passing through the other end 100c of the disc inserting and discharging portion 100 in the transverse direction before the second disc 109 (ordinary 8 cm disc) comes in contact with the roller member 103 as described above.

In the disc drive apparatus, the second disc 109 (ordinary 8 cm disc) is inserted from the other end 100c of the disc inserting and discharging portion 100 in the transverse direction into the disc inserting and discharging portion 100 by the user, and the operation of the power source is started to begin the rotation of the roller member 103 when the output of the light receiving unit 105b becomes Hi.

When the second disc 109 (ordinary 8 cm disc) is further inserted by the user, the second disc 109 (ordinary 8 cm disc) and the roller member 103 come in contact with each other. Consequently, the auto-loading of the second disc 109 (ordinary 8 cm disc) is started so that the second disc 109 (ordinary 8 cm disc) is delivered to a position shown in FIG. 9, and furthermore, the outputs of the light receiving units 105a and 105d become Hi in order as shown in FIG. 21.

As described above, the light receiving unit 105d and the light receiving unit 105c are provided in such positions that the first disc 107 (ordinary 12 cm disc) and the third disc 110 (12 cm disc adaptor) are inserted in the disc inserting and discharging portion 100 and are detected by the light receiving unit 105c when they are to be first detected by the light receiving unit 105d as shown in FIGS. 14 and 15, and the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100b of the disc inserting and discharging portion 100 in the transverse direction are not detected by the light receiving unit 105d as shown in FIGS. 4, 5 and 8, and the second disc 109 (ordinary 8 cm disc) passing through the other end 100c of the disc inserting and discharging portion 100 in the transverse direction is inserted in the disc inserting and discharging portion 100 and is not detected by the light receiving unit 105c when it is to be first detected by the light receiving unit 105d as shown in FIG. 9.

As described above, moreover, the shaft portion 104a of the lever member 104 and the light receiving unit 105d are provided in such positions that the first disc 107 (ordinary 12 cm disc) and the third disc 110 (12 cm disc adaptor) are inserted in the disc inserting and discharging portion 100 and are detected by the push switch 106a when they are to be first detected by the light receiving unit 105d as shown in FIGS. 14 and 15, and the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100b of the disc inserting and discharging portion 100 in the transverse direction are not detected by the light receiving unit 105d as shown in FIGS. 4, 5 and 8, and the second disc 109 (ordinary 8 cm disc) passing through the other end 100c of the disc inserting and discharging portion 100 in the transverse direction is inserted in the disc inserting and discharging portion 100 and is not detected by the push switch 106a when it is to be first detected by the light receiving unit 105d as shown in FIG. 9.

Since the outputs of the light receiving unit 105c and the push switch 106a are Lo when the output of the light receiving unit 105d becomes Hi, accordingly, the control device identifies that the second disc 109 (ordinary 8 cm disc) passing through the other end 100c of the disc inserting and discharging portion 100 in the transverse direction is inserted into the disc inserting and discharging portion 100, causes the roller member 103 to stop the auto-loading of the second disc 109 (ordinary 8 cm disc), and furthermore, reverses the rotating direction of the driving source, thereby starting the auto-ejection of the second disc 109 (ordinary 8 cm disc).

When the auto-ejection of the second disc 109 (ordinary 8 cm disc) is started and the second disc 109 (ordinary 8 cm disc) is delivered, the output of the light receiving unit 105d becomes Lo because the light receiving unit 105d is provided in such a position as to detect the second disc 109 (ordinary 8 cm disc) and not to then detect the second disc 109 (ordinary 8 cm disc) which is provided in contact with the roller member 103 when the second disc 109 (ordinary 8 cm disc) passing through the other end 100c of the disc inserting and discharging portion 100 in the transverse direction is to be discharged from the disc inserting and discharging portion 100 as described above.

Accordingly, the control device receives the fact that the output of the light receiving unit 105d becomes Lo and stops the operation of the power source, thereby completing the auto-ejection of the second disc 109 (ordinary 8 cm disc).

As shown in FIG. 9, when the output of the light receiving unit 105d becomes Lo, the contact of the second disc 109 (ordinary 8 cm disc) with the roller member 103 is not released. Consequently, the second disc 109 (ordinary 8 cm disc) can be prevented from being dropped from the disc drive apparatus.

(6) An Operation for the Third Disc 110 (12 cm Disc Adaptor)

Next, description will be given to the operation of the disc drive apparatus for the third disc 110 (12 cm disc adaptor).

Figure 22:
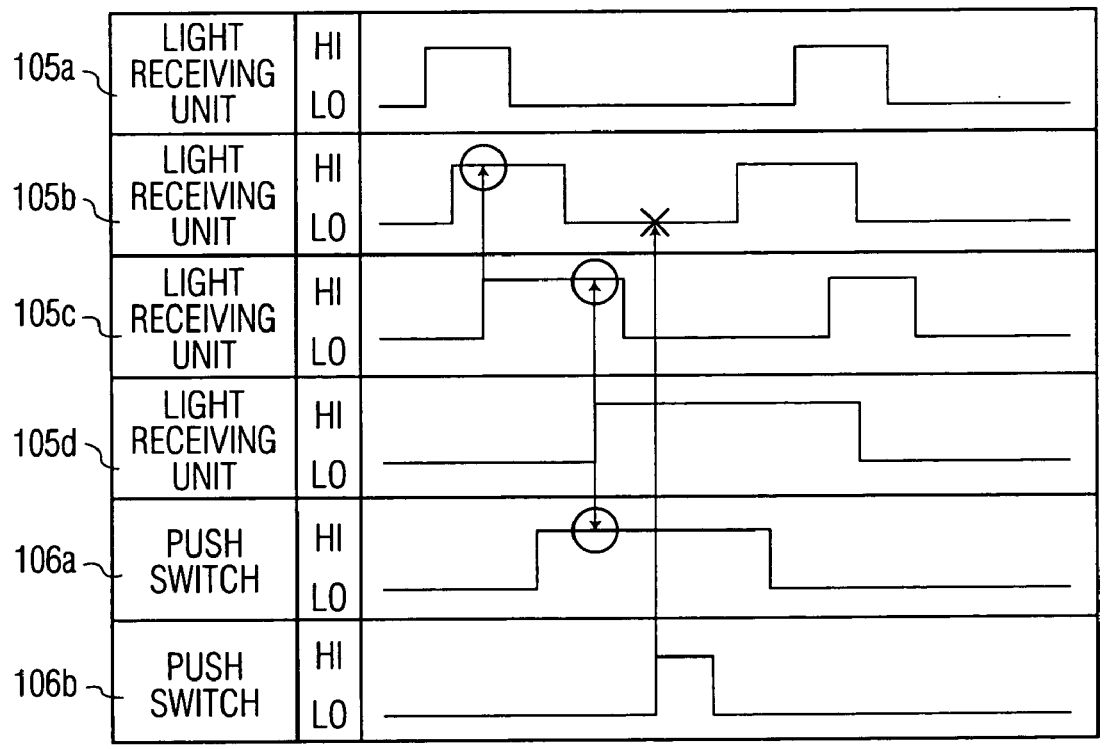
FIG. 22 is a timing chart showing the output of each detecting means of the disc drive apparatus illustrated in FIG. 1 in the passage of the 12 cm disc adaptor through the disc inserting and discharging portion.

When the third disc 110 (12 cm disc adaptor) is inserted in the disc inserting and discharging portion 100 of the disc drive apparatus by the user, the output of the light receiving unit 105a becomes Hi as shown in FIG. 22 because the light receiving unit 105a is provided on the upstream side in the direction of the insertion of the disc from the roller member 103 and in such a position as to detect the third disc 110 (12 cm disc adaptor) inserted in the disc inserting and discharging portion 100 before the third disc 110 (12 cm disc adaptor) comes in contact with the roller member 103 as described above.

In the disc drive apparatus, the third disc 110 (12 cm disc adaptor) is inserted in the disc inserting and discharging portion 100 by the user, and the operation of the power source is started to begin the rotation of the roller member 103 when the output of the light receiving unit 105a becomes Hi.

When the third disc 110 (12 cm disc adaptor) is further inserted by the user, the third disc 110 (12 cm disc adaptor) and the roller member 103 come in contact with each other. Consequently, the auto-loading of the third disc 110 (12 cm disc adaptor) is started so that the third disc 110 (12 cm disc adaptor) is delivered to a position shown in FIG. 12, and furthermore, the outputs of the light receiving units 105b and 105c become Hi in order as shown in FIG. 22.

As described above, the light receiving unit 105b and the light receiving unit 105c are provided in such positions that the first disc 107 (ordinary 12 cm disc), the fourth disc 108 (12 cm disc having a small data area) and the third disc 110 (12 cm disc adaptor) are inserted in the disc inserting and discharging portion 100 and are detected by the light receiving unit 105b when they are to be first detected by the light receiving unit 105c as shown in FIGS. 10 to 12, and the ordinary first disc 109 passing through the end 100a of the disc inserting and discharging portion 100 in the transverse direction is inserted in the disc inserting and discharging portion 100 and is not detected by the light receiving unit 105b when it is to be first detected by the light receiving unit 105c as shown in FIG. 13.

Since the output of the light receiving unit 105b is Hi when the output of the light receiving unit 105c becomes Hi, accordingly, the control device identifies that any of the first disc 107 (ordinary 12 cm disc), the fourth disc 108 (12 cm disc having a small data area), the second disc 109 (ordinary 8 cm disc) passing through the central portion 100b of the disc inserting and discharging portion 100 in the transverse direction and the third disc 110 (12 cm disc adaptor) is inserted in the disc inserting and discharging portion 100 and causes the roller member 103 to continuously carry out the auto-loading of the third disc 110 (12 cm disc adaptor).

When the third disc 110 (12 cm disc adaptor) is further inserted by the roller member 103, the outputs of the push switch 106a and the light receiving unit 105d become Hi in order as shown in FIG. 22 while the third disc 110 (12 cm disc adaptor) is delivered to a position shown in FIG. 15.

As described above, the shaft portion 104a of the lever member 104 and the light receiving unit 105d are provided in such positions that the first disc 107 (ordinary 12 cm disc) and the third disc 110 (12 cm disc adaptor) are inserted in the disc inserting and discharging portion 100 and are detected by the push switch 106a when they are to be first detected by the light receiving unit 105d as shown in FIGS. 14 and 15, and the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100b of the disc inserting and discharging portion 100 in the transverse direction are not detected by the light receiving unit 105d as shown in FIGS. 4, 5 and 8, and the second disc 109 (ordinary 8 cm disc) passing through the other end 100c of the disc inserting and discharging portion 100 in the transverse direction is inserted in the disc inserting and discharging portion 100 and is not detected by the push switch 106a when it is to be first detected by the light receiving unit 105d as shown in FIG. 9.

Since the output of the push switch 106a is Hi when the output of the light receiving unit 105d becomes Hi, accordingly, the control device identifies that either the first disc 107 (ordinary 12 cm disc) or the third disc 110 (12 cm disc adaptor) is inserted in the disc inserting and discharging portion 100 and causes the roller member 103 to continuously carry out the auto-loading of the third disc 110 (12 cm disc adaptor).

As described above, moreover, the light receiving unit 105d and the light receiving unit 105c are provided in such positions that the first disc 107 (ordinary 12 cm disc) and the third disc 110 (12 cm disc adaptor) are inserted in the disc inserting and discharging portion 100 and are detected by the light receiving unit 105c when they are to be first detected by the light receiving unit 105d as shown in FIGS. 14 and 15, and the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100b of the disc inserting and discharging portion 100 in the transverse direction are not detected by the light receiving unit 105d as shown in FIGS. 4, 5 and 8, and the second disc 109 (ordinary 8 cm disc) passing through the other end 100c of the disc inserting and discharging portion 100 in the transverse direction is inserted in the disc inserting and discharging portion 100 and is not detected by the light receiving unit 105c when it is to be first detected by the light receiving unit 105d as shown in FIG. 9.

Since the output of the light receiving unit 105c is Hi when the output of the light receiving unit 105d becomes Hi, accordingly, the control device can also decide that a disc other than the second disc 109 (ordinary 8 cm disc) passing through the other end 100c of the disc inserting and discharging portion 100 in the transverse direction is inserted in the disc inserting and discharging portion 100.

When the third disc 110 (12 cm disc adaptor) is further inserted by the roller member 103, the output of the push switch 106b becomes Hi as shown in FIG. 22 while the third disc 110 (12 cm disc adaptor) is delivered to a position shown in FIG. 6.

When the output of the push switch 106b becomes Hi, a light from the light emitting unit to the light receiving unit 105b is transmitted through a hollow hole 110a formed in the central part of the third disc 110 (12 cm disc adaptor). Consequently, the output of the light receiving unit 105b becomes Lo.

As described above, the light receiving unit 105b is provided in such a position as to detect the fourth disc 108 (12 cm disc having a small data area) when the fourth disc 108 (12 cm disc having a small data area) is to be detected by the push switch 106b as shown in FIG. 4, not to detect the second disc 109 (ordinary 8 cm disc) when the second disc 109 (ordinary 8 cm disc) passing through the end 100a of the disc inserting and discharging portion 100 in the transverse direction is to be detected by the push switch 106b as shown in FIG. 5, and not to detect the third disc 110 (12 cm disc adaptor) when the third disc 110 (12 cm disc adaptor) is to be detected by the push switch 106b as shown in FIG. 6.

Accordingly, the output of the push switch 106a is Hi when the output of the light receiving unit 105d becomes Hi, and the output of the light receiving unit 105b is Lo when the output of the push switch *106b becomes Hi. Therefore, the control device identifies that the third disc 110 (12 cm disc adaptor) is inserted into the disc inserting and discharging portion 100, causes the roller member 103 to stop the auto-loading of the third disc 110 (12 cm disc adaptor), and furthermore, reverses the rotating direction of the driving source, thereby starting the auto-ejection of the third disc 110 (12 cm disc adaptor).

When the auto-ejection of the third disc 110 (12 cm disc adaptor) is started and the third disc 110 (12 cm disc adaptor) is delivered to the position shown in FIG. 12, the output of the light receiving unit 105c becomes Lo because the light receiving unit 105c is provided in such a position as to detect the third disc 110 (12 cm disc adaptor) and not to then detect the third disc 110 (12 cm disc adaptor) which is provided in contact with the roller member 103 when the third disc 110 (12 cm disc adaptor) is to be discharged from the disc inserting and discharging portion 100 as described above.

Accordingly, the control device receives the fact that the output of the light receiving unit 105c becomes Lo and stops the operation of the power source, thereby completing the auto-ejection of the third disc 110 (12 cm disc adaptor).

As shown in FIG. 16, when the output of the light receiving unit 105c becomes Lo, the contact of the third disc 110 (12 cm disc adaptor) with the roller member 103 is not released. Consequently, the third disc 110 (12 cm disc adaptor) can be prevented from being dropped from the disc drive apparatus.

(7) An Operation for the Transparent 12 cm Disc 111

Next, description will be given to the operation of the disc drive apparatus for the transparent 12 cm disc 111.

When the transparent 12 cm disc 111 is inserted in the disc inserting and discharging portion 100 of the disc drive apparatus by the user, a light from the light emitting unit to the light receiving unit is transmitted through the transparent 12 cm disc 111. Therefore, the output of each light receiving unit is Lo before the transparent 12 cm disc 111 and the roller member 103 come in contact with each other.

Even if the transparent 12 cm disc 111 and the roller member 103 come in contact with each other, the operation of the power source is not started so that the auto-loading is not started until the outer periphery of the transparent 12 cm disc 111 and the shaft portion 104a come in contact with each other to start the displacement of the lever member 104 in the direction shown in the arrow 204 (see FIG. 1).

In the disc drive apparatus, the transparent 12 cm disc 111 is inserted in the disc inserting and discharging portion 100 by the user so that the outer periphery of the transparent 12 cm disc 111 comes in contact with the shaft portion 104a of the lever member 104 provided on the upstream side in the direction of the insertion of the disc from the roller member 103 as shown in FIG. 16. Consequently, the lever member 104 starts a displacement in the direction shown in the arrow 204 (see FIG. 1). When the output of the push switch 106a becomes Hi as shown in FIG. 23, the operation of the power source is started to begin the rotation of the roller member 103.

Figure 23:
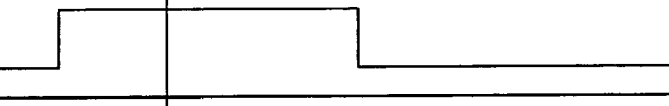
FIG. 23 is a timing chart showing the output of each detecting means of the disc drive apparatus illustrated in FIG. 1 in the passage of the transparent first disc through the disc inserting and discharging portion.

When the rotation of the roller member 103 is started, the auto-loading of the transparent 12 cm disc 111 is started, the transparent 12 cm disc 111 is delivered to the position shown in FIG. 7 and the output of the push switch 106b becomes Hi as shown in FIG. 23 because the transparent 12 cm disc 111 and the roller member 103 have already come in contact with each other.

As described above, the light receiving units 105a, 105b, 105c and 105d are provided in such positions that the first disc 107 (ordinary 12 cm disc), the fourth disc 108 (12 cm disc having a small data area), the second disc 109 (ordinary 8 cm disc) and the third disc 110 (12 cm disc adaptor) which are to be detected by the push switch 106b are detected by any of the light receiving units 105a, 105b, 105c and 105d as shown in FIGS. 3 to 6.

Since the outputs of all the light receiving units are Lo when the output of the push switch 106a becomes Hi, accordingly, the control device identifies that the transparent 12 cm disc 111 is inserted into the disc inserting and discharging portion 100, causes the roller member 103 to stop the auto-loading of the transparent 12 cm disc 111, and furthermore, reverses the rotating direction of the driving source, thereby starting the auto-ejection of the transparent 12 cm disc 111.

When the auto-ejection of the transparent 12 cm disc 111 is started and the transparent 12 cm disc 111 is delivered to a position shown in FIG. 16, the output of the push switch 106a becomes Lo because the shaft portion 104a of the lever member 104 is provided in such a position that the push switch 106a detects the transparent 12 cm disc 111 and does not then detect the transparent 12 cm disc 111 which is provided in contact with the roller member 103 when the transparent 12 cm disc 111 is to be discharged from the disc inserting and discharging portion 100 as described above.

Accordingly, the control device receives the fact that the output of the push switch 106a becomes Lo and stops the operation of the power source, thereby completing the auto-ejection of the transparent 12 cm disc 111.

As shown in FIG. 16, when the output of the push switch 106a becomes Lo, the contact of the transparent 12 cm disc 111 with the roller member 103 is not released. Consequently, the transparent 12 cm disc 111 can be prevented from being dropped from the disc drive apparatus.

As described above with reference to FIGS. 1 and 2, the disc drive apparatus has the projections 102a and 102b provided in the disc inserting and discharging portion 100 and the projection 101a provided on the base 101. Therefore, a plurality of discs can be hindered from being inserted into an inner part by one inserting operation and failures can be prevented.

In the disc drive apparatus, if the control device has such a structure that the roller member 103 is caused to discharge the disc after a constant time passes since the start of the insertion of the disc by the roller member 103, the disc can also be discharged to an outside when a plurality of discs is inserted into the inner part by one inserting operation.

In the case in which the push switch 106*b* is to detect the disc plural times when the disc is inserted in the roller member 103, moreover, the control device stops the inserting operation of the disc which is carried out by the roller member 103.

More detailed description will be given. In the disc drive apparatus, as shown in FIG. 24, when discs 112 and 113 having outside diameters of 12 cm such as the first disc 107 (ordinary 12 cm disc), the third disc 110 (12 cm disc adaptor) holding the second disc 109 (ordinary 8 cm disc) in a central part, the fourth disc 108 (12 cm disc having a small data area), the third disc 110 (12 cm disc adaptor) and the transparent 12 cm disc 111 are inserted into the inner part by the roller member 103, the output of the push switch 106*b* is changed from Lo to Hi and is changed from Hi to Lo by the disc 112 and is then changed from Lo to Hi and is changed from Hi to Lo again by the disc 113 while the output of the push switch 106*a* is Hi as shown in FIG. 25(*a*).

Figure 24:
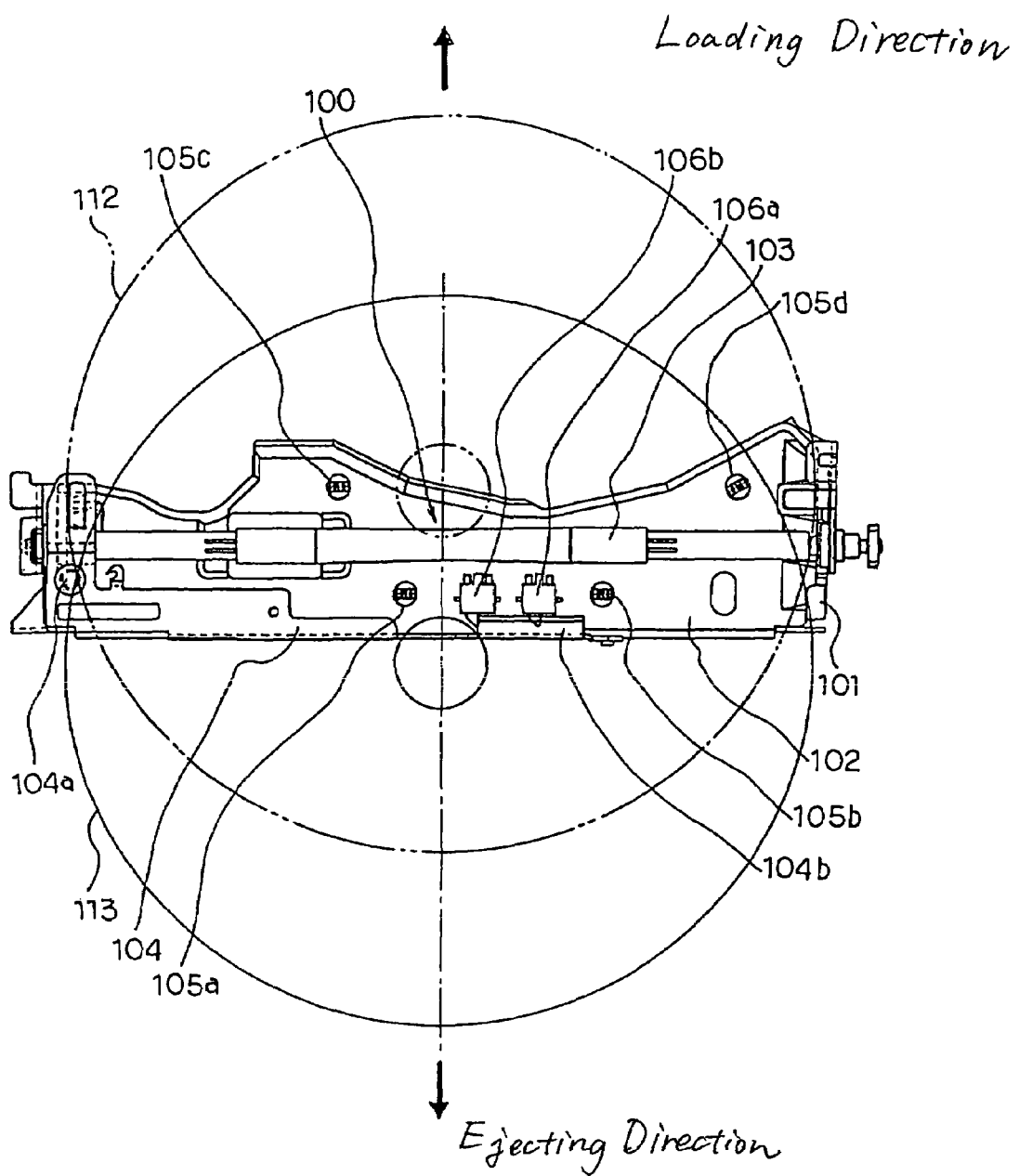
FIG. 24 is a top view showing the main part of the disc drive apparatus illustrated in FIG. 1 in the passage of two first discs through the disc inserting and discharging portion.

On the other hand, in the case in which the disc drive apparatus inserts only one disc having an outside diameter of 12 cm into the inner part by the roller member 103, the state shown in FIG. 24 is not brought. Therefore, the output of the push switch 106*b* is changed from Lo to Hi and is changed from Hi to Lo only once while the output of the push switch 106*a* is Hi as shown in FIG. 25(*b*).

Figure 25A:
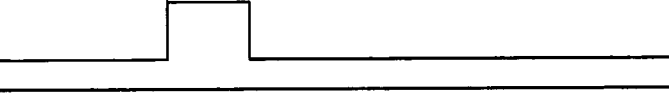
FIG. 25(a) is a timing chart showing the output of each detecting means of the disc drive apparatus illustrated in FIG. 1 in the passage of two first discs through the disc inserting and discharging portion and FIG. 25(b) is a timing chart showing the output of each detecting means of the disc drive apparatus illustrated in FIG. 1 in the passage of one first disc through the disc inserting and discharging portion.
Figure 25B:
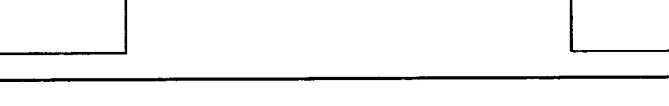

Accordingly, the disc drive apparatus can decide that a plurality of discs is inserted into the inner part when the output of the push switch 106*b* repeats the change from Lo to Hi and the change from Hi to Lo while the output of the push switch 106*a* is Hi as shown in FIG. 25(*a*).

In the case in which a plurality of discs is inserted into the inner part by one inserting operation, the disc drive apparatus stops the delivery of the disc. Consequently, a plurality of discs can be hindered from being inserted into the inner part by one inserting operation and failures can be prevented.

According to the invention, in the disc drive apparatus, the control device may have such a structure that the roller member 103 is caused to discharge the disc in the case in which the push switch 106*b* is to detect the disc plural times when the disc is inserted in the roller member 103. When a plurality of discs is inserted into the inner part by one inserting operation, the disc is discharged to the outside. Consequently, a plurality of discs can be hindered from being inserted into the inner part by one inserting operation and failures can be prevented.

As described above, the disc drive apparatus according to the embodiment can identify, insert, record and reproduce the fourth disc 108 (12 cm disc having a small data area) in the same manner as the first disc 107 (ordinary 12 cm disc).

In the above description, the disc drive apparatus has such a structure as to deliver the first disc 107 (ordinary 12 cm disc), the fourth disc 108 (12 cm disc having a small data area) and the third disc 110 (12 cm disc adaptor) holding the second disc 109 (ordinary 8 cm disc) in a central part to the position in which the loading is to be completed and to forcibly discharge the third disc 110 (12 cm disc adaptor), the second disc 109 and the transparent 12 cm disc 111. According to the invention, it is also possible to execute such a structure as to deliver the first disc 107 (ordinary 12 cm disc), the fourth disc 108 (12 cm disc having a small data area), the third disc 110 (12 cm disc adaptor) holding the second disc 109 (ordinary 8 cm disc) in the central part and the second disc 109 to the position in which the loading is to be completed and to forcibly discharge the third disc 110 (12 cm disc adaptor) and the transparent 12 cm disc 111.

Moreover, it is also possible to employ such a structure as to deliver at least one of the first disc 107 (ordinary 12 cm disc), the fourth disc 108 (12 cm disc having a small data area), the third disc 110 (12 cm disc adaptor) holding the second disc 109 (ordinary 8 cm disc) in the central part and the second disc 109 (ordinary 8 cm disc) passing through the end 100*a*, the central portion 100*b* and the other end 100*c* of the disc inserting and discharging portion 100 to the position in which the loading is to be completed and to forcibly discharge the residual ordinary second discs 109 passing through the end 100*a*, the central portion 10*o**b* and the other end 100*c* of the disc inserting and discharging portion 100 in the transverse direction, the third disc 110 (12 cm disc adaptor) and the transparent 12 cm disc 111.

In the disc drive apparatus according to the embodiment, moreover, in the case in which the light receiving unit 105*b* is to detect the disc when the push switch 106*b* detects the disc, the disc is delivered to the position in which the loading is to be completed because the disc inserted in the disc inserting and discharging portion 100 is any of the first disc 107 (ordinary 12 cm disc), the fourth disc 108 (12 cm disc having a small data area) and the third disc 110 (12 cm disc adaptor) holding the second disc 109 (ordinary 8 cm disc) in the central part. According to the invention, it is also possible to employ such a structure as to auto eject the disc in the case in which the light receiving unit 105*b* does not detect the disc when the lever member 104 and the push switch 106*b* are to detect the disc.

In the disc drive apparatus, the shaft portion 104*a* of the lever member 104 and the light receiving unit 105*b* are provided on the upstream side in the direction of the insertion of the disc from the roller member 103. Therefore, it is possible to insert the disc into the inner part or to discharge the disc to the outside before the disc is inserted by half or more to a downstream side in the direction of the insertion from the roller member 103, thereby starting the insertion or discharge by the roller member 103. Thus, an operation feeling can be enhanced.

In the embodiment, moreover, the light receiving unit 105*b* is provided in such a position as not to detect the second disc 109 (ordinary 8 cm disc) when the second disc 109 (ordinary 8 cm disc) passing through the end 100*a* of the disc inserting and discharging portion 100 in the transverse direction is to be detected by the push switch 106*b* as shown in FIG. 5. According to the invention, for example, the light receiving unit 105*b* may be provided in such a position as to detect the second disc 109 (ordinary 8 cm disc) when the second disc 109 (ordinary 8 cm disc) passing through the end 100*a* of the disc inserting and discharging portion 100 in the transverse direction is to be detected by the push switch 106*b* in the case in which the disc drive apparatus delivers the second disc 109 (ordinary 8 cm disc) passing through the end 100*a* of the disc inserting and discharging portion 100 in the transverse direction to the position in which the loading is to be completed.

In the case in which the light receiving unit 105*b* is provided in such a position as to detect the second disc 109 (ordinary 8 cm disc) when the second disc 109 (ordinary 8 cm disc) passing through the end 100*a* of the disc inserting and discharging portion 100 in the transverse direction is to be detected by the push switch 106*b*, the disc drive apparatus can identify the first disc 107 (ordinary 12 cm disc), the fourth disc 108 (12 cm disc having a small data area), the second disc 109 (ordinary 8 cm disc) passing through the end 100a of the disc inserting and discharging portion 100 in the transverse direction, and the third disc 110 (12 cm disc adaptor) holding the second disc 109 (ordinary 8 cm disc) in the central part and can insert them to the position in which the loading is to be completed by the fact that the light receiving unit 105b detects the disc when the push switch 106b is to detect the disc.

In the embodiment, moreover, the light receiving unit 105b and the light receiving unit 105c are provided in such positions that the first disc 107 (ordinary 12 cm disc), the fourth disc 108 (12 cm disc having a small data area) and the third disc 110 (12 cm disc adaptor) are inserted in the disc inserting and discharging portion 100 and are detected by the light receiving unit 105b when they are to be first detected by the light receiving unit 105c as shown in FIGS. 10 to 12, and the second disc 109 (ordinary 8 cm disc) passing through the end 100a of the disc inserting and discharging portion 100 in the transverse direction is inserted in the disc inserting and discharging portion 100 and is not detected by the light receiving unit 105b when it is to be first detected by the light receiving unit 105c as shown in FIG. 13. Consequently, the control device can identify the second disc 109 (ordinary 8 cm disc) passing through the end 100a of the disc inserting and discharging portion 100 in the transverse direction.

According to the invention, however, even if the light receiving unit 105b and the light receiving unit 105c are provided in such positions that the first disc 107 (ordinary 12 cm disc) and the third disc 110 (12 cm disc adaptor) are inserted in the disc inserting and discharging portion 100 and are detected by the light receiving unit 105b when they are to be first detected by the light receiving unit 105c, and the fourth disc 108 (12 cm disc having a small data area) is not detected by the light receiving unit 105c, and the second disc 109 (ordinary 8 cm disc) passing through the end 100a of the disc inserting and discharging portion 100 in the transverse direction is inserted in the disc inserting and discharging portion 100 and is not detected by the light receiving unit 105b when it is to be first detected by the light receiving unit 105c, the control device can identify the second disc 109 (ordinary 8 cm disc) passing through the end 100a of the disc inserting and discharging portion 100 in the transverse direction, which is not shown.

In the embodiment, moreover, the light receiving unit 105d and the light receiving unit 105c are provided in such positions that the first disc 107 (ordinary 12 cm disc) and the third disc 110 (12 cm disc adaptor) are inserted in the disc inserting and discharging portion 100 and are detected by the light receiving unit 105c when they are to be first detected by the light receiving unit 105d as shown in FIGS. 14 and 15, and the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100b of the disc inserting and discharging portion 100 in the transverse direction are not detected by the light receiving unit 105d as shown in FIGS. 4, 5 and 8, and the second disc 109 (ordinary 8 cm disc) passing through the other end 100c of the disc inserting and discharging portion 100 in the transverse direction is inserted in the disc inserting and discharging portion 100 and is not detected by the light receiving unit 105c when it is to be first detected by the light receiving unit 105d as shown in FIG. 9. Therefore, the control device can identify the second disc 109 (ordinary 8 cm disc) passing through the other end 100c of the disc inserting and discharging portion 100 in the transverse direction.

According to the invention, however, even if the light receiving unit 105d and the light receiving unit 105c are provided in such positions that the first disc 107 (ordinary 12 cm disc) and the third disc 110 (12 cm disc adaptor) are inserted in the disc inserting and discharging portion 100 and are detected by the light receiving unit 105c when they are to be first detected by the light receiving unit 105d, and at least one of the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100b of the disc inserting and discharging portion 100 in the transverse direction is inserted in the disc inserting and discharging portion 100 and is detected by the light receiving unit 105c when it is to be first detected by the light receiving unit 105d, and the others are not detected by the light receiving unit 105d, and the second disc 109 (ordinary 8 cm disc) passing through the other end 100c of the disc inserting and discharging portion 100 in the transverse direction is inserted in the disc inserting and discharging portion 100 and is not detected by the light receiving unit 105c when it is to be first detected by the light receiving unit 105d, the control device can identify the second disc 109 (ordinary 8 cm disc) passing through the other end 100c of the disc inserting and discharging portion 100 in the transverse direction, which is not shown.

According to the invention, moreover, even if the light receiving unit 105d and the light receiving unit 105c are provided in such positions that the first disc 107 (ordinary 12 cm disc) and the third disc 110 (12 cm disc adaptor) are inserted in the disc inserting and discharging portion 100 and are detected by the light receiving unit 105c when they are to be first detected by the light receiving unit 105d, and the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100b of the disc inserting and discharging portion 100 in the transverse direction are inserted in the disc inserting and discharging portion 100 and are detected by the light receiving unit 105c when they are to be first detected by the light receiving unit 105d, and the second disc 109 (ordinary 8 cm disc) passing through the other end 100c of the disc inserting and discharging portion 100 in the transverse direction is inserted in the disc inserting and discharging portion 100 and is not detected by the light receiving unit 105c when it is to be first detected by the light receiving unit 105d, the control device can identify the second disc 109 (ordinary 8 cm disc) passing through the other end 100c of the disc inserting and discharging portion 100 in the transverse direction, which is not shown.

In the embodiment, furthermore, the shaft portion 104a of the lever member 104 and the light receiving unit 105d are provided in such positions that the first disc 107 (ordinary 12 cm disc) and the third disc 110 (12 cm disc adaptor) are inserted in the disc inserting and discharging portion 100 and are detected by the push switch 106a when they are to be first detected by the light receiving unit 105d as shown in FIGS. 14 and 15, and the fourth disc 108 (12 cm disc having a small data area), the second disc 109 (ordinary 8 cm disc) passing through the end 100a of the disc inserting and discharging portion 100 in the transverse direction and the second disc 109 (ordinary 8 cm disc) passing through the central portion 100*b* of the disc inserting and discharging portion 100 in the transverse direction are not detected by the light receiving unit 105*d* as shown in FIGS. 4, 5 and 8, and the second disc 109 (ordinary 8 cm disc) passing through the other end 100*c* of the disc inserting and discharging portion 100 in the transverse direction is inserted in the disc inserting and discharging portion 100, and is not detected by the push switch 106*a* when it is to be first detected by the light receiving unit 105*d* as shown in FIG. 9. Consequently, the control device can identify the second disc 109 (ordinary 8 cm disc) passing through the other end 100*c* of the disc inserting and discharging portion 100 in the transverse direction.

According to the invention, however, even if the shaft portion 104*a* of the lever member 104 and the light receiving unit 105*d* are provided in such positions that the first disc 107 (ordinary 12 cm disc) and the third disc 110 (12 cm disc adaptor) are inserted in the disc inserting and discharging portion 100 and are detected by the push switch 106*a* when they are to be first detected by the light receiving unit 105*d*, and at least one of the fourth disc 108 (12 cm disc having a small data area), the second disc 109 (ordinary 8 cm disc) passing through the end 100*a* of the disc inserting and discharging portion 100 in the transverse direction and the second disc 109 (ordinary 8 cm disc) passing through the central portion 100*b* of the disc inserting and discharging portion 100 in the transverse direction is inserted in the disc inserting and discharging portion 100 and is detected by the push switch 106*a* when it is to be first detected by the light receiving unit 105*d*, and the others are not detected by the light receiving unit 105*d*, and the second disc 109 (ordinary 8 cm disc) passing through the other end 100*c* of the disc inserting and discharging portion 100 in the transverse direction is inserted in the disc inserting and discharging portion 100 and is not detected by the push switch 106*a* when it is to be first detected by the light receiving unit 105*d*, the control device can identify the second disc 109 (ordinary 8 cm disc) passing through the other end 100*c* of the disc inserting and discharging portion 100 in the transverse direction, which is not shown.

According to the invention, moreover, even if the shaft portion 104*a* of the lever member 104 and the light receiving unit 105*d* are provided in such positions that the first disc 107 (ordinary 12 cm disc) and the third disc 110 (12 cm disc adaptor) are inserted in the disc inserting and discharging portion 100 and are detected by the push switch 106*a* when they are to be first detected by the light receiving unit 105*d*, and the fourth disc 108 (12 cm disc having a small data area), the second disc 109 (ordinary 8 cm disc) passing through the end 100*a* of the disc inserting and discharging portion 100 in the transverse direction and the second disc 109 (ordinary 8 cm disc) passing through the central portion 100*b* of the disc inserting and discharging portion 100 in the transverse direction are inserted in the disc inserting and discharging portion 100 and are detected by the push switch 106*a* when they are to be first detected by the light receiving unit 105*d*, and the second disc 109 (ordinary 8 cm disc) passing through the other end 100*c* of the disc inserting and discharging portion 100 in the transverse direction is inserted in the disc inserting and discharging portion 100 and is not detected by the push switch 106*a* when it is to be first detected by the light receiving unit 105*d*, the control device can identify the second disc 109 (ordinary 8 cm disc) passing through the other end 100*c* of the disc inserting and discharging portion 100 in the transverse direction, which is not shown.

In the embodiment, moreover, the light receiving unit 105*b* is provided in such a position as to detect the disc passing by the light shielding of the disc, to detect the fourth disc 108 (12 cm disc having a small data area) when the fourth disc 108 (12 cm disc having a small data area) is to be detected by the push switch 106*b* as shown in FIG. 4, not to detect the second disc 109 (ordinary 8 cm disc) when the second disc 109 (ordinary 8 cm disc) passing through the end 100*a* of the disc inserting and discharging portion 100 in the transverse direction is to be detected by the push switch 106*b* as shown in FIG. 5, and not to detect the third disc 110 (12 cm disc adaptor) when the third disc 110 (12 cm disc adaptor) is to be detected by the push switch 106*b* as shown in FIG. 6, and the shaft portion 104*a* of the lever member 104 and the light receiving unit 105*d* are provided in such positions that the third disc 110 (12 cm disc adaptor) is inserted in the disc inserting and discharging portion 100 and is detected by the push switch 106*a* when it is to be first detected by the light receiving unit 105*d* as shown in FIG. 15, and the second disc 109 (ordinary 8 cm disc) passing through the end 100*a* of the disc inserting and discharging portion 100 in the transverse direction is not detected by the light receiving unit 105*d* as shown in FIG. 5. Consequently, the control device can identify the third disc 110 (12 cm disc adaptor).

According to the invention, however, even if the light receiving unit 105*b* is provided in such a position as to detect the disc passing by the light shielding of the disc, to detect the fourth disc 108 (12 cm disc having a small data area) when the fourth disc 108 (12 cm disc having a small data area) is to be detected by the push switch 106*b* as shown in FIG. 4, not to detect the second disc 109 (ordinary 8 cm disc) when the second disc 109 (ordinary 8 cm disc) passing through the end 100*a* of the disc inserting and discharging portion 100 in the transverse direction is to be detected by the push switch 106*b* as shown in FIG. 5, and not to detect the third disc 110 (12 cm disc adaptor) when the third disc 110 (12 cm disc adaptor) is to be detected by the push switch 106*b* as shown in FIG. 6, and the shaft portion 104*a* of the lever member 104 and the light receiving unit 105*d* are provided in such positions that the third disc 110 (12 cm disc adaptor) is inserted in the disc inserting and discharging portion 100 and is detected by the push switch 106*a* when it is to be first detected by the light receiving unit 105*d*, and the second disc 109 (ordinary 8 cm disc) passing through the end 100*a* of the disc inserting and discharging portion 100 in the transverse direction is inserted in the disc inserting and discharging portion 100 and is not detected by the push switch 106*a* when it is to be first detected by the light receiving unit 105*d*, which is not shown, the control device can identify the third disc 110 (12 cm disc adaptor).

In the embodiment, moreover, the control device identifies the second disc 109 (ordinary 8 cm disc) passing through the other end 100*c* of the disc inserting and discharging portion 100 in the transverse direction to control the insertion and discharge based on both the result of the detection of the light receiving unit 105*c* which is obtained when the light receiving unit 105*d* first detects the disc inserted in the disc inserting and discharging portion 100 and the result of the detection of the lever member 104 and the push switch 106*a* which is obtained when the light receiving unit 105*d* first detects the disc inserted in the disc inserting and discharging portion 100 as shown in FIG. 9. According to the invention, however, it is also possible to identify the second disc 109 (ordinary 8 cm disc) passing through the other end 100*c* of the disc inserting and discharging portion 100 in the transverse direction, thereby controlling the insertion and discharge based on only either of them.

In the embodiment, furthermore, in the disc drive apparatus, the light receiving unit 105*a* is provided on an upstream side in the direction of the insertion of the disc from the roller member 103 and in such a position as to detect the first disc 107 (ordinary 12 cm disc) (see FIG. 3) inserted in the disc inserting and discharging portion 100, the second disc 109 (ordinary 8 cm disc) (see FIG. 5) passing through the end 100a of the disc inserting and discharging portion 100 in the transverse direction and the second disc 109 (ordinary 8 cm disc) (see FIG. 8) passing through the central portion 100b of the disc inserting and discharging portion 100 in the transverse direction before the first disc 107 (ordinary 12 cm disc) (see FIG. 3), the second disc 109 (ordinary 8 cm disc) (see FIG. 5) passing through the end 100a of the disc inserting and discharging portion 100 in the transverse direction and the second disc 109 (ordinary 8 cm disc) (see FIG. 8) passing through the central portion 100b of the disc inserting and discharging portion 100 in the transverse direction come in contact with the roller member 103. Therefore, the roller member 103 is driven before the first disc 107 (ordinary 12 cm disc) (see FIG. 3), the second disc 109 (ordinary 8 cm disc) (see FIG. 5) passing through the end 100a of the disc inserting and discharging portion 100 in the transverse direction, the third disc 110 (12 cm disc adaptor) (see FIG. 6) having an outside diameter which is almost equal to that of the first disc 107 (ordinary 12 cm disc) or the second disc 109 (ordinary 8 cm disc) (see FIG. 8) passing through the central portion 100b of the disc inserting and discharging portion 100 in the transverse direction comes in contact with the roller member 103, and when the first disc 107 (ordinary 12 cm disc) (see FIG. 3), the second disc 109 (ordinary 8 cm disc) (see FIG. 5) passing through the end 100a of the disc inserting and discharging portion 100 in the transverse direction, the third disc 110 (12 cm disc adaptor) (see FIG. 6) or the second disc 109 (ordinary 8 cm disc) (see FIG. 8) passing through the central portion 100b of the disc inserting and discharging portion 100 in the transverse direction is manually inserted up to the roller member 103 and comes in contact with the roller member 103, the first disc 107 (ordinary 12 cm disc) (see FIG. 3), the second disc 109 (ordinary 8 cm disc) (see FIG. 5) passing through the end 100a of the disc inserting and discharging portion 100 in the transverse direction, the third disc 110 (12 cm disc adaptor) (see FIG. 6) or the second disc 109 (ordinary 8 cm disc) (see FIG. 8) passing through the central portion 100b of the disc inserting and discharging portion 100 in the transverse direction can be started to be inserted by the roller member 103. Thus, an operation feeling can be enhanced.

According to the invention, however, in the disc drive apparatus, the light receiving unit 105a is provided on the upstream side in the direction of the insertion of the disc from the roller member 103. Before the disc to be detected by the light receiving unit 105a is manually inserted by half or more at the downstream side in the direction of the insertion from the roller member 103 while coming in contact with the roller member 103, consequently, the disc can be started to be inserted by the roller member 103. Thus, the operation feeling can be enhanced.

In the embodiment, moreover, in the disc drive apparatus, the light receiving unit 105b is provided on the upstream side in the direction of the insertion of the disc from the roller member 103 and in such a position as to detect the second disc 109 (ordinary 8 cm disc) inserted in the disc inserting and discharging portion 100 and passing through the other end 100c of the disc inserting and discharging portion 100 in the transverse direction before the second disc 109 (ordinary 8 cm disc) comes in contact with the roller member 103. Before the second disc 109 (ordinary 8 cm disc) passing through the other end 100c of the disc inserting and discharging portion 100 in the transverse direction comes in contact with the roller member 103, therefore, the roller member 103 is driven, and the second disc 109 (ordinary 8 cm disc) can be started to be inserted by the roller member 103 when the second disc 109 (ordinary 8 cm disc) is manually inserted up to the roller member 103 and comes in contact with the roller member 103. Thus, the operation feeling can be enhanced.

According to the invention, however, the light receiving unit 105b is provided on the upstream side in the direction of the insertion of the disc from the roller member 103. Before the disc to be detected by the light receiving unit 105b is manually inserted by half or more at the downstream side in the direction of the insertion from the roller member 103 while coming in contact with the roller member 103, consequently, the disc can be started to be inserted by the roller member 103. Thus, the operation feeling can be enhanced.

In the embodiment, moreover, in the disc drive apparatus, the shaft portion 104a of the lever member 104 is provided on the upstream side in the direction of the insertion of the disc from the roller member 103. Before the disc to be detected by the push switch 106a is manually inserted by half or more at the downstream side in the direction of the insertion from the roller member 103 while coming in contact with the roller member 103, the disc can be started to be inserted by the roller member 103. Thus, the operation feeling can be enhanced.

In the invention, furthermore, in the disc drive apparatus, the shaft portion 104a of the lever 104 is provided on the upstream side in the direction of the insertion of the disc from the roller member 103. Before the disc to be detected by the lever member 104 and the push switch 106a is manually inserted by half or more at the downstream side in the direction of the insertion from the roller member 103 while coming in contact with the roller member 103, therefore, the disc can be started to be inserted by the roller member 103. Thus, the operation feeling can be enhanced.

In the disc drive apparatus, moreover, the roller member 103 is provided in such a position that the identification of the disc by the control device is ended before the contact with the disc in the insertion is released. While the disc is provided in contact with the roller member 103, therefore, it is possible to decide whether the disc is to be inserted into the inner part or discharged therefrom, thereby carrying out the insertion or discharge through the roller member 103. Thus, the disc to be discharged can be prevented from being inserted erroneously.

In the case in which the disc drive apparatus delivers the second disc 109 (ordinary 8 cm disc) to the position in which the loading is to be completed, moreover, it is preferable that the control device should constitute rotating force control means for controlling the rotating force of a turntable (not shown) to be rotating means for rotating the disc based on the outside diameter of the disc which is identified in the recording and reproduction of the disc.

In the case in which the disc drive apparatus delivers the second disc 109 (ordinary 8 cm disc) to the position in which the loading is to be completed and the control device constitutes the rotating force control means, the control device can identify the second disc 109 (ordinary 8 cm disc) including a data area having a diameter of 8 cm and having an outside diameter of 8 cm and the fourth disc 108 (12 cm disc having a small data area) including the data area having a diameter of 8 cm and having an outside diameter of 12 cm. Therefore, different rotating forces corresponding to the weights of the discs can be applied to the second disc 109 (ordinary 8 cm disc) and the fourth disc 108 (12 cm disc having a small data area), thereby rotating the second disc 109 (ordinary 8 cm disc) and the fourth disc 108 (12 cm disc having a small data area) at predetermined numbers of rotations which are equal to each other.

While the first disc and the second disc are set to be the ordinary first disc and the ordinary second disc respectively in the embodiment, the outside diameters of the first disc and the second disc do not need to be 12 cm and 8 cm in the invention.

In the embodiment, moreover, the description has been given to the example in which the fifth detecting means and the first detecting means are constituted by the lever member 104 and the push switches 106a and 106b. According to the invention, if the disc passing through the disc inserting and discharging portion 100 can be detected by the contact, the fifth detecting means and the first detecting means may have such a structure as to utilize neither the lever member 104 nor the push switches 106a and 106b, for example, to directly carry out a detection by the push switch without using the lever member 104, to utilize a photointerruptor or to utilize a photo LED and a phototransistor.

Second Embodiment

Another embodiment of the invention will be described below with reference to FIGS. 26 to 48, and FIG. 53.

Figure 26:
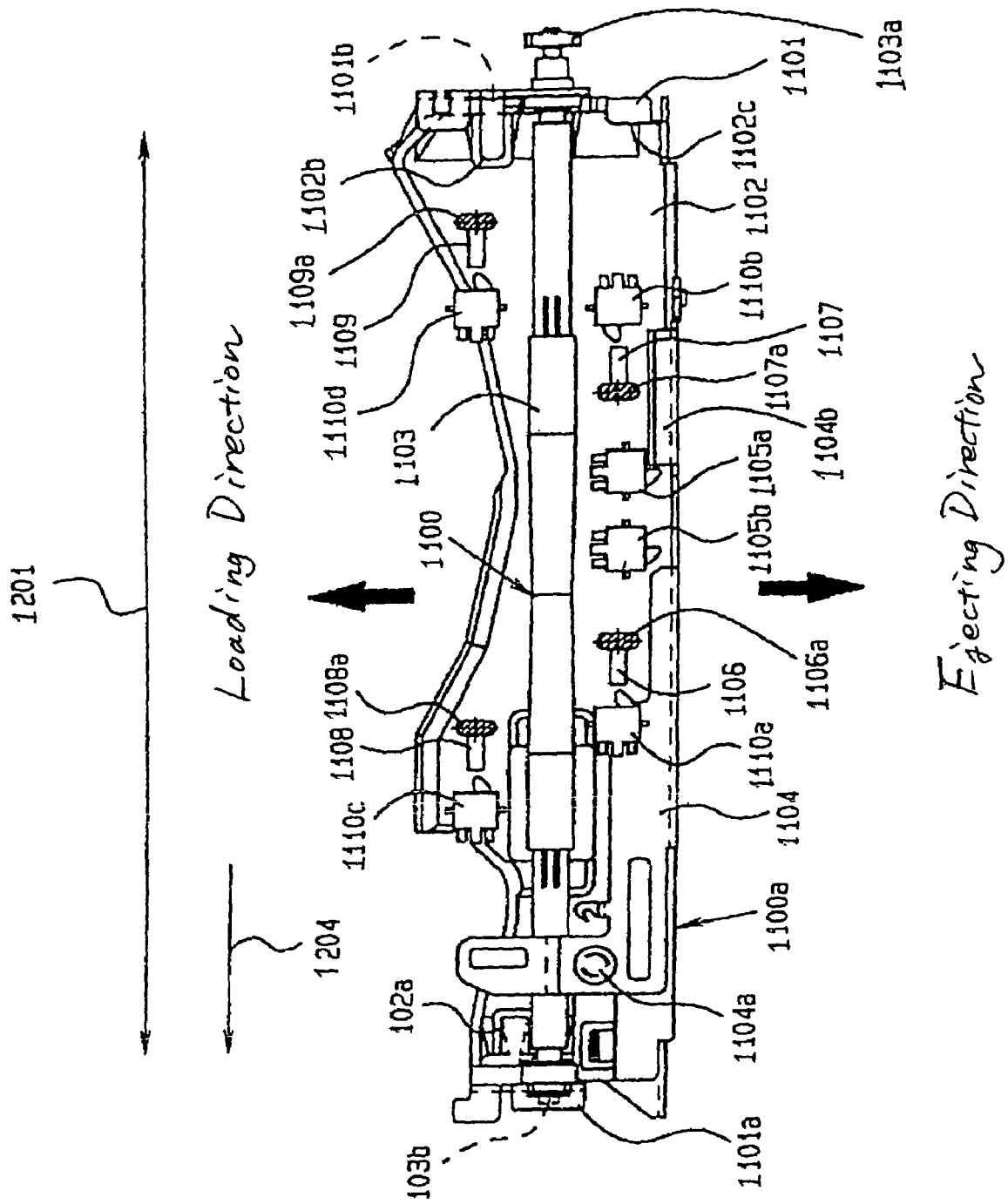
FIG. 26 is a top view showing the main part of a disc device according to a second embodiment of the invention.
Figure 27:
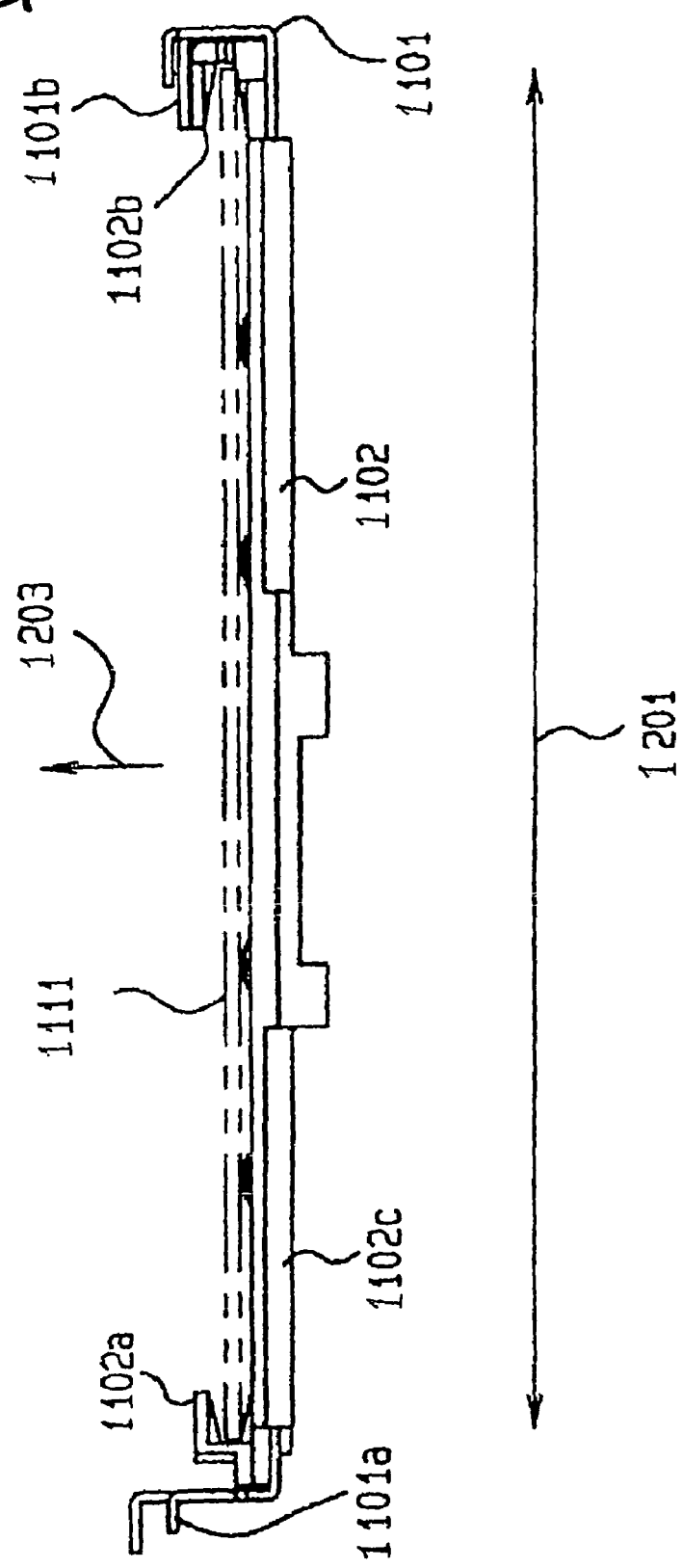
FIG. 27 is a front view showing the main part of the disc device illustrated in FIG. 26.
Figure 28:
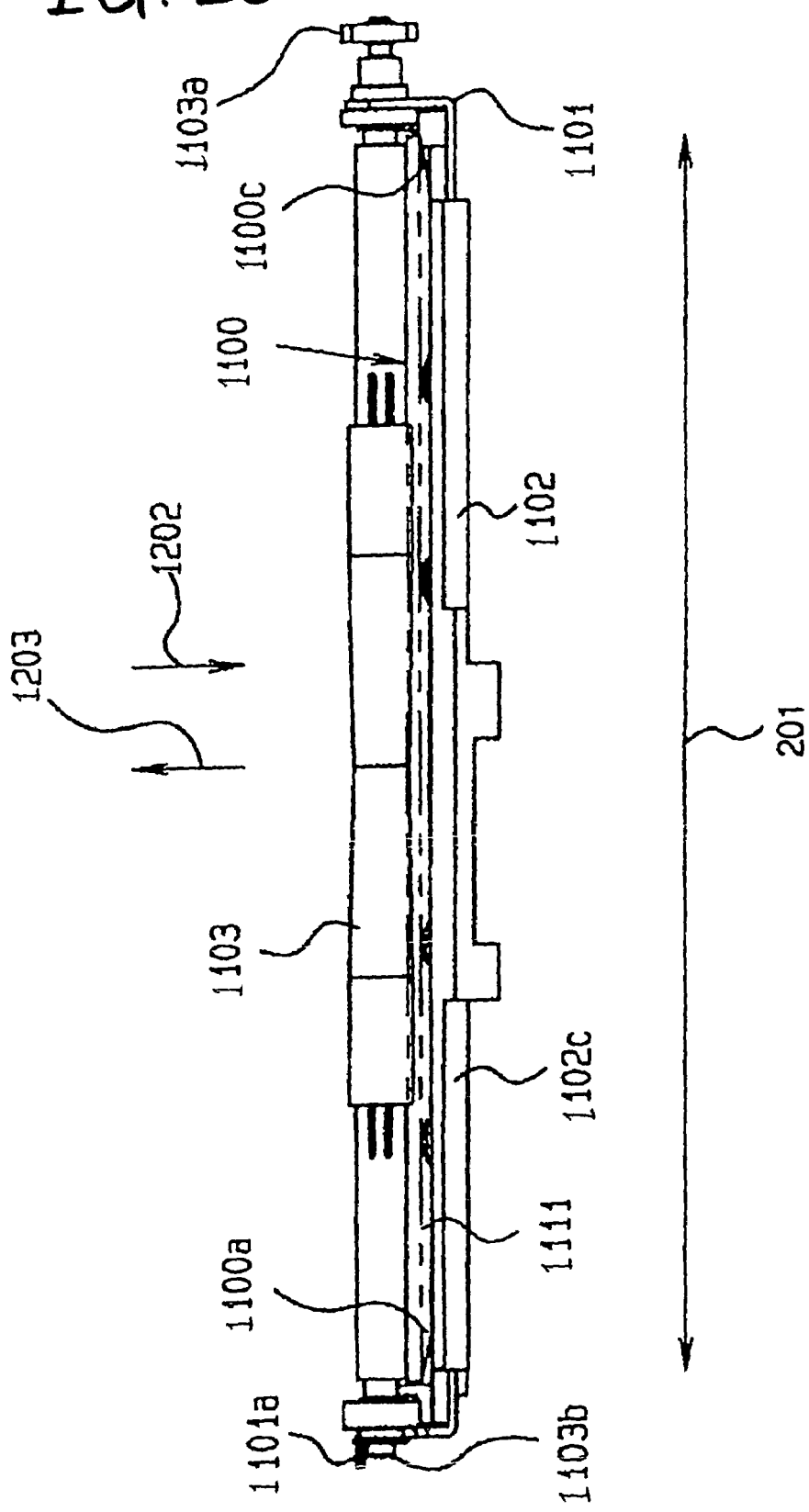
FIG. 28 is a front view showing the main part of the disc device illustrated in FIG. 26 in a different state from the state of FIG. 27.

In FIGS. 26, 27 and 28, the disc identifying mechanism (disc device) according to this embodiment comprises a base 1101, and the base 1101 is provided with a disc guide member 1102 for regulating a movement in a transverse direction (a direction shown in an arrow 1201) which is almost orthogonal to a direction of the passage of a disc such as an inserted first disc 1111 (that is, a loading direction and an ejecting direction) and for forming an insertion path, a roller member 1103 to be delivery means for coming in contact with the inserted disc to transmit a power, thereby delivering the disc and inserting (loading) and discharging (ejecting) the disc, an elastic member (not shown) for energizing the roller member 1103 in a downward direction with respect to the inserted disc (in a direction shown in an arrow 1202 in FIG. 28), and a power source (not shown) engaged with a gear 1103a provided on the roller member 1103 and serving to rotate the roller member 1103.

The disc guide member 1102 and the roller member 1103 interpose a disc inserted in the disc device therebetween and serve to deliver the disc in the loading direction or the ejecting direction, and form a disc inserting and discharging portion 1100 for inserting and discharging the disc. The disc inserting and discharging portion 1100 has a width (approximately 12 cm) which is almost equal to the outside diameter of the first disc in such a manner that discs such as a first disc and a second disc having a smaller outside diameter than that of the first disc can pass therethrough.

On the inner part side of the disc inserting and discharging portion 1100, the disc guide member 1102 is provided with projections 1102a and 1102b to be regulating portions for coming in contact with a disc to be inserted, thereby regulating the direction of the thickness of the disc to be inserted and controlling the passage of a plurality of discs which is superposed. Thus, a plurality of discs can be prevented from being simultaneously inserted in the disc device. More detailed description will be given. When one disc is inserted in the disc device, the inserted disc can pass between a body 1102c and the projections 1102a and 1102b in the disc guide member 1102. When a plurality of discs is inserted, the inserted discs cannot pass between the body 1102c and the projections 1102a and 1102b in the disc guide member 1102.

Furthermore, the base 1101 is provided with a projection 1101a to be limiting means for coming in contact with a shaft member 1103b provided on the center of the roller member 1103, thereby limiting the movement of the roller member 1103 in the direction of the thickness of the disc passing through the disc inserting and discharging section 1100 (a direction shown in an arrow 1203 in FIG. 27), and a projection 1101b for regulating the displacement is of the projection 1102b in an upward direction (the direction shown in the arrow 1203 in FIG. 27). Thus, a plurality of discs can be prevented from being simultaneously inserted in the disc device. More detailed description will be given. When one disc is inserted in the disc device, the inserted disc can pass between the disc guide member 1102 and the roller member 1103. When a plurality of discs is inserted, the projection 1101a of the base 1101 and the shaft member 1103b of the roller member 1103 come in contact with each other so that the inserted disc cannot pass between the disc guide member 1102 and the roller member 1103.

In addition, the disc device comprises a housing (not shown). On the roller member 1103 side with respect to the disc guide member 1102, the housing is provided with an upper board (not shown) including a lever member 1104 having a shaft portion 1104a for coming in contact with the outer periphery of a disc when the disc is inserted in the disc device, a lever member 1106 having a roller member 1106a for coming in contact with the roller member 1103 side of the disc when the disc is inserted in the disc device, a lever member 1107 having a roller member 1107a for coming in contact with the roller member 1103 side of the disc when the disc is inserted in the disc device, a lever member 1108 having a roller member 1108a for coming in contact with the roller member 1103 side of the disc when the disc is inserted in the disc device, a lever member 1109 having a roller member 1109a for coming in contact with the roller member 1103 side of the disc when the disc is inserted in the disc device, push switches 1105a and 1105b for coming in contact with a projection 1104b provided on the lever member 1104, thereby detecting the displacement of the lever member 1104, a push switch 1110a for coming in contact with a projection 1106b (see FIG. 29) provided on the lever member 1106, thereby detecting the displacement of the lever member 1106, a push switch 1110b for coming in contact with a projection 1107b provided on the lever member 1107, thereby detecting the displacement of the lever member 1107, a push switch 1110c for coming in contact with a projection 1108b provided on the lever member 1108, thereby detecting the displacement of the lever member 1108, and a push switch 1110d for coming in contact with a projection 1109b provided on the lever member 1109, thereby detecting the displacement of the lever member 1109, and an elastic member (not shown) for energizing the lever member 1104 in a position shown in FIG. 26 in the direction of the arrow 1201.

Figure 29:
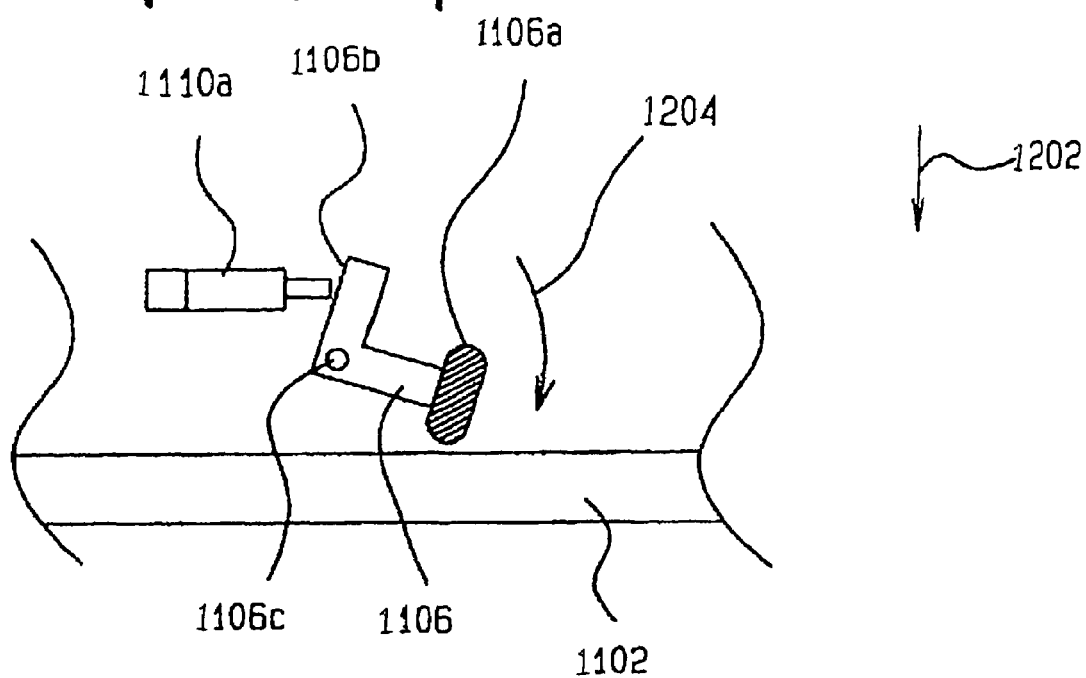
FIG. 29 is a front view showing the main part of thickness detecting means according to the embodiment of the invention.
Figure 30:
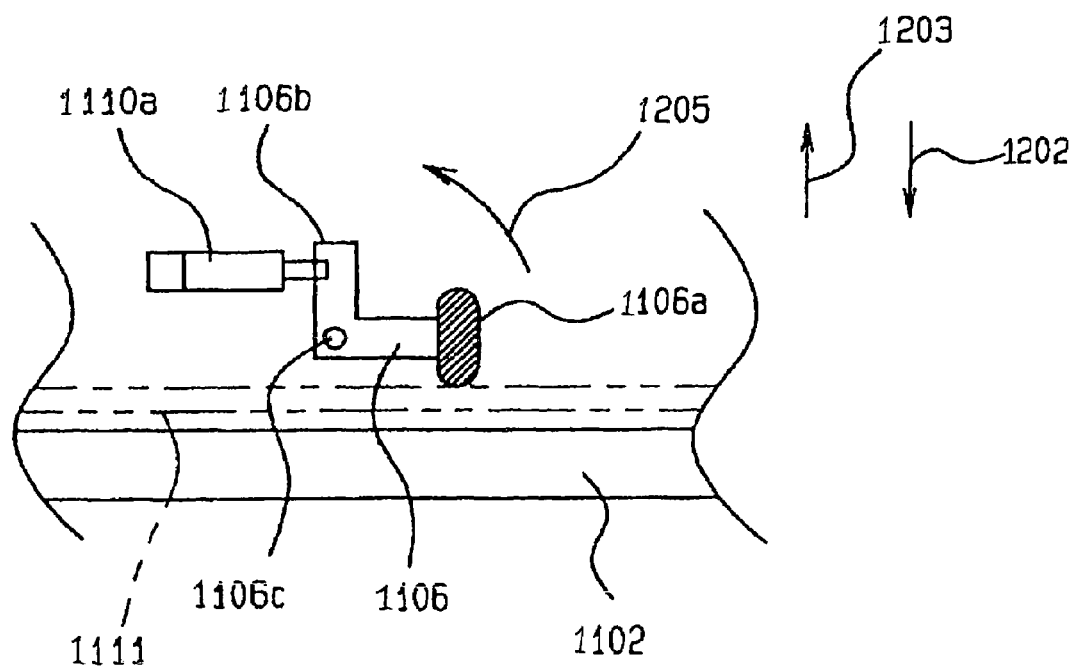
FIG. 30 is a front view showing the main part of the thickness detecting means illustrated in FIG. 26 in a different state from the state of FIG. 29.

Moreover, the disc device is provided with the roller member 1106a to come in contact with the disc, the lever member 1106 provided rotatably by setting a shaft member 1106c to be a fulcrum with respect to the housing (not shown), the push switch 1110a for coming in contact with the projection 1106b provided on the lever member 1106, thereby detecting the displacement of the lever member 1106, and an elastic member (not shown) for energizing the lever member 1106 in a direction of an arrow 1204 (see FIG. 26). More detailed description will be given. In a state in which the disc is not inserted in the disc device as shown in FIG. 29, the lever member 1106 is energized in the direction shown in the arrow 1204 by the elastic member (not shown), and the projection 1106b of the lever member 1106 is not provided in contact with the push switch 1110a. In the case in which the disc is inserted in the disc device, the roller member 1106a provided on the lever member 1106 comes in contact with the disc so that the lever member 1106 is rotated in a direction shown in an arrow 1205 and the projection 1106b of the lever member 1106 comes in contact with the push switch 1111a as shown in FIG. 30.

The lever member 1107 and the push switch 1110*b*, the lever member 1108 and the push switch 1110*c*, and the lever member 1109 and the push switch 1110*d* are also constituted in the same manner as the lever member 1106 and the push switch 1110*a*.

Moreover, the push switches 1105*a*, 1105*b*, 111*a*, 1110*b*, 1110*c* and 1110*d* serve to output Hi in a state in which the disc is detected, and to output Lo in a state in which the disc is not detected.

The shaft portion 1104*a* of the lever member 1104 is provided on an upstream side in the direction of insertion (loading) of the disc from the roller member 1103, and furthermore, the push switch 1105*a* is provided in such a position as to detect the displacement of the lever member 1104 immediately after the movement of the lever member 1104 in a leftward direction (the direction shown in the arrow 1204 (see FIG. 29)) is started by a contact of the outer peripheral portion of the inserted disc with the shaft portion 1104*a* of the lever member 1104.

Furthermore, the push switch 1105*b* is provided in such a position as to detect the maximum displacement of the lever member 1104 in the direction shown in the arrow 1204 (see FIG. 29) when the outer periphery of the inserted first disc 1111 comes in contact with the shaft portion 1104*a* of the lever member 1104. The lever member 1104 and the push switch 1105*b* constitute first detecting means for detecting a disc passing through one end 1100*a* of the disc inserting and discharging portion 1100 in a transverse direction by a contact with the disc.

Figure 31:
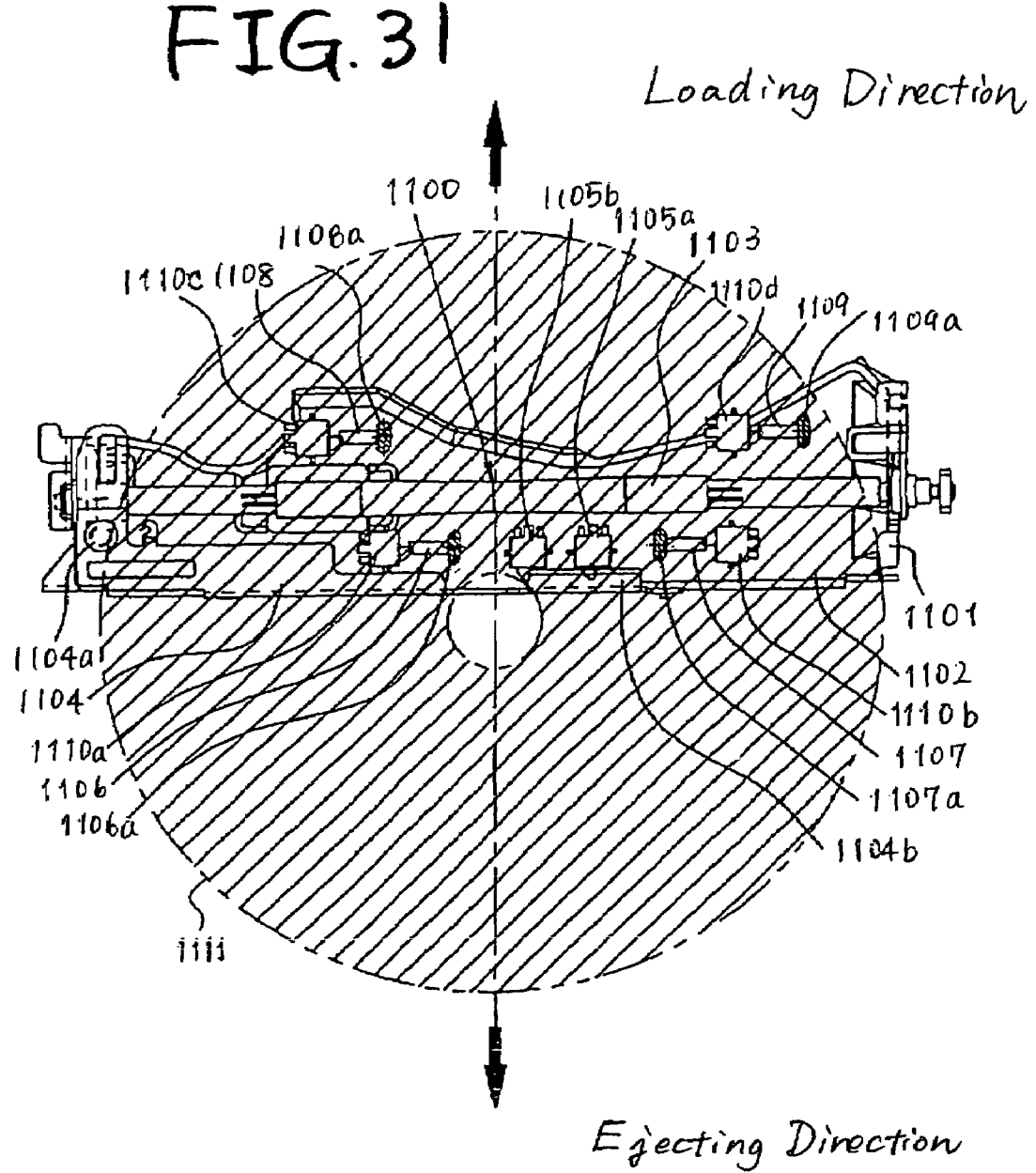
FIG. 31 is a top view showing the main part of the disc device illustrated in FIG. 26 in the passage of a first disc through a disc inserting and discharging portion.
Figure 32:
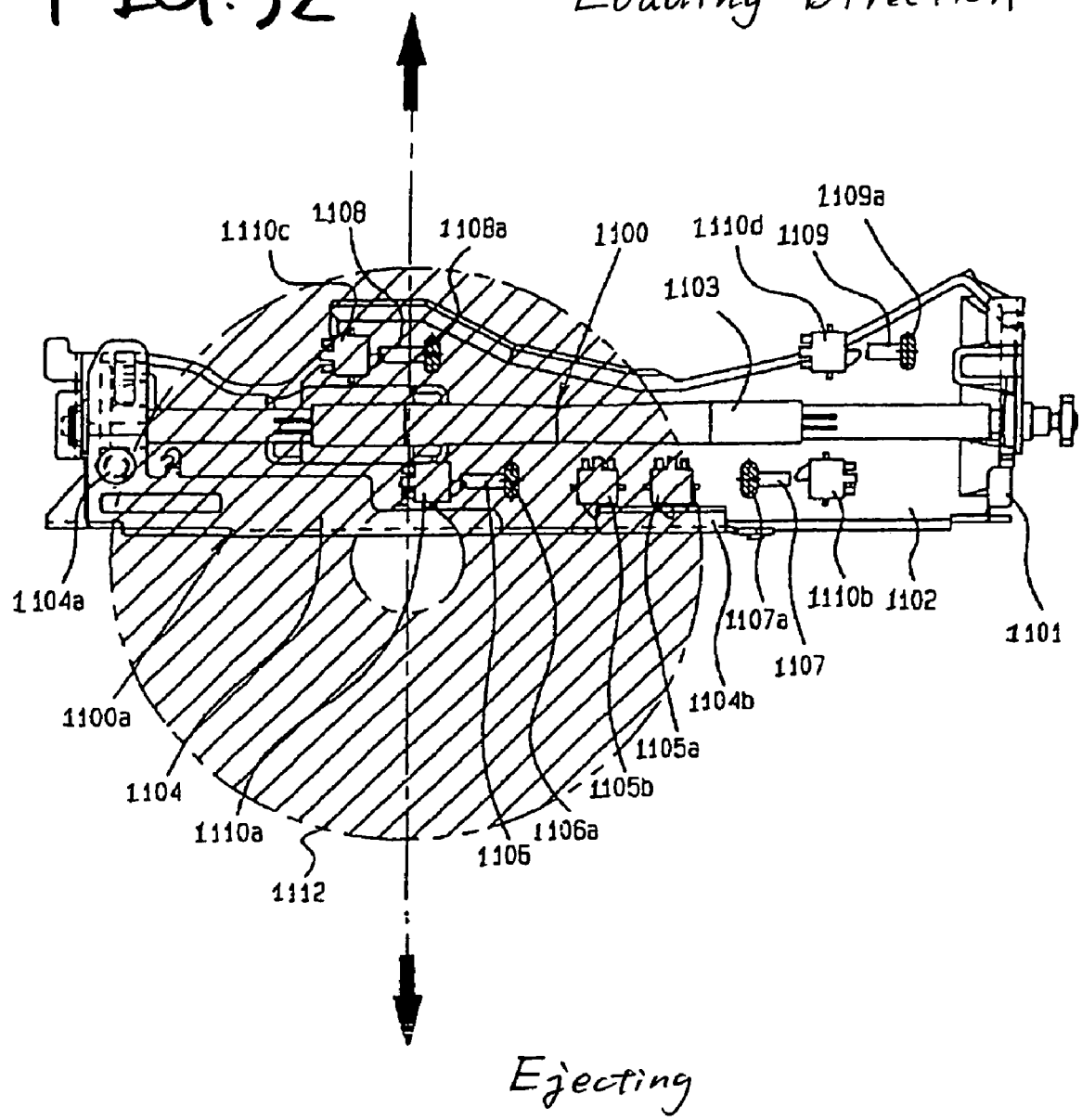
FIG. 32 is a top view showing the main part of the disc device illustrated in FIG. 26 in the passage of a second disc through one end of the disc inserting and discharging portion in a transverse direction.
Figure 33:
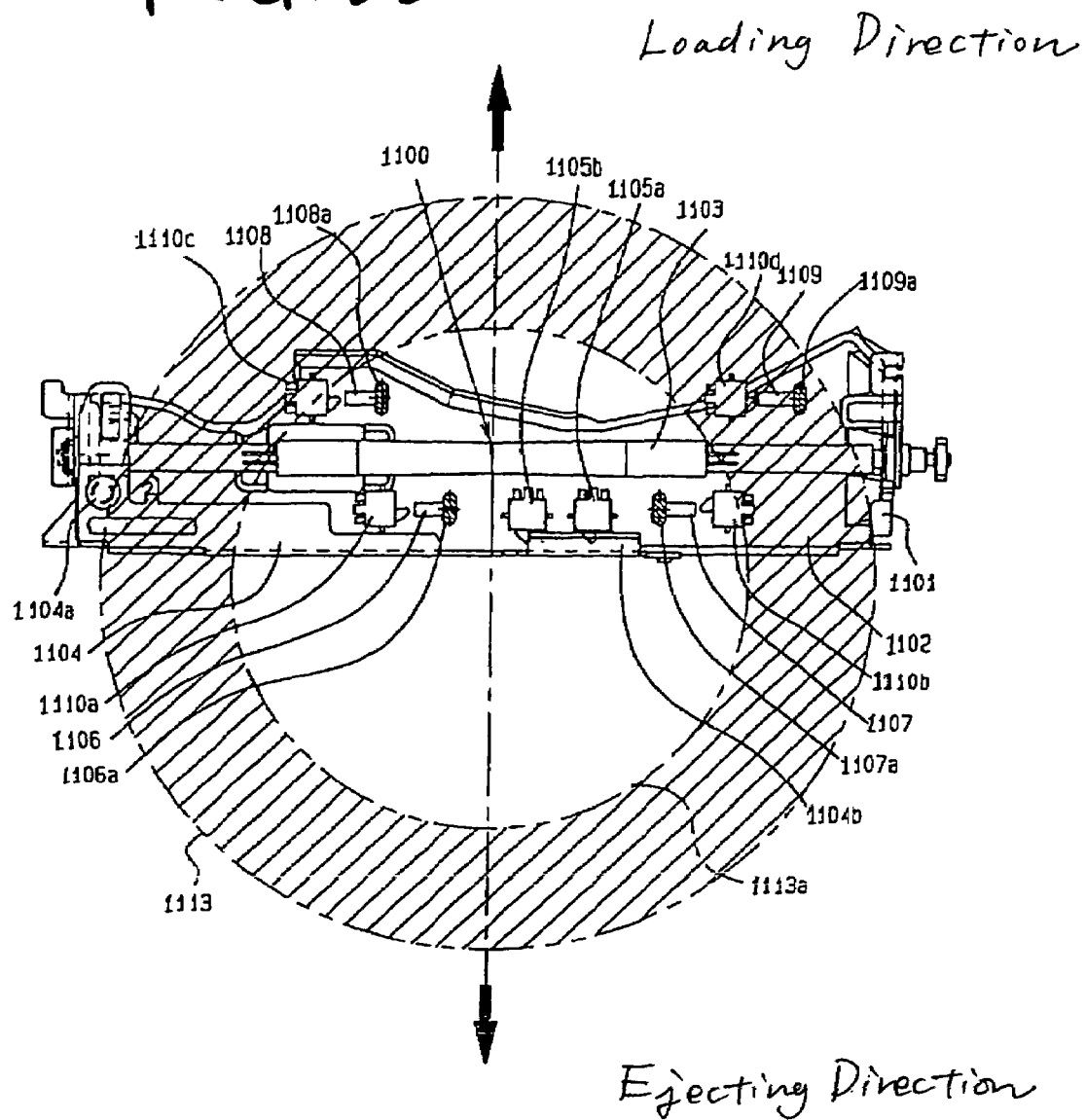
FIG. 33 is a top view showing the main part of the disc device illustrated in FIG. 26 in the passage of a 12 cm disc adaptor through the disc inserting and discharging portion.

More specifically, the push switch 1105*b* serves to detect the first disc 1111 passing through the disc inserting and discharging portion 1100 as shown in FIG. 31, a second disc 1112 passing through the end 1100*a* of the disc inserting and discharging portion 1100 in the transverse direction as shown in FIG. 32, and a 12 cm disc adaptor 1113 to be a third disc passing through the disc inserting and discharging portion 1100 as shown in FIG. 33.

Moreover, the lever member 1107 and the push switch 1110*b* are provided in such positions as to detect the disc passing by the contact of the roller member 1107*a* provided on the lever member 1107 with the disc, not to detect the second disc 1112 when the second disc 1112 passing through the end 1100*a* of the disc inserting and discharging portion 1100 in the transverse direction is to be detected by the push switch 1105*b* as shown in FIG. 32, and not to detect the 12 cm disc adaptor 1113 when the 12 cm disc adaptor 1113 is to be detected by the push switch 1105*b* as shown in FIG. 33, and constitute seventh detecting means.

The lever member 1107 and the push switch 1110*b* serve to detect the first disc 1111 when the first disc 1111 is to be detected by the push switch 1105*b* as shown in FIG. 31.

Figure 34:
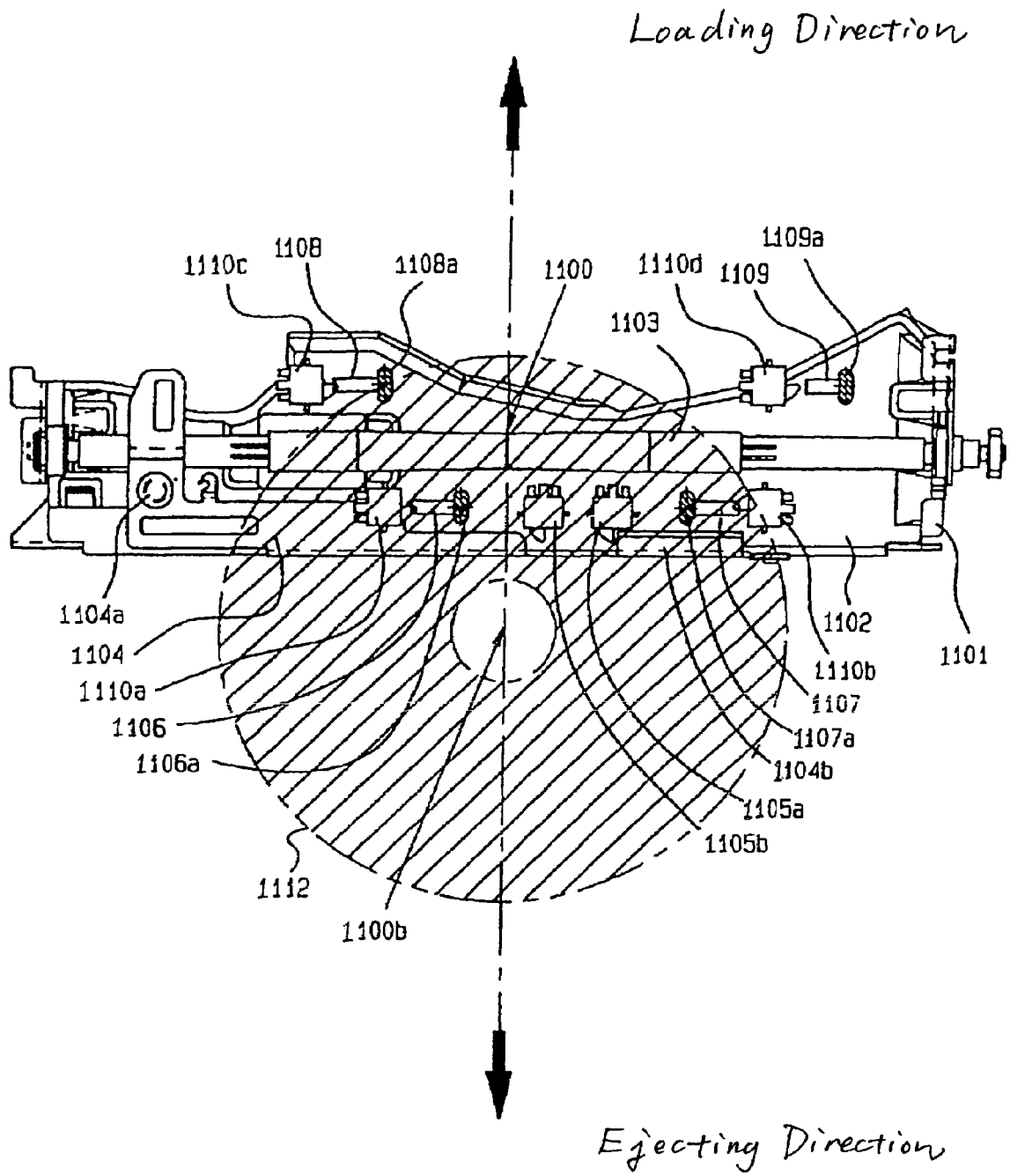
FIG. 34 is a top view showing the main part of the disc device illustrated in FIG. 26 in the passage of the second disc through the central portion of the disc inserting and discharging portion in the transverse direction.
Figure 35:
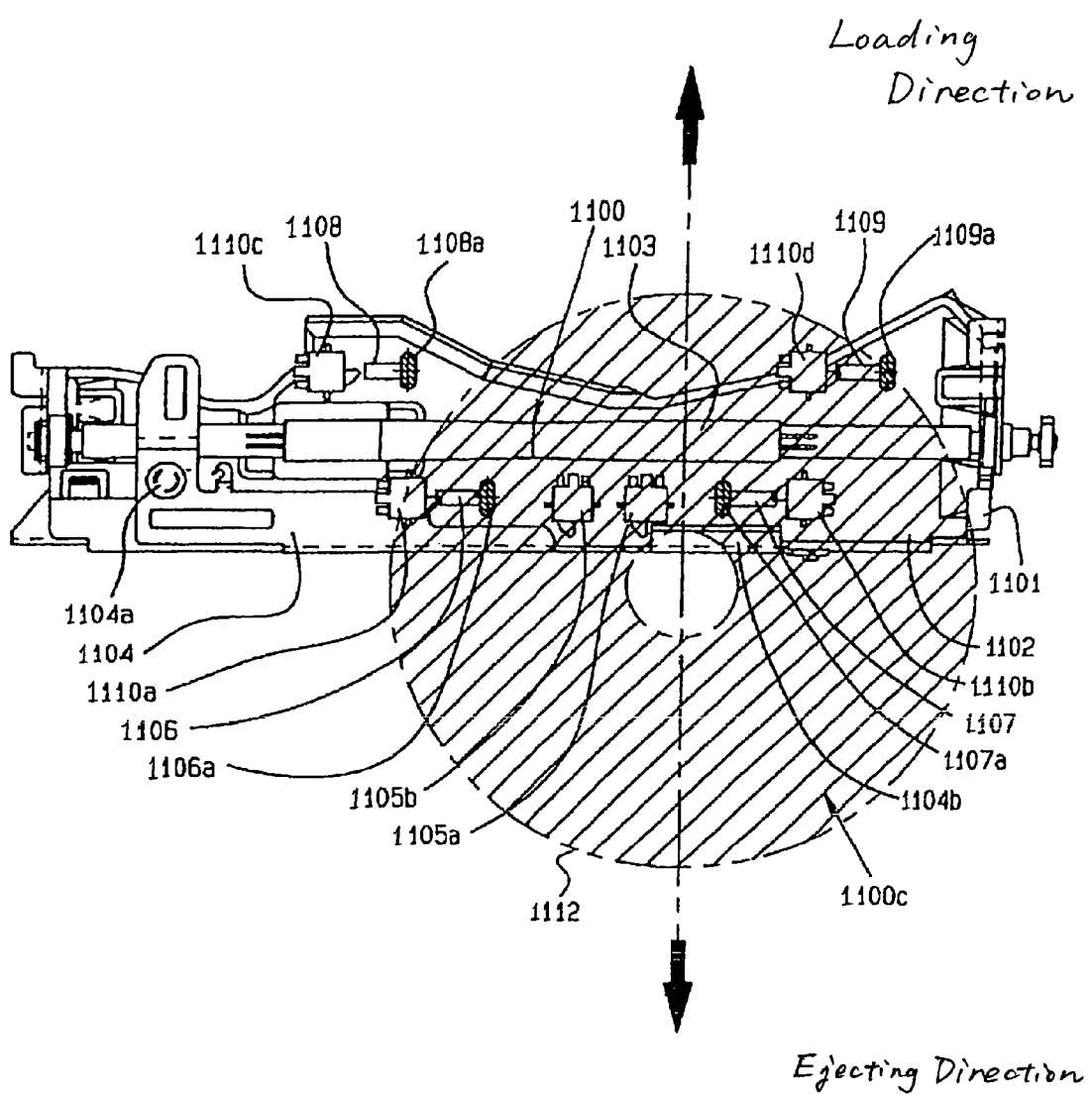
FIG. 35 is a top view showing the main part of the disc device illustrated in FIG. 26 in the passage of the second disc through the other end of the disc inserting and discharging portion in the transverse direction.

In the case in which the push switch 1105*b* is provided in such a position as to detect a maximum displacement in the direction shown in the arrow 1204 (see FIG. 29) of the lever member 1104 when the outer peripheral portion of the inserted first disc 1111 (see FIG. 31) and the shaft portion 1104*a* of the lever member 1104 come in contact with each other, moreover, it detects neither the second disc 1112 passing through a central portion 1100*b* of the disc inserting and discharging portion 1100 in the transverse direction as shown in FIG. 34 nor the second disc 1112 passing through the other end 1100*c* of the disc inserting and discharging portion 1100 in the transverse direction as shown in FIG. 35.

Figure 36:
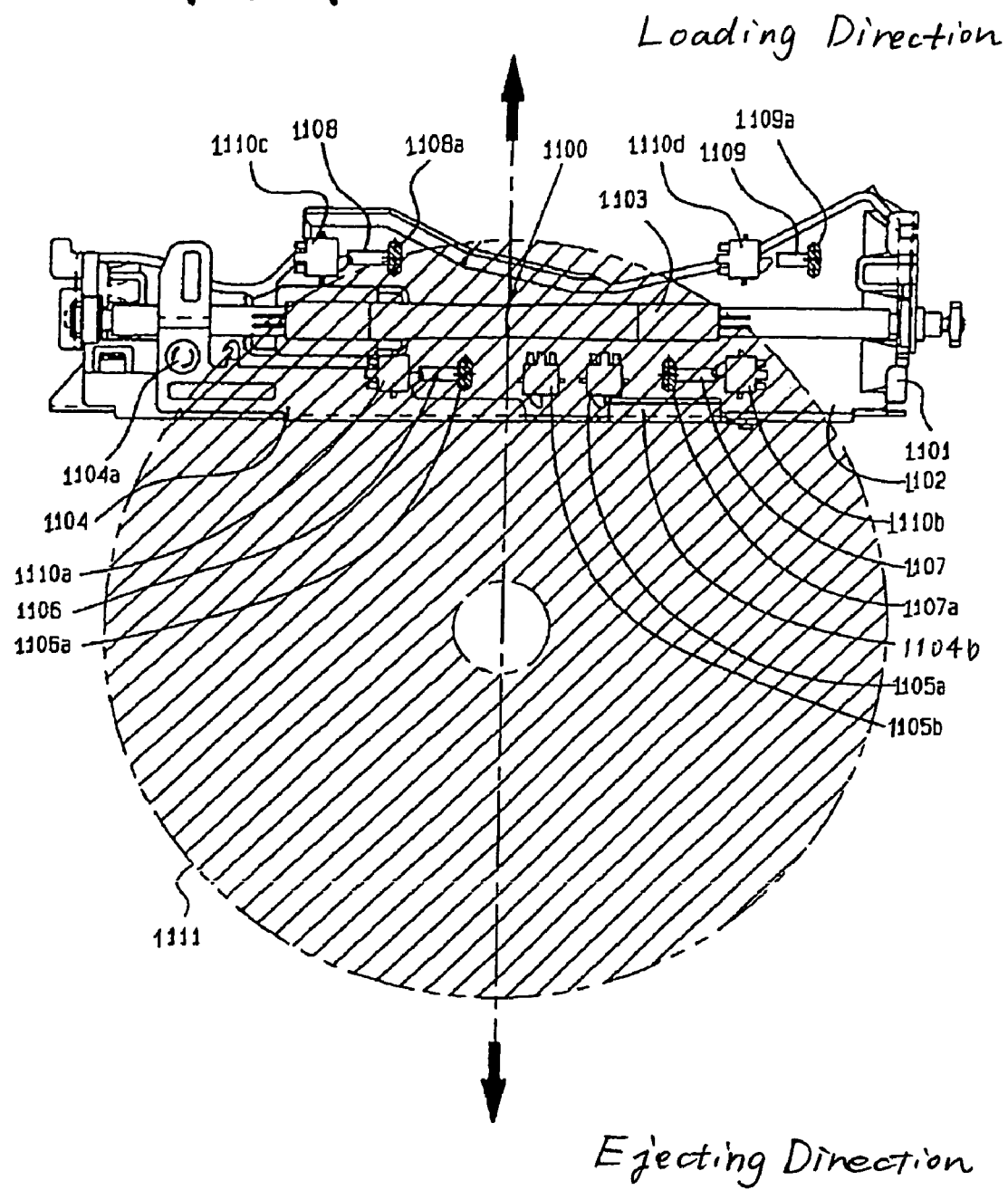
FIG. 36 is a top view showing the main part of the disc device illustrated in FIG. 26 in the passage of the first disc through the disc inserting and discharging portion in a different state from the state shown in FIG. 31.
Figure 38:
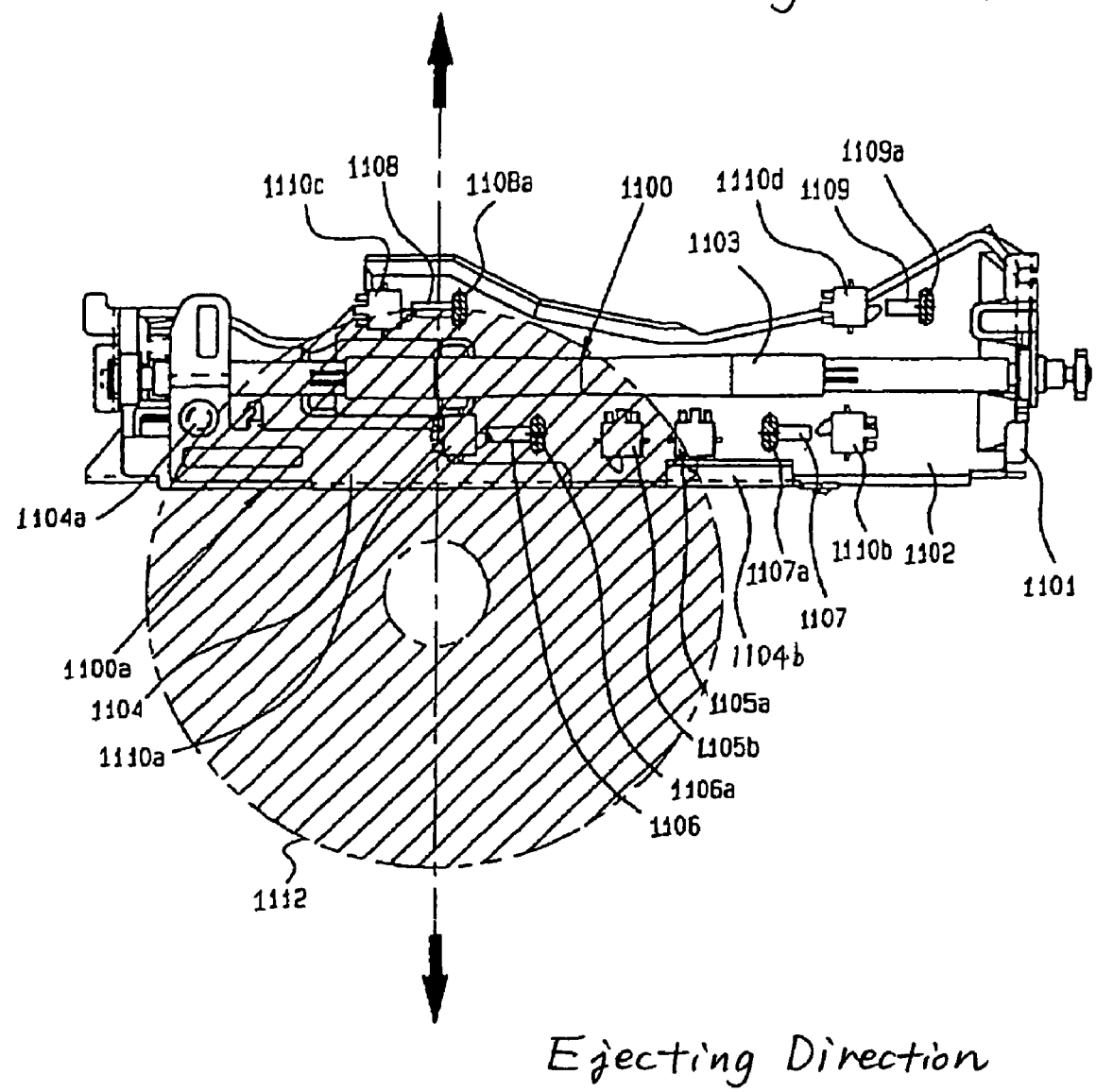
FIG. 38 is a top view showing the main part of the disc device illustrated in FIG. 26 in the passage of the second disc through one end of the disc inserting and discharging portion in the transverse direction in a different state from the state shown in FIG. 32.

Moreover, the lever member 1108 and the push switch 1110*c* constitute eighth detecting means for detecting a disc passing by the contact of the roller member 1108*a* provided on the lever member 1108 with the disc. The lever member 1107 and the push switch 1110*b*, and the lever member 1108 and the push switch 1110*c* are provided in such positions that the first disc 1111 and the 12 cm disc adaptor 1113 are inserted in the disc inserting and discharging portion 1100 as shown in FIGS. 36 and 12 and are detected by the push switch 1110*b* when they are to be first detected by the push switch 1110*c*, and the second disc 1112 passing through the end 1100*a* of the disc inserting and discharging portion 1100 in the transverse direction is inserted in the disc inserting and discharging portion 1100 and is not detected when it is to be first detected by the push switch 1110*c* as shown in FIG. 38.

The second disc 1112 passing through the central portion 1100*b* of the disc inserting and discharging portion 1100 in the transverse direction shown in FIG. 34 is inserted in the disc inserting and discharging portion 1100 and is detected by the push switch 1110*b* when it is to be first detected by the push switch 1110*c*.

Furthermore, the lever member 1109 and the push switch 1110*d* constitute ninth detecting means for detecting a disc passing by the contact of the roller member 1109*a* provided on the lever member 1109 with the disc. The lever member 1109 and the push switch 1110*d*, and the lever member 1108 and the push switch 1110*c* are provided in such positions that the first disc 1111 and the 12 cm disc adaptor 1113 are inserted in the disc inserting and discharging portion 1100 and are detected by the push switch 1110*c* when they are to be first detected by the push switch 1110*d* as shown in FIGS. 39 and 40, neither the second disc 1112 passing through the end 100*a* of the disc inserting and discharging portion 1100 in the transverse direction nor the second disc 1112 passing through the central portion 1100*b* of the disc inserting and discharging portion 1100 in the transverse direction are detected by the push switch 1110*d* as shown in FIGS. 32 and 34, and the second disc 1112 passing through the other end 1100*c* of the disc inserting and discharging portion 1100 in the transverse direction is inserted in the disc inserting and discharging portion 1100 and is not detected by the push switch 1110*c* when it is to be first detected by the push switch 1110*d* as shown in FIG. 35.

Figure 39:
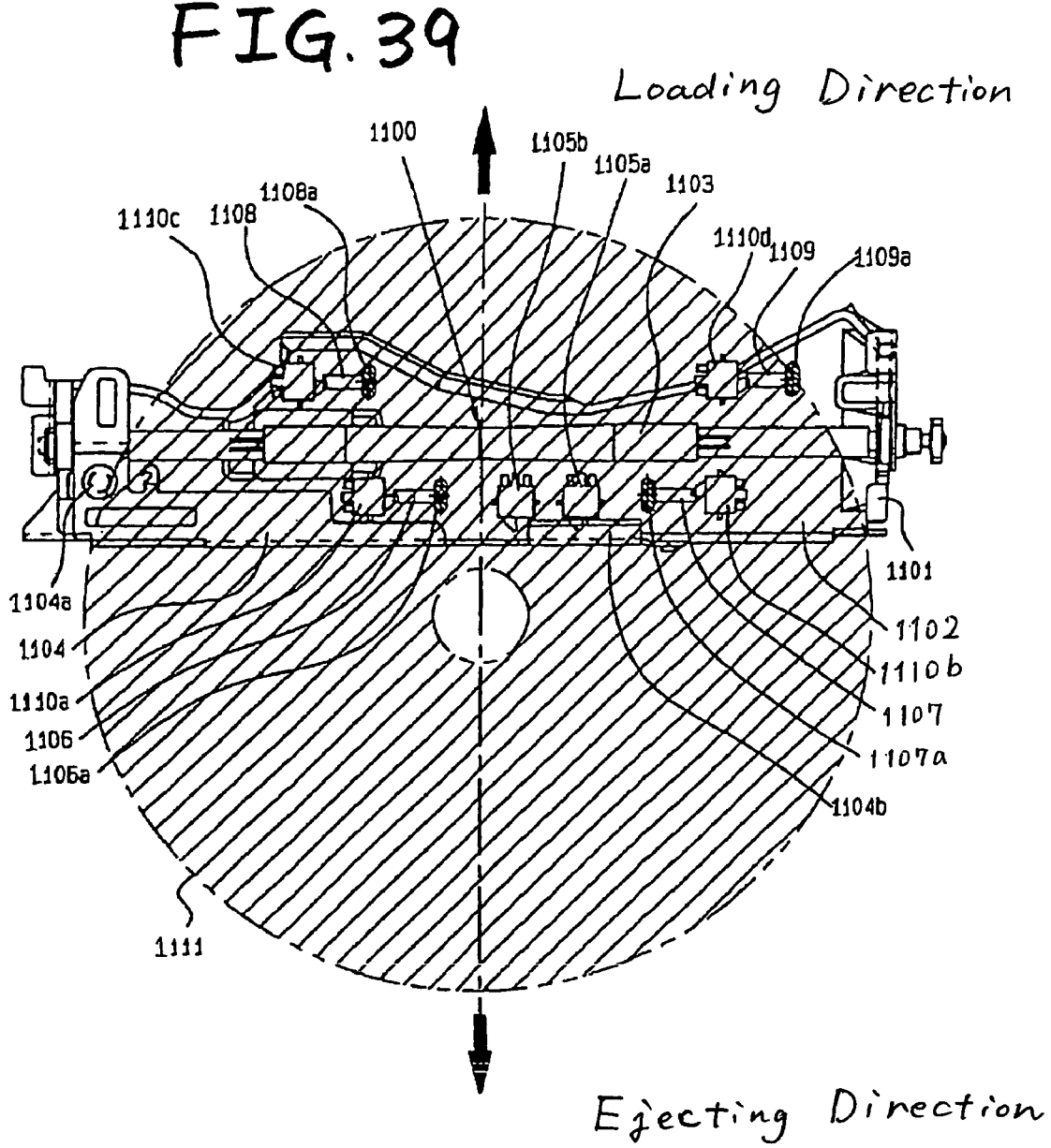
FIG. 39 is a top view showing the main part of the disc device illustrated in FIG. 26 in the passage of the first disc through the disc inserting and discharging portion in a different state from the states shown in FIGS. 31 and 36.
Figure 40:
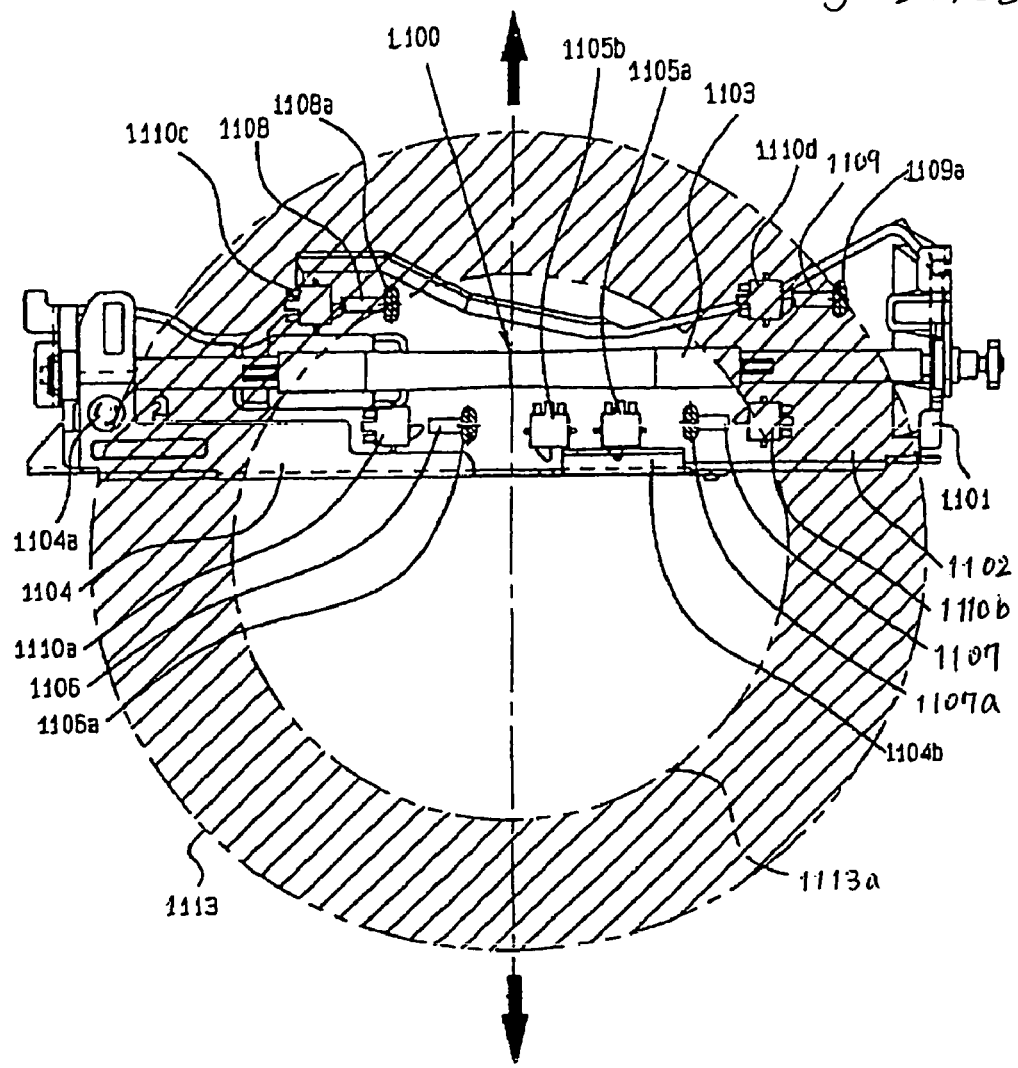
FIG. 40 is a top view showing the main part of the disc device illustrated in FIG. 26 in the passage of the 12 cm disc adaptor through the disc inserting and discharging portion in a different state from the states shown in FIGS. 33 and 37.

In addition, the lever member 1104 and the push switch 1105*a* constitute fifth detecting means for detecting a disc passing by a contact with the disc, and the shaft portion 1104*a* of the lever member 1104 and the push switch 1110*d* are provided in such positions that the first disc 1111 or the 12 cm disc adaptor 1113 is inserted in the disc inserting and discharging portion 1100 and is detected by the push switch 1105*a* when it is to be first detected by the push switch 1110*d* as shown in FIGS. 39 and 40, and neither the second disc 1112 passing through the end 1100*a* of the disc inserting and discharging portion 1100 in the transverse direction nor the second disc 1112 passing through the central portion 1100*b* of the disc inserting and discharging portion 1100 in the transverse direction are detected by the push switch 1110*d* as shown in FIGS. 32 and 34, and the second disc 1112 passing through the other end 1100*c* of the disc inserting and discharging portion 1100 in the transverse direction is inserted in the disc inserting and discharging portion 1100 and is not detected by the push switch 1105*a* when it is to be first detected by the push switch 1110*d* as shown in FIG. 35.

Moreover, the lever member 1106 and the push switch 1110*a* constitute tenth detecting means provided in such a position as to detect a passing disc by the contact of the roller member 1106*a* provided on the lever member 1106 with the disc and to detect at least the second disc 1112 which is not detected by the push switch 1110*b* as shown in FIG. 32 in the second discs 1112 passing through the disc inserting and discharging portion 1100. The shaft portion 1104*a* of the lever member 1104, the lever member 1106 and the push switch 1110a, the lever member 1107 and the push switch 1110b, and the lever member 1109 and the push switch 1110d are provided in such positions that the first disc 111, the second disc 1112 passing through the end 1100a of the disc inserting and discharging portion 1100 in the transverse direction, the 12 cm disc adaptor 1113, and the second disc 1112 passing through the other end 1100c of the disc inserting and discharging portion 1100 in the transverse direction are inserted in the disc inserting and discharging portion 1100 and are detected by at least one of the push switch 1110a and the push switch 1110b, and are detected by at least one of the push switch 1110d and the push switch 1105a before they are detected by neither the push switch 1110a nor the push switch 1110b as shown in FIGS. 31, 32, 33 and 35, and the second disc 1112 passing through the central portion 1100b of the disc inserting and discharging portion 1100 in the transverse direction is inserted in the disc inserting and discharging portion 1100 and is detected by at least one of the push switch 1110a and the push switch 1110b, and is detected by neither the push switch 1110d nor the push switch 1105a before it is detected by neither the push switch 1110a nor the push switch 1110b as shown in FIG. 34.

Furthermore, thickness detecting means, that is, the lever member 1106 and the push switch 1110a, the lever member 1107 and the push switch 1110b, the lever member 1108 and the push switch 1110c, and the lever member 1109 and the push switch 1110d are provided in such positions that the first disc 1111, the second disc 1112 and the 12 cm disc adaptor 1113 which are to be detected by the push switch 1105b are detected by any of the push switches 1110a, 1110b, 1110c and 1110d as shown in FIGS. 31 to 33.

In addition, the lever member 1106 and the push switch 1110a are provided on an upstream side in the direction of the insertion of the disc from the roller member 1103 and in such positions as to detect the first disc 1111 (see FIG. 31) inserted in the disc inserting and discharging portion 1100, the second disc 1112 (see FIG. 32) passing through the end 1100a of the disc inserting and discharging portion 1100 in the transverse direction and the second disc 1112 (see FIG. 34) passing through the central portion 1100b of the disc inserting and discharging portion 1100 in the transverse direction before the first disc 1111 (see FIG. 31), the second disc 1112 (see FIG. 32) passing through the end 1110a of the disc inserting and discharging portion 1100 in the transverse direction and the second disc 1112 (see FIG. 34) passing through the central portion 1100b of the disc inserting and discharging portion 1100 in the transverse direction come in contact with the roller member 1103.

The 12 cm disc adaptor 1113 (see FIG. 33) has an outside diameter which is almost equal to that of the first disc 1111 (see FIG. 31). In the case in which the lever member 1106 and the push switch 1110a are provided in such positions as to detect the first disc 1111 inserted in the disc inserting and discharging portion 1100 before the first disc 1111 comes in contact with the roller member 1103 as shown in FIG. 31, the 12 cm disc adaptor 1113 inserted in the disc inserting and discharging portion 1100 is detected before the 12 cm disc adaptor 1113 comes in contact with the roller member 1103 as shown in FIG. 33.

As shown in FIG. 35, moreover, the lever member 1107 and the push switch 1110b are provided on the upstream side in the direction of the insertion of the disc from the roller member 1103 and in such positions as to detect the second disc 1112 inserted in the disc inserting and discharging portion 1100 and passing through the other end 1100c of the disc inserting and discharging portion 1100 in the transverse direction before the second disc 1112 comes in contact with the roller member 1103.

As shown in FIGS. 34, 36 and 38, furthermore, the lever member 1108 and the push switch 1110c are provided in such positions that the second disc 1112 passing through the central portion 1100b of the disc inserting and discharging portion 1100 in the transverse direction, the first disc 1111 and the second disc 1112 passing through the end 1100a of the disc inserting and discharging portion 1100 in the transverse direction are detected, and then, the second disc 1112 passing through the central portion 1100b of the disc inserting and discharging portion 1100 in the transverse direction which is provided in contact with the roller member 1103, the first disc 1111 and the second disc 1112 passing through the end 1100a of the disc inserting and discharging portion 1100 in the transverse direction are not detected when the second disc 1112 passing through the central portion 1100b of the disc inserting and discharging portion 1100 in the transverse direction, the first disc 1111 and the second disc 1112 passing through the end 1110a of the disc inserting and discharging portion 1100 in the transverse direction are to be discharged from the disc inserting and discharging portion 1100.

Figure 37:
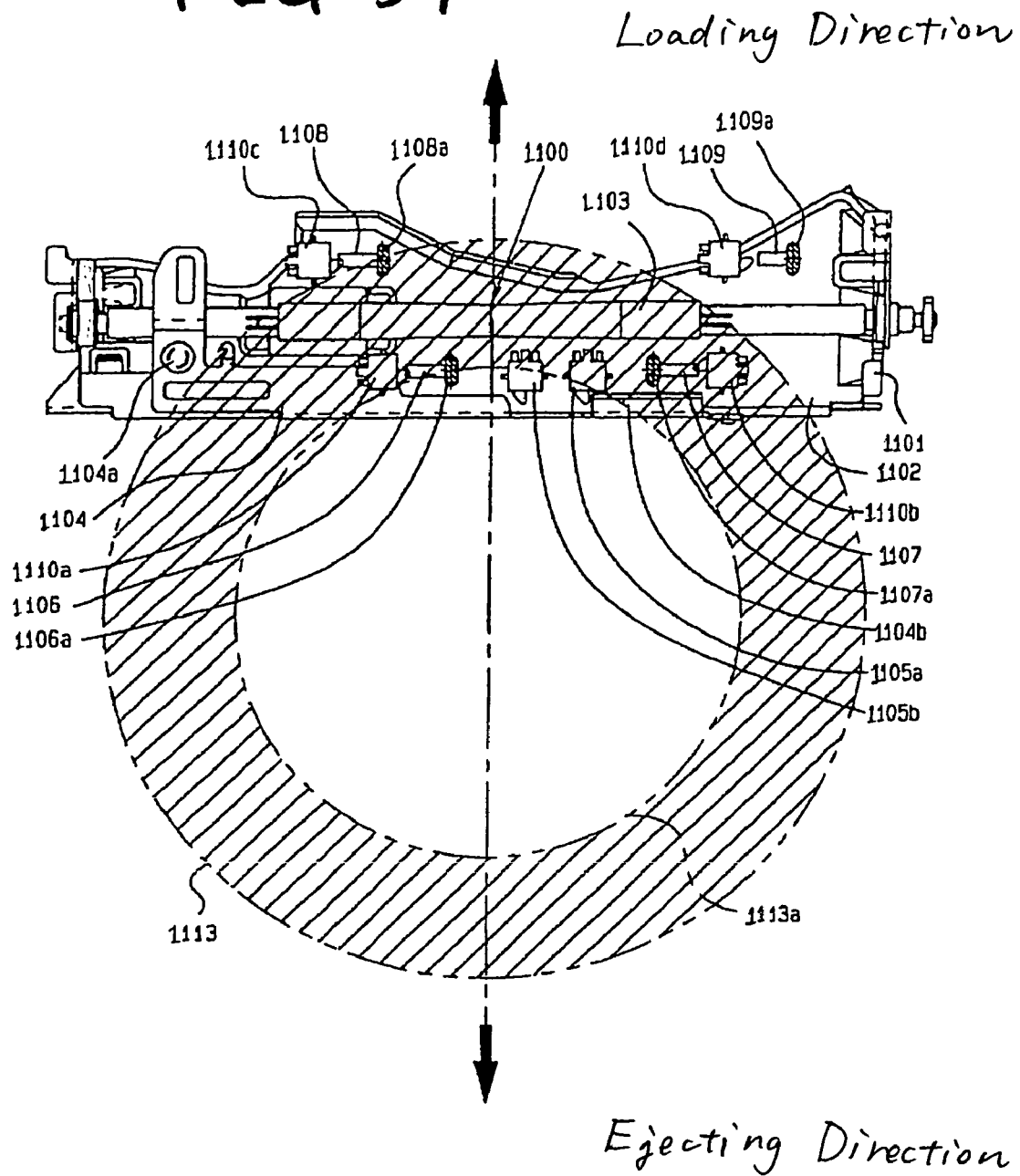
FIG. 37 is a top view showing the main part of the disc device illustrated in FIG. 26 in the passage of the 12 cm disc adaptor through the disc inserting and discharging portion in a different state from the state shown in FIG. 33.

The 12 cm disc adaptor 1113 (see FIG. 37) has an outside diameter which is almost equal to that of the first disc 1111 (see FIG. 36). In the case in which the lever member 1108 and the push switch 1110c are provided in such positions as to detect the first disc 1111 and not to then detect the first disc 1111 which is provided in contact with the roller member 1103 when the first disc 1111 is to be discharged from the disc inserting and discharging portion 1100 as shown in FIG. 36, therefore, they detect the 12 cm disc adaptor 1113 and do not then detect the 12 cm disc adaptor 1113 which is provided in contact with the roller member 1103 when the 12 cm disc adaptor 1113 is to be discharged from the disc inserting and discharging portion 1100 as shown in FIG. 37.

As shown in FIG. 35, moreover, the lever member 1109 and the push switch 1110d are provided in such positions as to detect the second disc 1112 and not to then detect the second disc 1112 which is provided in contact with the roller member 1103 when the second disc 1112 passing through the other end 1100c of the disc inserting and discharging portion 1100 in the transverse direction is to be discharged from the disc inserting and discharging portion 1100.

As shown in FIG. 36, furthermore, the shaft portion 1104a of the lever member 1104 is provided in such a position that the push switch 1105a detects the first disc 111, and then, does not detect the first disc 1111 which is provided in contact with the roller member 1103 when the first disc 1111 is to be discharged from the disc inserting and discharging portion 1100.

The disc guide member 1102, the roller member 1103, a plurality of lever members 1106, 1107, 1108 and 1109, a plurality of push switches 1110a, 1110b, 1110c and 1110d, the lever member 1104, the push switches 1105a and 1105b and a control device which is not shown constitute a disc identifying device and a disc inserting and discharging apparatus. The control device which is not shown constitutes identifying means for identifying the type of the disc passing through the disc inserting and discharging portion 1100 based on the outputs of the push switches 1110a, 1110b, 1110c and 1110d and the push switches 1105a and 1105b and control means for controlling the inserting and discharging operation of the disc by the roller member 1103 based on the result of the identification of the identifying means.

The roller member 1103 is provided in such a position that the identification of the disc by the control device is ended before the contact with the inserted disc is released.

Next, description will be given to the operation of the disc device according to the embodiment.

In the following, description will be given to an operation to be carried out in the case in which the disc device delivers the first disc 1111 and the 12 cm disc adaptor 1113 holding the second disc 1112 in a central part to a position in which loading is to be completed and forcibly discharges the 12 cm disc adaptor 1113 and the second disc 1112.

(1) An Operation for the First Disc 111 (12 cm Disc)

First of all, description will be given to the operation of the disc device for the first disc 1111. The disc device according to the embodiment treats the 12 cm disc adaptor 1113 holding the second disc 1112 in the central part in the same manner as the first disc 1111. For this reason, the description of the operation of the disc device for the 12 cm disc adaptor 1113 holding the second disc 1112 in the central part will be omitted.

Figure 41:
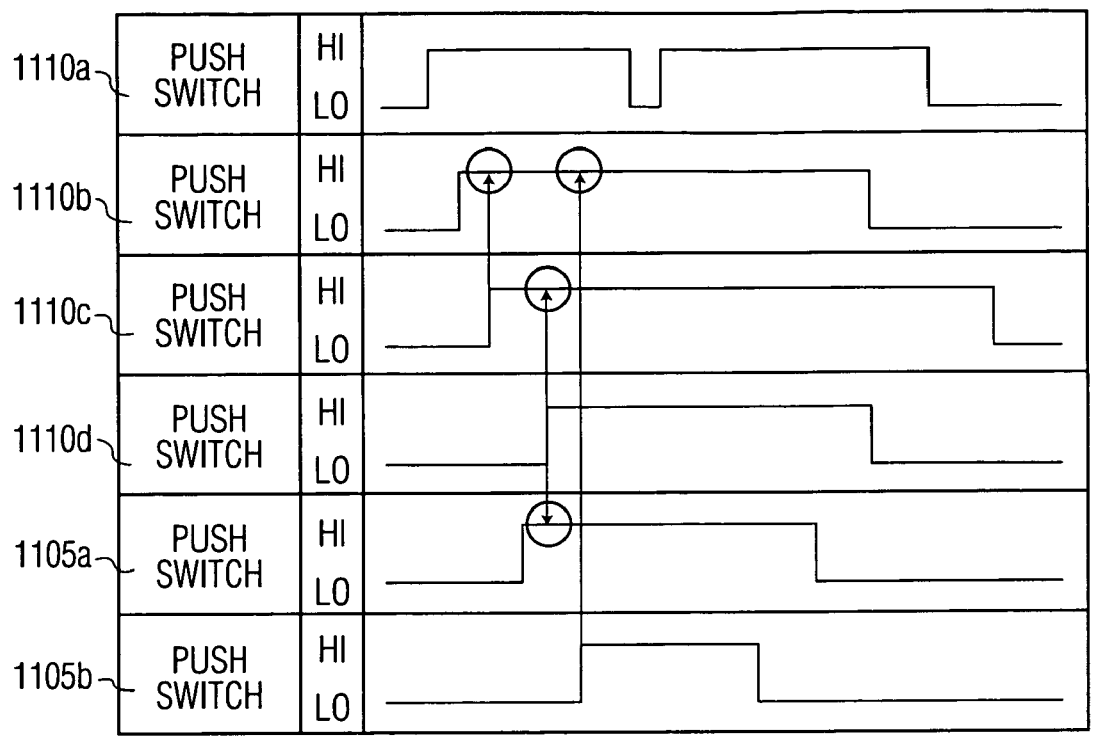
FIG. 41 is a timing chart showing the output of each detecting means of the disc device illustrated in FIG. 26 in the passage of the first disc through the disc inserting and discharging portion.

When the first disc 1111 is inserted in the disc inserting and discharging portion 1100 of the disc device by the user, the output of the push switch 1110a becomes Hi as shown in FIG. 41 because the lever member 1106 and the push switch 1110a are provided on the upstream side in the direction of the insertion of the disc from the roller member 1103 and in such a position as to detect the first disc 1111 inserted in the disc inserting and discharging portion 1100 before the first disc 1111 comes in contact with the roller member 1103 as described above.

When the first disc 1111 is inserted in the disc inserting and discharging portion 1100 by the user so that the output of the push switch 1110a becomes Hi, the disc device starts the operation of a power source to begin the rotation of the roller member 1103. When the first disc 1111 is further inserted by the user, the first disc 1111 and the roller member 1103 come in contact with each other. Consequently, the auto-loading of the first disc 1111 is started so that the first disc 1111 is delivered to a position shown in FIG. 36, and furthermore, the outputs of the push switches 1110b and 1105c become Hi in order as is shown in FIG. 41.

As described above, the push switch 1110b and the push switch 1110c are provided in such positions that the first disc 1111 and the 12 cm disc adaptor 1113 are inserted in the disc inserting and discharging portion 1100 and are detected by the push switch 1110b when they are to be first detected by the push switch 1110c as shown in FIGS. 36 and 37, and the second disc 1112 passing through the end 1100a of the disc inserting and discharging portion 1100 in the transverse direction is inserted in the disc inserting and discharging portion 1100 and is not detected by the push switch 1110b when it is to be first detected by the push switch 1110c as shown in FIG. 38.

Since the output of the push switch 1110b is Hi when the output of the push switch 1110c becomes Hi, accordingly, the control device which is not shown identifies that any of the first disc 1111, the second disc 1112 passing through the central portion 1100b of the disc inserting and discharging portion 1100 in the transverse direction and the 12 cm disc adaptor 1113 is inserted in the disc inserting and discharging portion 1100 and causes the roller member 1103 to continuously carry out the auto-loading of the first disc 1111.

When the first disc 1111 is further inserted by the roller member 1103, the outputs of the push switch 1105a and the push switch 1110d become Hi in order as shown in FIG. 41 while the first disc 1111 is delivered to a position shown in FIG. 39.

As described above, the shaft portion 1104a of the lever member 1104, the lever member 1109 and the push switch 1110d are provided in such positions that the first disc 1111 and the 12 cm disc adaptor 1113 are inserted in the disc inserting and discharging portion 1100 and are detected by the push switch 1105a when they are to be first detected by the push switch 1110d as shown in FIGS. 39 and 40, the second disc 1112 passing through the end 1100a of the disc inserting and discharging portion 1100 in the transverse direction and the second disc 1112 passing through the central portion 1100b of the disc inserting and discharging portion 1100 in the transverse direction are not detected by the push switch 1110d as shown in FIGS. 32 and 34, and the second disc 1112 passing through the other end 1100c of the disc inserting and discharging portion 1100 in the transverse direction is inserted in the disc inserting and discharging portion 1100 and is not detected by the push switch 1105a when it is to be first detected by the push switch 1110d as shown in FIG. 35.

Since the output of the push switch 1105a is Hi when the output of the push switch 1110d becomes Hi, accordingly, the control device which is not shown identifies that either the first disc 1111 or the 12 cm disc adaptor 1113 is inserted in the disc inserting and discharging portion 1100 and causes the roller member 1103 to continuously carry out the auto-loading of the first disc 1111.

As described above, moreover, the lever member 1109 and the push switch 1110d, and the lever member 1108 and the push switch 1110c are provided in such positions that the first disc 1111 and the 12 cm disc adaptor 1113 are inserted in the disc inserting and discharging portion 1100 and are detected by the push switch 1110c when they are to be first detected by the push switch 1110d as shown in FIGS. 39 and 40, and the second disc 1112 passing through the end 1100a of the disc inserting and discharging portion 1100 in the transverse direction and the second disc 1112 passing through the central portion 1100b of the disc inserting and discharging portion 1100 in the transverse direction are not detected by the push switch 1110d as shown in FIGS. 32 and 34, and the second disc 1112 passing through the other end 1100c of the disc inserting and discharging portion 1100 in the transverse direction is inserted in the disc inserting and discharging portion 1100 and is not detected by the push switch 1110c when it is to be first detected by the push switch 1110d as shown in FIG. 35.

Since the output of the push switch 1110c is Hi when the output of the push switch 1110d becomes Hi, accordingly, the control device which is not shown can also decide that a disc other than the second disc 1112 passing through the other end 1100c of the disc inserting and discharging portion 1100 in the transverse direction is inserted in the disc inserting and discharging portion 1100.

When the first disc 1111 is further inserted by the roller member 1103, the output of the push switch 1105b becomes Hi as shown in FIG. 41 while the first disc 1111 is delivered to the position shown in FIG. 29.

As described above, the lever member 1107 and the push switch 1110b are provided in such positions as not to detect the second disc 1112 passing through the end 1110a of the disc inserting and discharging portion 1100 in the transverse direction when the second disc 1112 is to be detected by the push switch 1105b as shown in FIG. 32 and not to detect the 12 cm disc adaptor 1113 when the 12 cm disc adaptor 1113 is to be detected by the push switch 1105b as shown in FIG. 33.

Since the output of the push switch 1110b is Hi when the output of the push switch 1105b becomes Hi, accordingly, the control device which is not shown identifies that the first disc 1111 is inserted in the disc inserting and discharging portion 1100 and causes the roller member 1103 to continuously carry out the auto-loading of the first disc 111, thereby delivering the first disc 1111 to the position in which the loading is to be completed.

The completion of the loading of the first disc 1111 is detected by detecting means which is not shown.

In the case in which the first disc 1111 is to be discharged from an inside thereof, moreover, the disc device detects that the first disc 1111 is discharged from a disc housing portion (not shown) or a disc recording and reproducing portion (not shown) by detecting means which is not shown before the first disc 1111 comes in contact with the roller member 1103.

When the disc device detects that the first disc 1111 is discharged from the disc housing portion (not shown) or the disc recording and reproducing portion (not shown), it starts the operation of the power source, thereby beginning the rotation of the roller member 1103. When the first disc 1111 is further discharged by a mechanism which is not shown, the first disc 1111 and the roller member 1103 come in contact with each other so that the auto-ejection of the first disc 1111 is started and the first disc 1111 is delivered to a position shown in FIG. 36.

When the first disc 1111 is delivered to the position shown in FIG. 36, the output of the push switch 1110c becomes Lo because the lever member 1108 and the push switch 1110c are provided in such positions as to detect the first disc 1111 and not to then detect the first disc 1111 which is provided in contact with the roller member 1103 when the first disc 1111 is to be discharged from the disc inserting and discharging portion 1100 as described above.

Accordingly, the control device which is not shown receives the fact that the output of the push switch 1110c becomes Lo and stops the operation of the power source, thereby completing the auto-ejection of the first disc 111.

As shown in FIG. 36, when the output of the push switch 1110c becomes Lo, the contact of the first disc 1111 with the roller member 1103 is not released. Consequently, the first disc 1111 can be prevented from being dropped from the disc device and the auto-loading can also be started again by the operation of the user.

(2) An Operation for the Second Disc 1112 (8 cm Disc) passing through the end 1100a of the disc inserting and Discharging Portion 1100 in the Transverse Direction Next, description will be given to the operation of the disc drive apparatus for the second disc 1112 passing through the end 1100a of the disc inserting and discharging portion 1100 in the transverse direction.

Figure 42:
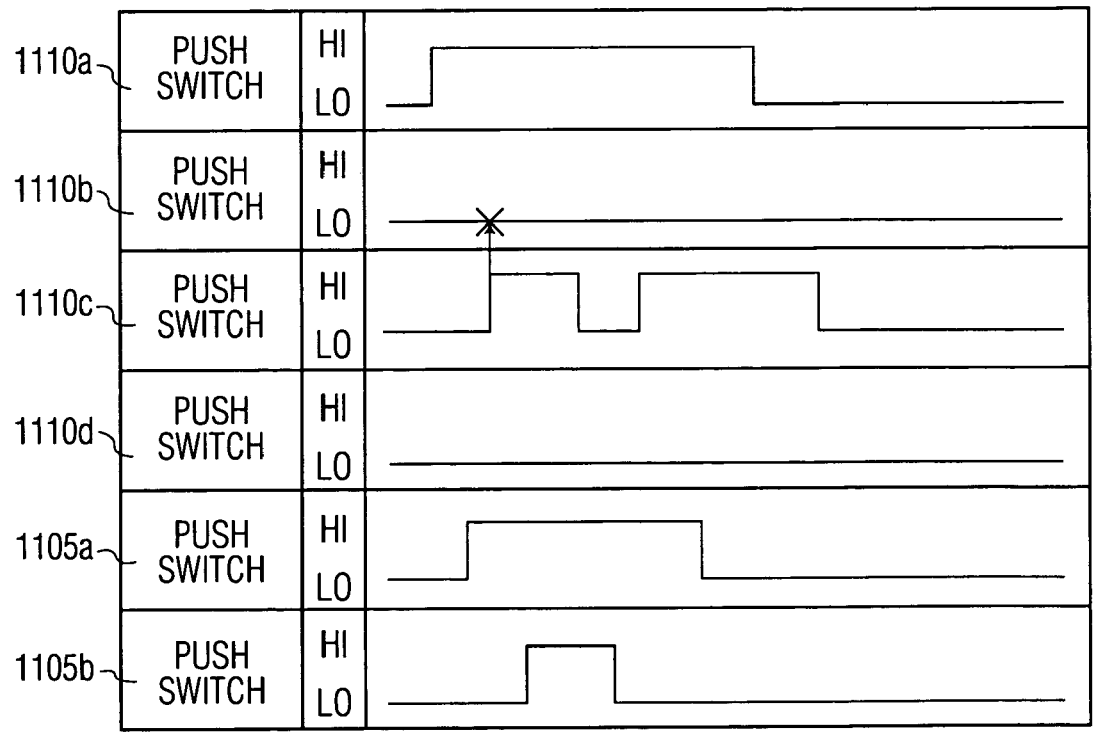
FIG. 42 is a timing chart showing the output of each detecting means of the disc device illustrated in FIG. 26 in the passage of the second disc through one end of the disc inserting and discharging portion in the transverse direction.

When the second disc 1112 is inserted from the end 1100a of the disc inserting and discharging portion 1100 in the transverse direction into the disc inserting and discharging portion 1100 in the disc device by the user, the output of the push switch 1110a becomes Hi as shown in FIG. 42 because the lever member 1106 and the push switch 1110a are provided on the upstream side in the direction of the insertion of the disc from the roller member 1103 and in such positions as to detect the second disc 1112 inserted in the disc inserting and discharging portion 1100 and passing through the end 1100a of the disc inserting and discharging portion 1100 in the transverse direction before the second disc 1112 comes in contact with the roller member 1103 as described above.

When the second disc 1112 is inserted from the end 1100a of the disc inserting and discharging portion 1100 in the transverse direction into the disc inserting and discharging portion 1100 by the user so that the output of the push switch 1110a becomes Hi, the disc device starts the operation of the power source to begin the rotation of the roller member 1103.

When the second disc 1112 is further inserted by the user, the second disc 1112 and the roller member 1103 come in contact with each other. Consequently, the auto-loading of the second disc 1112 is started so that the second disc 1112 is delivered to a position shown in FIG. 38, and furthermore, the outputs of the push switch 1105a and the push switch 1110c become Hi in order as shown in FIG. 42.

As described above, the lever member 1107 and the push switch 1110b, and the lever member 1108 and the push switch 1110c are provided in such positions that the first disc 1111 and the 12 cm disc adaptor 1113 are inserted in the disc inserting and discharging portion 1100 and are detected by the push switch 1110b when they are to be first detected by the push switch 1110c as shown in FIGS. 36 and 37, and the second disc 1112 passing through the end 1100a of the disc inserting and discharging portion 1100 in the transverse direction is inserted in the disc inserting and discharging portion 1100 and is not detected by the push switch 1110b when it is to be first detected by the push switch 1110c as shown in FIG. 38.

Since the output of the push switch 1110b is Lo when the output of the push switch 1110c becomes Hi, accordingly, the control device which is not shown identifies that the second disc 1112 passing through the end 1100a of the disc inserting and discharging portion 1100 in the transverse direction is inserted into the disc inserting and discharging portion 1100, causes the roller member 1103 to stop the auto-loading of the second disc 1112, and furthermore, reverses the rotating direction of a driving source, thereby starting the auto-ejection of the second disc 1112.

When the auto-ejection of the second disc 1112 is started and the second disc 1112 is delivered, the output of the push switch 1110c becomes Lo because the lever member 1108 and the push switch 1110c are provided in such positions as to detect the second disc 1112 passing through the end 1100a of the disc inserting and discharging portion 1100 in the transverse direction and not to then detect the second disc 1112 which is provided in contact with the roller member 1103 when the second disc 1112 is to be discharged from the disc inserting and discharging portion 1100 as described above.

Accordingly, the control device which is not shown receives the fact that the output of the push switch 1110c becomes Lo and stops the operation of the power source, thereby completing the auto-ejection of the second disc 1112.

As shown in FIG. 38, when the output of the push switch 1110c becomes Lo, the contact of the second disc 1112 with the roller member 1103 is not released. Consequently, the second disc 1112 can be prevented from being dropped from the disc device.

(3) An Operation for the Second Disc 1112 (8 cm Disc) Passing Through the Central Portion 1100b of the Disc Inserting and Discharging Portion 1100 in the Transverse Direction Next, description will be given to the operation of the disc device for the second disc 1112 passing through the central portion 1100b of the disc inserting and discharging portion 1100 in the transverse direction.

Figure 43:
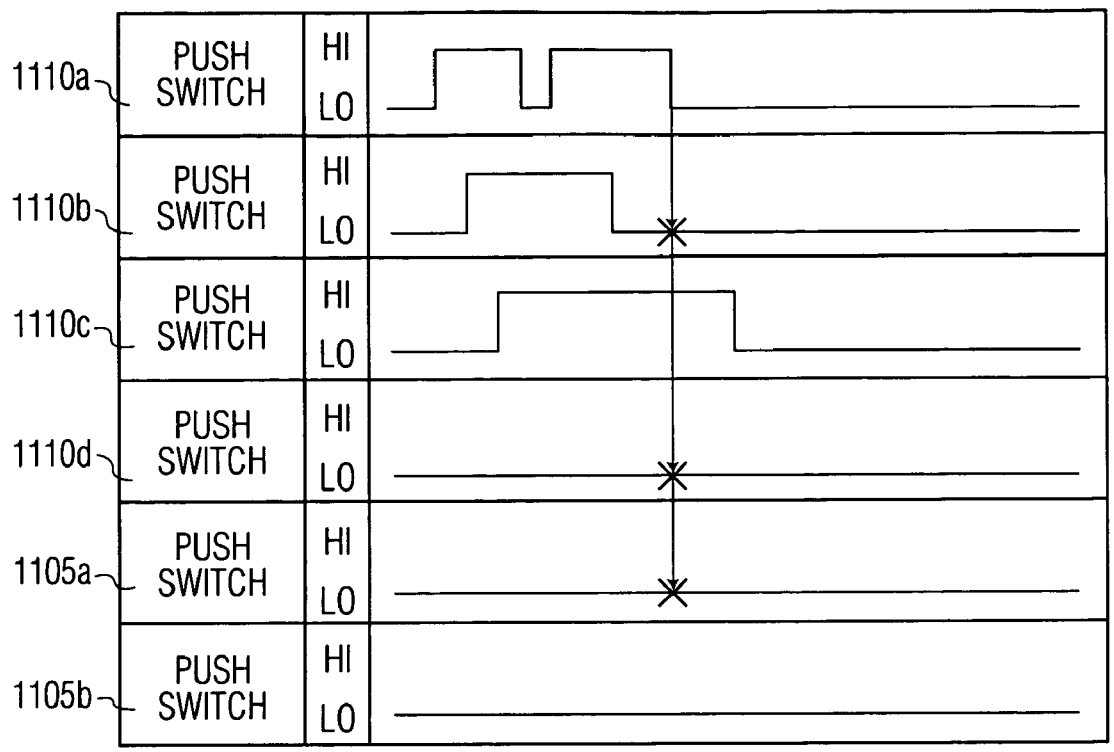
FIG. 43 is a timing chart showing the output of each detecting means of the disc device illustrated in FIG. 26 in the passage of the second disc through the central portion of the disc inserting and discharging portion in the transverse direction.

When the second disc 1112 is inserted from the central portion 1100b of the disc inserting and discharging portion 1100 in the transverse direction into the disc inserting and discharging portion 1100 in the disc device by the user, the output of the push switch 1110a becomes Hi as shown in FIG. 43 because the lever member 1106 and the push switch 1110a are provided on the upstream side in the direction of the insertion of the disc from the roller member 1103 and in such positions as to detect the second disc 1112 inserted in the disc inserting and discharging portion 1100 and passing through the central portion 1100b of the disc inserting and discharging portion 1100 in the transverse direction before the second disc 1112 comes in contact with the roller member 1103 as described above.

When the second disc 1112 is inserted from the central portion 1100b of the disc inserting and discharging portion 1100 in the transverse direction into the disc inserting and discharging portion 1100 by the user so that the output of the push switch 1110a becomes Hi, the disc device starts the operation of the power source to begin the rotation of the roller member 1103. When the second disc 1112 is further inserted by the user, the second disc 1112 and the roller member 1103 come in contact with each other. Consequently, the auto-loading of the second disc 1112 is started so that the second disc 1112 is delivered to the position shown in FIG. 34, and furthermore, the outputs of the push switches 1110b and 1110c become Hi in order as shown in FIG. 43.

As described above, the lever member 1107 and the push switch 1110b, and the lever member 1108 and the push switch 1110c are provided in such positions that the first disc 1111 and the 12 cm disc adaptor 1113 are inserted in the disc inserting and discharging portion 1100 and are detected by the push switch 1110b when they are to be first detected by the push switch 1110c as shown in FIGS. 36 and 37, and the second disc 1112 passing through the end 1100a of the disc inserting and discharging portion 1100 in the transverse direction is inserted in the disc inserting and discharging portion 1100 and is not detected by the push switch 1110b when it is to be first detected by the push switch 1110c as shown in FIG. 38.

Since the output of the push switch 1110b is Hi when the output of the push switch 1110c becomes Hi, accordingly, the control device identifies that a disc other than the second disc 1112 passing through the end 1100a of the disc inserting and discharging portion 1100 in the transverse direction is inserted into the disc inserting and discharging portion 1100 and causes the roller member 1103 to continuously carry out the auto-loading of the second disc 1112.

When the second disc 1112 is further inserted by the roller member 1103, the central hole of the second disc 1112 passes through the position of the roller member 1106a of the lever member 1106 and the lever member 1106 is brought into an identical state to a state in which the disc is not inserted into the disc device. As shown in FIG. 43, therefore, the output of the push switch 1110a is changed from Hi to Lo and is changed from Lo to Hi again, and then, the outputs of the push switches 1110b and 1110a become Lo in order.

The shaft portion 1104a of the lever member 1104, the lever member 1106 and the push switch 1110a, the lever member 1107 and the push switch 1110b, and the lever member 1109 and the push switch 1110d are provided in such positions that the first disc 1111, the second disc 1112 passing through the end 1100a of the disc inserting and discharging portion 1100 in the transverse direction, the 12 cm disc adaptor 1113 and the second disc 1112 passing through the other end 1100c of the disc inserting and discharging portion 1100 in the transverse direction are inserted in the disc inserting and discharging portion 1100, and are detected by at least one of the push switch 1110a and the push switch 1110b and are detected by at least one of the push switch 1110d and the push switch 1105a before they are detected by neither the push switch 1110a nor the push switch 1110b as shown in FIGS. 31, 32, 33 and 35, and the second disc 1112 passing through the central portion 1100b of the disc inserting and discharging portion 1100 in the transverse direction is inserted in the disc inserting and discharging portion 1100, and is detected by at least one of the push switch 1110a and the push switch 1110b and is detected by neither the push switch 1110d nor the push switch 1105a before it is detected by neither the push switch 1110a nor the push switch 1110b as shown in FIG. 34.

As shown in FIG. 43, accordingly, the second disc 1112 is inserted in the disc inserting and discharging portion 1100, is detected by at least one of the push switch 1110a and the push switch 1110b and is detected by neither the push switch 1110d nor the push switch 1105a before it is detected by neither the push switch 1110a nor the push switch 1110b. For this reason, the control device identifies that the second disc 1112 passing through the central portion 1100b of the disc inserting and discharging portion 1100 in the transverse direction is inserted into the disc inserting and discharging portion 1100, causes the roller member 1103 to stop the auto-loading of the second disc 1112, and furthermore, reverses the rotating direction of the driving source, thereby starting the auto-ejection of the second disc 1112.

When the auto-ejection of the second disc 1112 is started and the second disc 1112 is delivered to the position shown in FIG. 34, the output of the push switch 1110c becomes Lo because the lever member 1108 and the push switch 1110c are provided in such positions as to detect the second disc 1112 and not to then detect the second disc 1112 which is provided in contact with the roller member 1103 when the second disc 1112 passing through the central portion 1100b of the disc inserting and discharging portion 1100 in the transverse direction is to be discharged from the disc inserting and discharging portion 1100 as described above.

Accordingly, the control device receives the fact that the output of the push switch 1110c becomes Lo and stops the operation of the power source, thereby completing the auto-ejection of the second disc 1112.

As shown in FIG. 34, when the output of the push switch 1110c becomes Lo, the contact of the second disc 1112 with the roller member 1103 is not released. Consequently, the second disc 1112 can be prevented from being dropped from the disc device.

(4) An Operation for the Second Disc 1112 (8 cm Disc) Passing Through the Other End 1100c of the Disc Inserting and Discharging Portion 1100 in the Transverse Direction Next, description will be given to the operation of the disc drive apparatus for the second disc 1112 passing through the other end 1100c of the disc inserting and discharging portion 1100 in the transverse direction.

Figure 44:
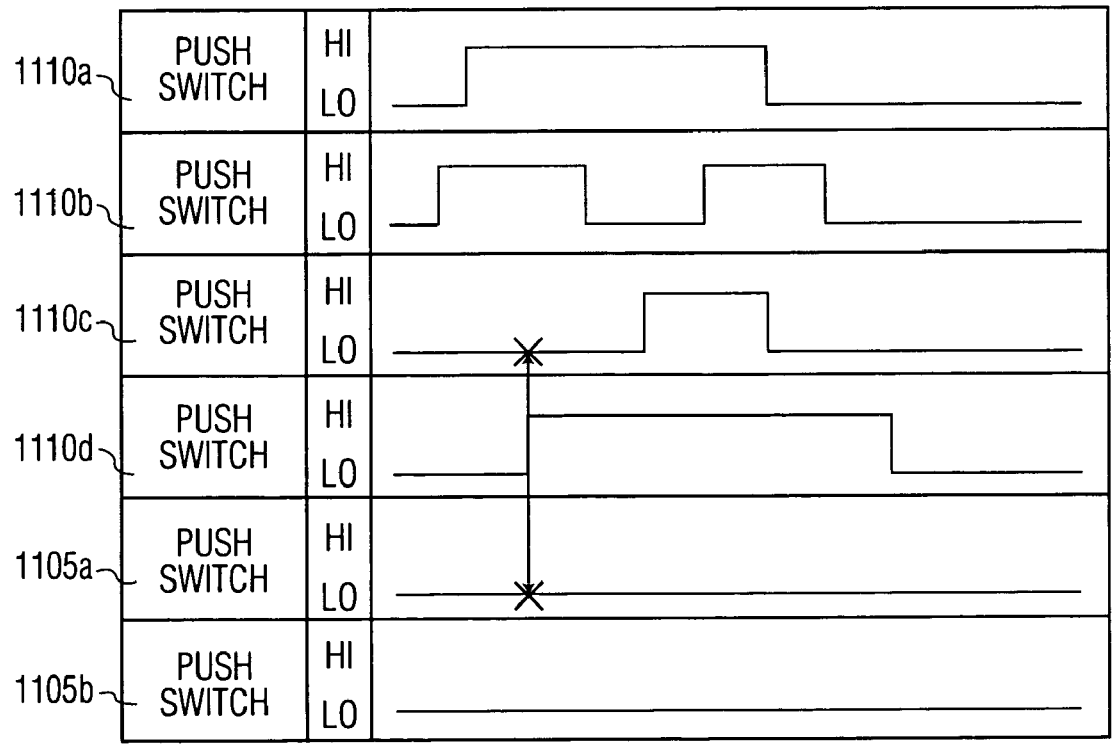
FIG. 44 is a timing chart showing the output of each detecting means of the disc device illustrated in FIG. 26 in the passage of the second disc through the other end of the disc inserting and discharging portion in the transverse direction.

When the second disc 1112 is inserted from the other end 1100c of the disc inserting and discharging portion 1100 in the transverse direction into the disc inserting and discharging portion 1100 in the disc device by the user, the output of the push switch 1110b becomes Hi as shown in FIG. 44 because the lever member 1107 and the push switch 1110b are provided on the upstream side in the direction of the insertion of the disc from the roller member 1103 and in such positions as to detect the second disc 1112 before the second disc 1112 inserted in the disc inserting and discharging portion 1100 and passing through the other end 1100c of the disc inserting and discharging portion 1100 in the transverse direction comes in contact with the roller member 1103 as described above.

When the second disc 1112 is inserted from the other end 1100c of the disc inserting and discharging s portion 1100 in the transverse direction into the disc inserting and discharging portion 1100 by the user so that the output of the push switch 1110*b* becomes Hi, the disc device starts the operation of the power source to begin the rotation of the roller member 1103. When the second disc 1112 is further inserted by the user, the second disc 1112 and the roller member 1103 come in contact with each other. Consequently, the auto-loading of the second disc 1112 is started so that the second disc 1112 is delivered to a position shown in FIG. 33, and furthermore, the outputs of the push switches 1110*a* and 1110*d* become Hi in order as shown in FIG. 44.

As described above, the lever member 1109 and the push switch 1110*d*, and the lever member 1108 and the push switch 1110*c* are provided in such positions that the first disc 1111 and the 12 cm disc adaptor 1113 are inserted in the disc inserting and discharging portion 1100 and are detected by the push switch 1110*c* when they are to be first detected by the push switch 1110*d* as shown in FIGS. 39 and 40, and the second disc 1112 passing through the end 1110*a* of the disc inserting and discharging portion 1100 in the transverse direction and the second disc 1112 passing through the central portion 1100*b* of the disc inserting and discharging portion 1100 in the transverse direction are not detected by the push switch 1110*d* as shown in FIGS. 32 and 34, and the second disc 1112 passing through the other end 1100*c* of the disc inserting and discharging portion 1100 in the transverse direction is inserted in the disc inserting and discharging portion 1100 and is not detected by the push switch 1110*c* when it is to be first detected by the push switch 1110*d* as shown in FIG. 35.

As described above, moreover, the shaft portion 1104*a* of the lever member 1104, and the lever member 1109 and the push switch 1110*d* are provided in such positions that the first disc 1111 and the 12 cm disc adaptor 1113 are inserted in the disc inserting and discharging portion 1100 and are detected by the push switch 1105*a* when they are to be first detected by the push switch 1110*d* as shown in FIGS. 39 and 40, and the second disc 1112 passing through the end 1100*a* of the disc inserting and discharging portion 1100 in the transverse direction and the second disc 1112 passing through the central portion 1100*b* of the disc inserting and discharging portion 1100 in the transverse direction are not detected by the push switch 1110*d* as shown in FIGS. 32 and 34, and the second disc 1112 passing through the other end 1100*c* of the disc inserting and discharging portion 1100 in the transverse direction is inserted in the disc inserting and discharging portion 1100 and is not detected by the push switch 1105*a* when it is to be first detected by the push switch 1110*d* as shown in FIG. 35.

Since the outputs of the push switch 1110*c* and the push switch 1105*a* are Lo when the output of the push switch 1110*d* becomes Hi, accordingly, the control device which is not shown identifies that the second disc 1112 passing through the other end 1100*c* of the disc inserting and discharging portion 1100 in the transverse direction is inserted into the disc inserting and discharging portion 1100, causes the roller member 1103 to stop the auto-loading of the second disc 112, and furthermore, reverses the rotating direction of the driving source, thereby starting the auto-ejection of the second disc 1112.

When the auto-ejection of the second disc 1112 is started and the second disc 1112 is delivered, the output of the push switch 1110*d* becomes Lo because the lever member 1109 and the push switch 1110*d* are provided in such positions as to detect the second disc 1112 passing through the other end 1100*c* of the disc inserting and discharging portion 1100 in the transverse direction and not to then detect the second disc 1112 which is provided in contact with the roller member 1103 when the second disc 1112 is to be discharged from the disc inserting and discharging portion 1100 as described above.

Accordingly, the control device which is not shown receives the fact that the output of the push switch 1110*d* becomes Lo and stops the operation of the power source, thereby completing the auto-ejection of the second disc 1112.

As shown in FIG. 35, when the output of the push switch 1110*d* becomes Lo, the contact of the second disc 1112 with the roller member 1103 is not released. Consequently, the second disc 1112 can be prevented from being dropped from the disc device.

(5) An Operation for the Third Disc 1113 (12 cm Disc Adaptor)

Next, description will be given to the operation of the disc device for the 12 cm disc adaptor 1113.

Figure 45:
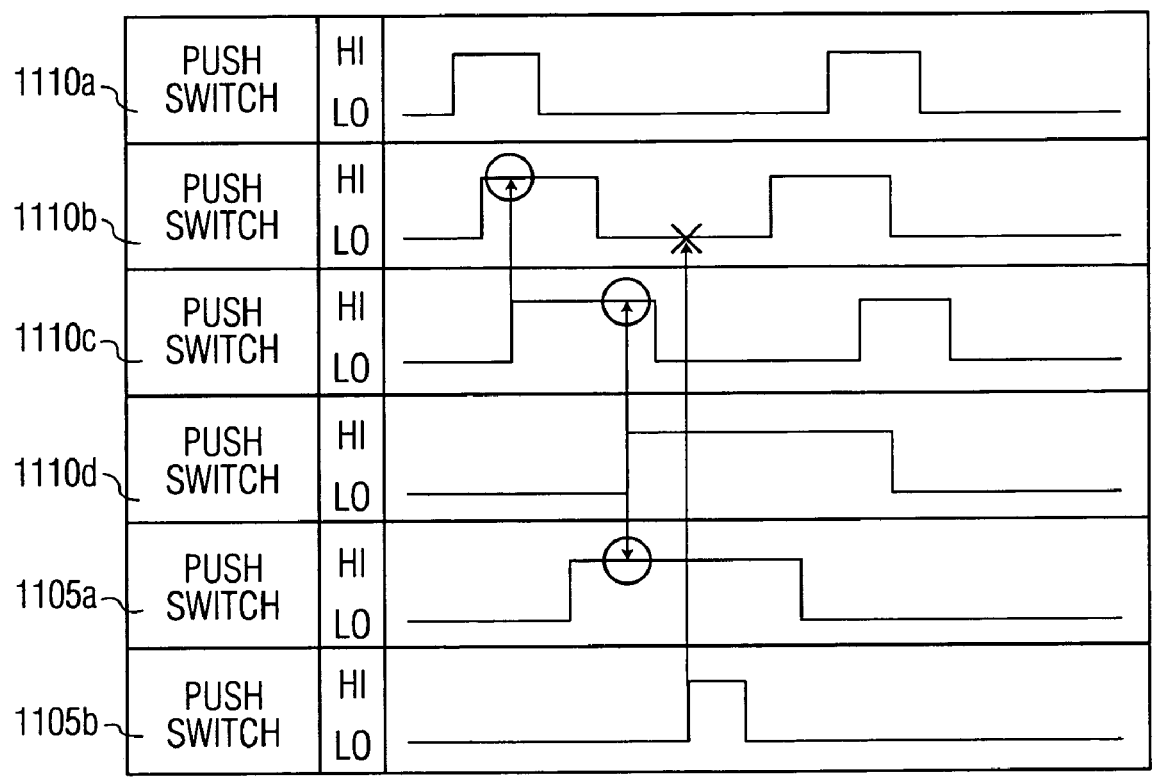
FIG. 45 is a timing chart showing the output of each detecting means of the disc device illustrated in FIG. 26 in the passage of the 12 cm disc adaptor through the disc inserting and discharging portion.

When the 12 cm disc adaptor 1113 is inserted in the disc inserting and discharging portion 1100 of the disc device by the user, the output of the push switch 1111*la* becomes Hi as shown in FIG. 45 because the lever member 1106 and the push switch 1110*a* are provided on the upstream side in the direction of the insertion of the disc from the roller member 1103 and in such positions as to detect the 12 cm disc adaptor 1113 inserted in the disc inserting and discharging portion 1100 before the 12 cm disc adaptor 1113 comes in contact with the roller member 1103 as described above.

When the 12 cm disc adaptor 1113 is inserted in the disc inserting and discharging portion 1100 by the user so that the output of the push switch 1110*a* becomes Hi, the disc device starts the operation of the power source to begin the rotation of the roller member 1103. When the 12 cm disc adaptor 1113 is further inserted by the user, the 12 cm disc adaptor 1113 and the roller member 1103 come in contact with each other. Consequently, the auto-loading of the 12 cm disc adaptor 1113 is started so that the 12 cm disc adaptor 1113 is delivered to a position shown in FIG. 37, and furthermore, the outputs of the push switches 1110*b* and 1105*c* become Hi in order as shown in FIG. 45.

As described above, the lever member 1107 and the push switch 1110*b*, and the lever member 1108 and the push switch 1110*c* are provided in such positions that the first disc 1111 and the 12 cm disc adaptor 1113 are inserted in the disc inserting and discharging portion 1100 and are detected by the push switch 1110*b* when they are to be first detected by the push switch 1110*c* as shown in FIGS. 36 and 37, and the second disc 1112 passing through the end 1100*a* of the disc inserting and discharging portion 1100 in the transverse direction is inserted in the disc inserting and discharging portion 1100 and is not detected by the push switch 1110*b* when it is to be first detected by the push switch 1110*c* as shown in FIG. 38.

Since the output of the push switch 1110*b* is Hi when the output of the push switch 1110*c* becomes Hi, accordingly, the control device which is not shown identifies that any of the first disc 1111, the second disc 1112 passing through the central portion 1100*b* of the disc inserting and discharging portion 1100 in the transverse direction and the 12 cm disc adaptor 1113 is inserted in the disc inserting and discharging portion 1100 and causes the roller member 1103 to continuously carry out the auto-loading of the 12 cm disc adaptor 1113.

When the 12 cm disc adaptor 1113 is further inserted by the roller member 1103, the outputs of the push switch 1105*a* and the push switch 1110*d* become Hi in order as shown in FIG. 45 while the 12 cm disc adaptor 1113 is delivered to a position shown in FIG. 40.

As described above, the shaft portion 1104a of the lever member 1104, and the lever member 1109 and the push switch 1110d are provided in such positions that the first disc 1111 and the 12 cm disc adaptor 1113 are inserted in the disc inserting and discharging portion 1100 and are detected by the push switch 1105a when they are to be first detected by the push switch 1110d as shown in FIGS. 39 and 40, and the second disc 1112 passing through the end 1100a of the disc inserting and discharging portion 1100 in the transverse direction and the second disc 1112 passing through the central portion 1100b of the disc inserting and discharging portion 1100 in the transverse direction are not detected by the push switch 1110d as shown in FIGS. 32 and 34, and the second disc 1112 passing through the other end 1100c of the disc inserting and discharging portion 1100 in the transverse direction is inserted in the disc inserting and discharging portion 1100 and is not detected by the push switch 1105a when it is to be first detected by the push switch 1110d as shown in FIG. 35.

Since the output of the push switch 1105a is Hi when the output of the push switch 1110d becomes Hi, accordingly, the control device which is not shown identifies that either the first disc 1111 or the 12 cm disc adaptor 1113 is inserted in the disc inserting and discharging portion 1100 and causes the roller member 1103 to continuously carry out the auto-loading of the 12 cm disc adaptor 1113.

As described above, moreover, the lever member 1109 and the push switch 1110d, and the lever member 1108 and the push switch 1110c are provided in such positions that the first disc 1111 and the 12 cm disc adaptor 1113 are inserted in the disc inserting and discharging portion 1100 and are detected by the push switch 1110c when they are to be first detected by the push switch 1110d as shown in FIGS. 39 and 40, and the second disc 1112 passing through the end 1100a of the disc inserting and discharging portion 1100 in the transverse direction and the second disc 1112 passing through the central portion 1100b of the disc inserting and discharging portion 1100 in the transverse direction are not detected by the push switch 1110d as shown in FIGS. 32 and 34, and the second disc 1112 passing through the other end 1100c of the disc inserting and discharging portion 1100 in the transverse direction is inserted in the disc inserting and discharging portion 1100 and is not detected by the push switch 1110c when it is to be first detected by the push switch 1110d as shown in FIG. 35.

Since the output of the push switch 1110c is Hi when the output of the push switch 1110d becomes Hi, accordingly, the control device which is not shown can also decide that a disc other than the second disc 1112 passing through the other end 1100c of the disc inserting and discharging portion 1100 in the transverse direction is inserted in the disc inserting and discharging portion 1100.

When the 12 cm disc adaptor 1113 is further inserted by the roller member 1103, the output of the push switch 1105b becomes Hi as shown in FIG. 45 while the 12 cm disc adaptor 1113 is delivered to the position shown in FIG. 33. When the output of the push switch 1105b becomes Hi, a hollow hole 1113a formed in the central part of the 12 cm disc adaptor 1113 passes through the position of the roller member 1107a of the lever member 1107 so that the lever member 1107 is brought into an identical state to a state in which the disc is not inserted in the disc device. Therefore, the output of the push switch 1110b becomes Lo.

As described above, the lever member 1107 and the push switch 1110b are provided in such positions as not to detect the second disc 1112 passing through the end 1100a of the disc inserting and discharging portion 1100 in the transverse direction when the second disc 1112 is to be detected by the push switch 1105b as shown in FIG. 32, and not to detect the 12 cm disc adaptor 1113 when the 12 cm disc adaptor 1113 is to be detected by the push switch 1105b as shown in FIG. 33.

Accordingly, the output of the push switch 1105a is Hi when the output of the push switch 1110d becomes Hi, and the output of the push switch 1110b is Lo when the output of the push switch 1105b becomes Hi. Therefore, the control device which is not shown identifies that the 12 cm disc adaptor 1113 is inserted into the disc inserting and discharging portion 1100, causes the roller member 1103 to stop the auto-loading of the 12 cm disc adaptor 1113, and furthermore, reverses the rotating direction of the driving source, thereby starting the auto-ejection of the 12 cm disc adaptor 1113.

When the auto-ejection of the 12 cm disc adaptor 1113 is started and the 12 cm disc adaptor 1113 is delivered to the position shown in FIG. 37, the output of the push switch 1110c becomes Lo because the lever member 1108 and the push switch 1110c are provided in such positions as to detect the 12 cm disc adaptor 1113 and not to then detect the 12 cm disc adaptor 1113 which is provided in contact with the roller member 1103 when the 12 cm disc adaptor 1113 is to be discharged from the disc inserting and discharging portion 1100 as described above.

Accordingly, the control device which is not shown receives the fact that the output of the push switch 1110c becomes Lo and stops the operation of the power source, thereby completing the auto-ejection of the 12 cm disc adaptor 1113.

As shown in FIG. 37, when the output of the push switch 1110c becomes Lo, the contact of the 12 cm disc adaptor 1113 with the roller member 1103 is not released. Consequently, the 12 cm disc adaptor 1113 can be prevented from being dropped from the disc device.

As described above with reference to FIGS. 26, 27 and 28, the disc device has the projections 1102a and 1102b provided in the disc inserting and discharging portion 1100 and the projection 1101a provided on the base 1101. Therefore, a plurality of discs can be hindered from being inserted to an inside by one inserting operation and failures can be prevented.

In the disc device, if the control device which is not shown has such a structure that the roller member 1103 is caused to discharge the disc after a constant time passes since the start of the insertion of the disc by the roller member 1103, a plurality of discs can also be discharged to an outside when they are inserted into the inner part by one inserting operation.

In the case in which the push switch 1105b is to detect the disc plural times when the disc is inserted in the roller member 1103, moreover, the control device which is not shown stops the inserting operation of the disc which is carried out by the roller member 1103.

More detailed description will be given. In the disc device, as shown in FIG. 46, when discs 1114 and 1115 having outside diameters of 12 cm such as the first disc 1111, the 12 cm disc adaptor 1113 holding the second disc 1112 in a central part, and the 12 cm disc adaptor 1113 are inserted into the inner part by the roller member 1103, the output of the push switch 1105b is changed from Lo to Hi and is changed from Hi to Lo by the disc 1114 and is changed from Lo to Hi and is changed from Hi to Lo again by the disc 1115 while the output of the push switch 1105a is Hi as shown in FIG. 47.

Figure 46:
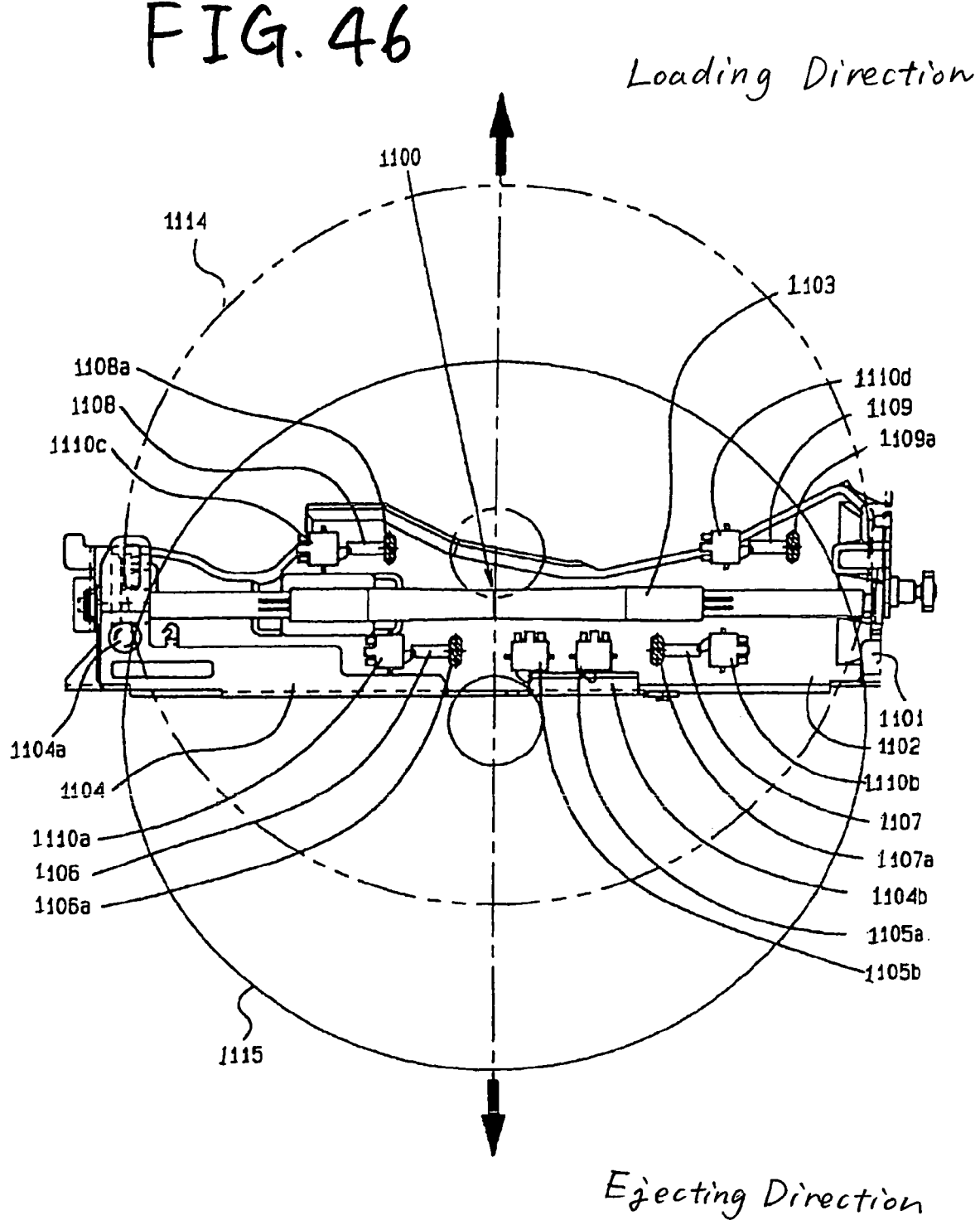
FIG. 46 is a top view showing the main part of the disc device illustrated in FIG. 26 in the passage of two first discs through the disc inserting and discharging portion.
Figure 48:
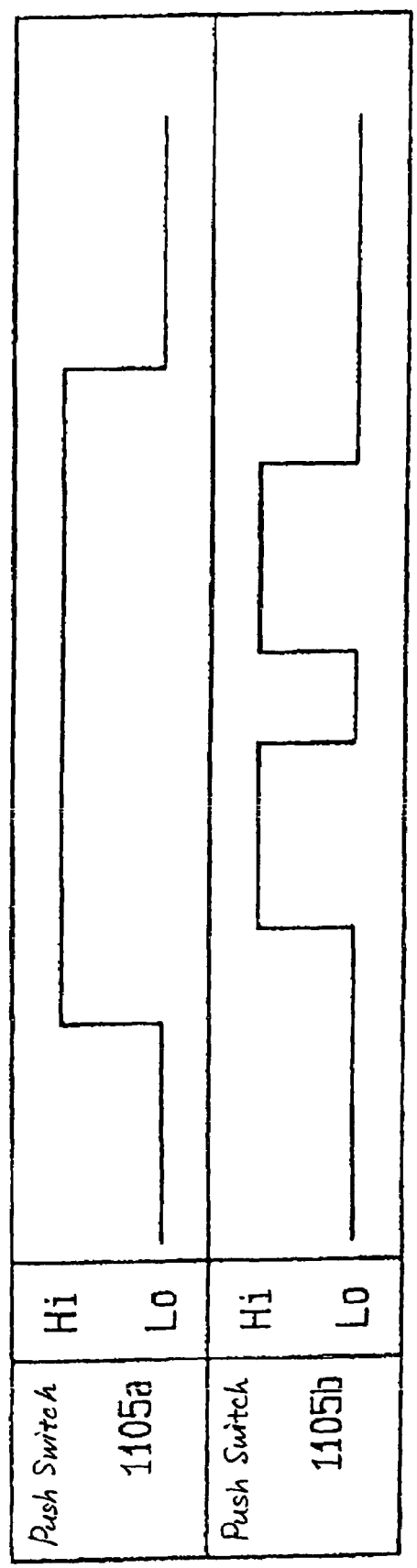
FIG. 48 is a timing chart showing the output of each detecting means of the disc device illustrated in FIG. 26 in the passage of one first disc through the disc inserting and discharging portion.
Figure 49:
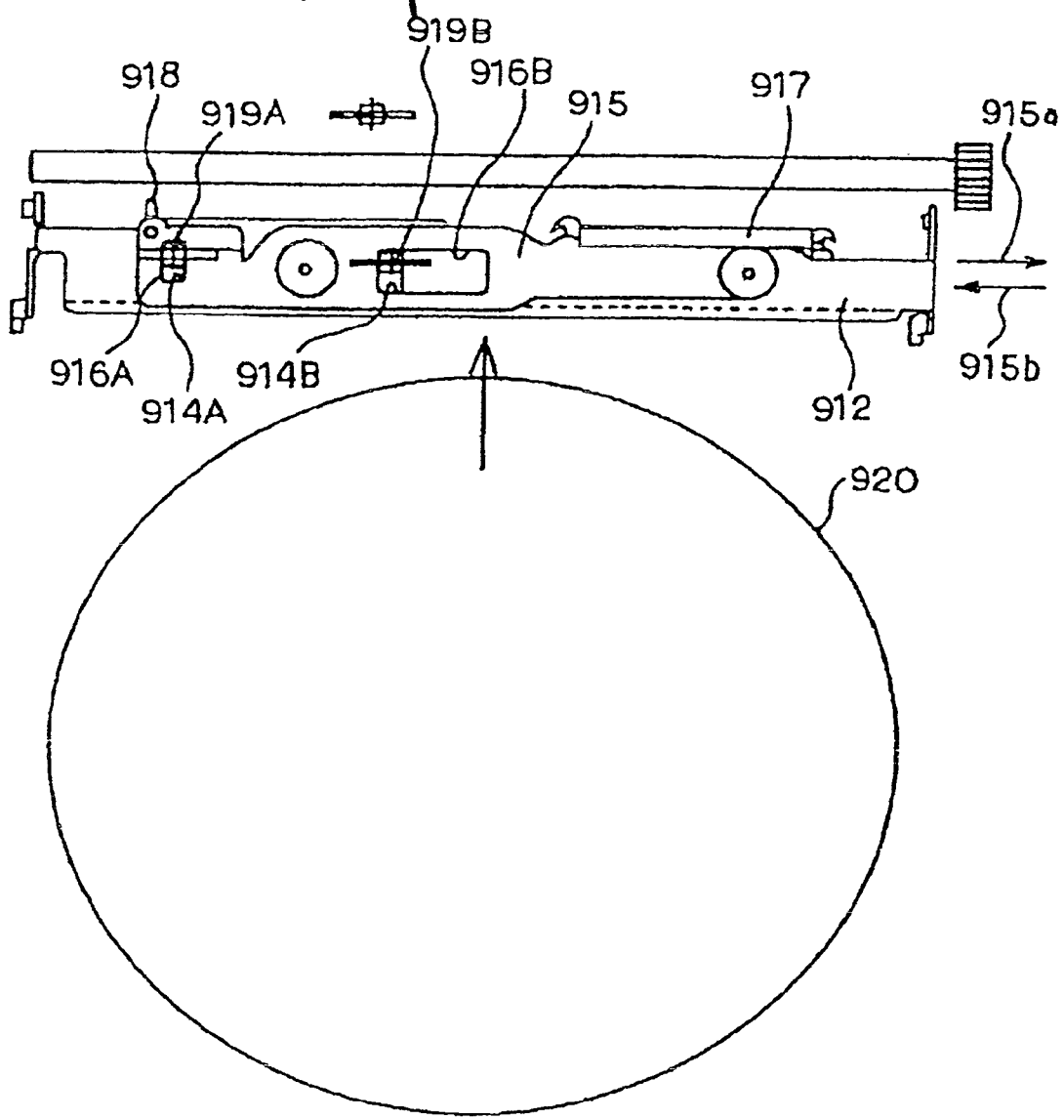
FIG. 49 is a top view showing the main part of a conventional disc device before the insertion of the first disc.
Figure 50:
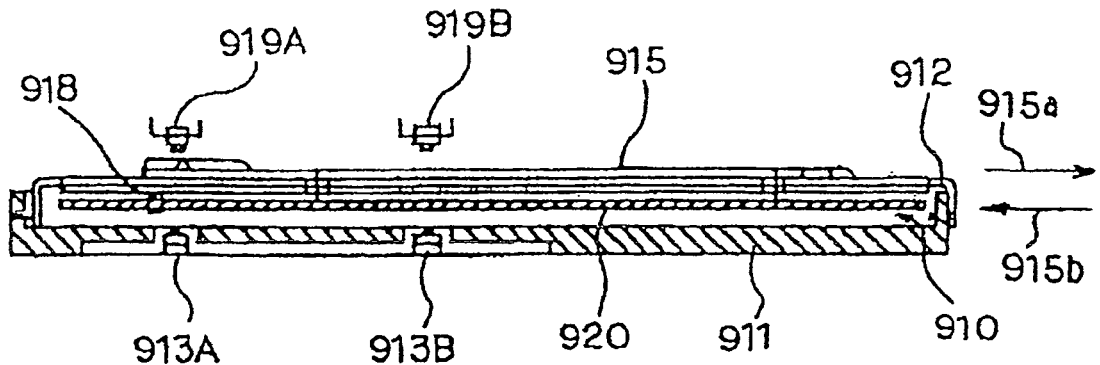
FIG. 50 is a front view showing the main part of the disc device illustrated in FIG. 49.
Figure 51:
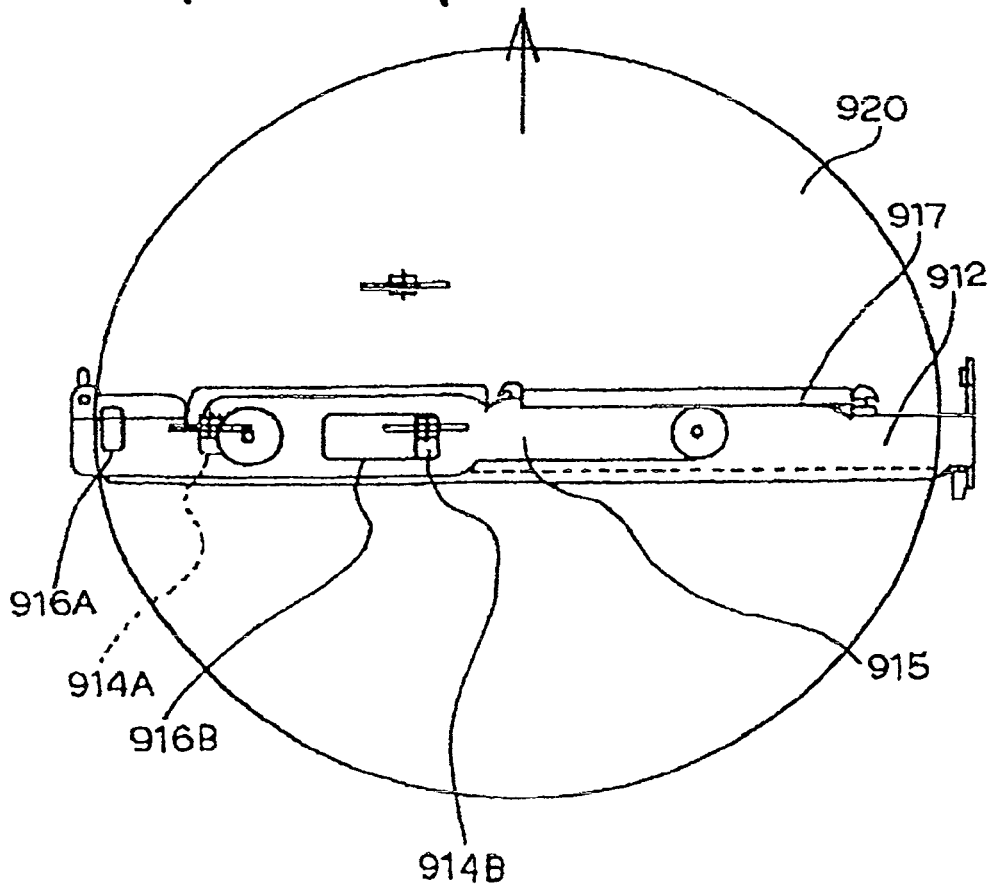
FIG. 51 is a top view showing the main part of the disc device illustrated in FIG. 49 in the passage of the first disc through a disc insertion port.
Figure 52:
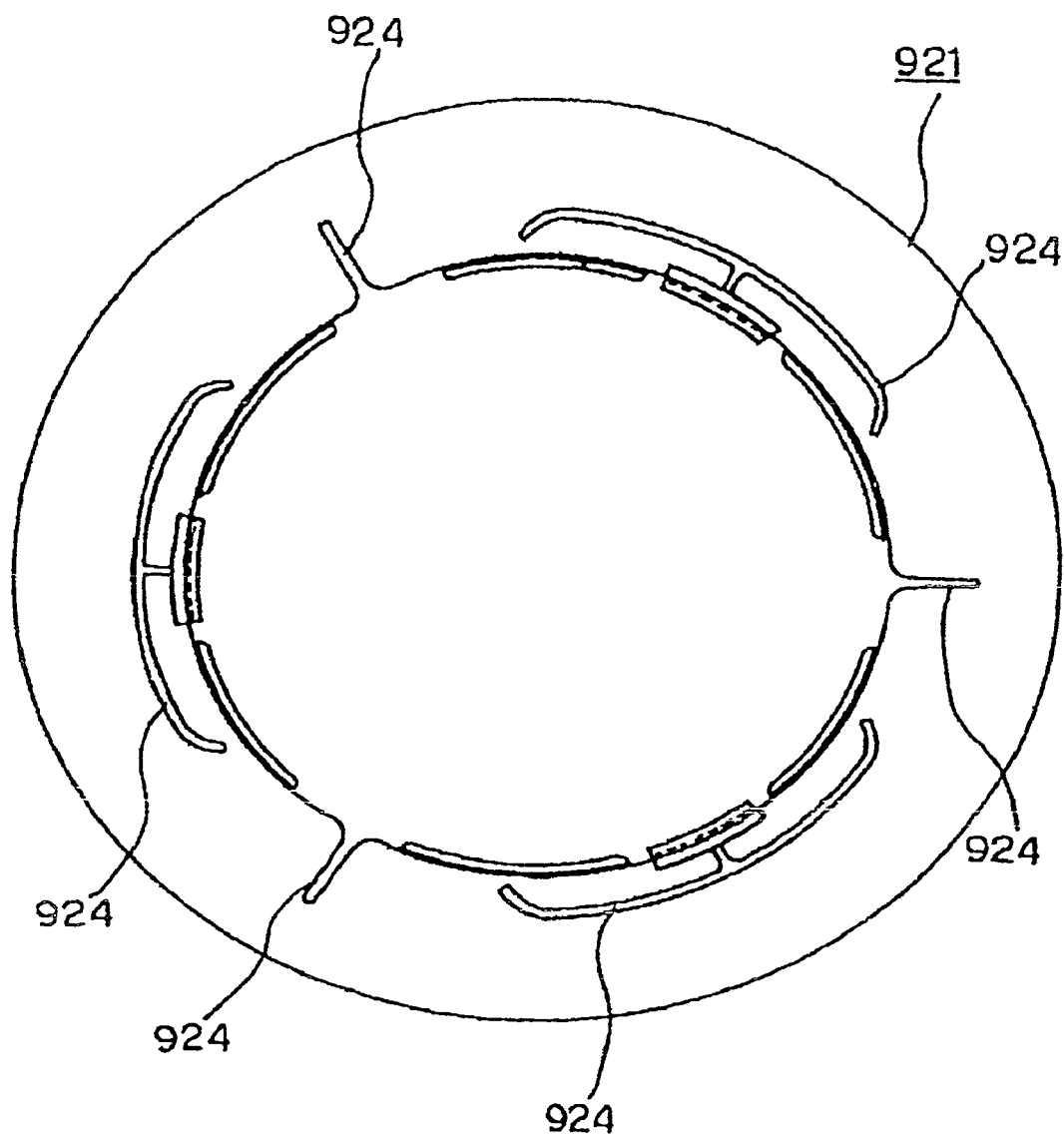
FIG. 52 is a top view showing the 12 cm disc adaptor.

On the other hand, in the case in which the disc device inserts only one disc having an outside diameter of 12 cm into the inner part by the roller member 1103, the state shown in FIG. 46 is not brought. Therefore, the output of the push switch 1105*b* is changed from Lo to Hi and is changed from Hi to Lo only once while the output of the push switch 1105*a* is Hi as shown in FIG. 48.

Figure 47:
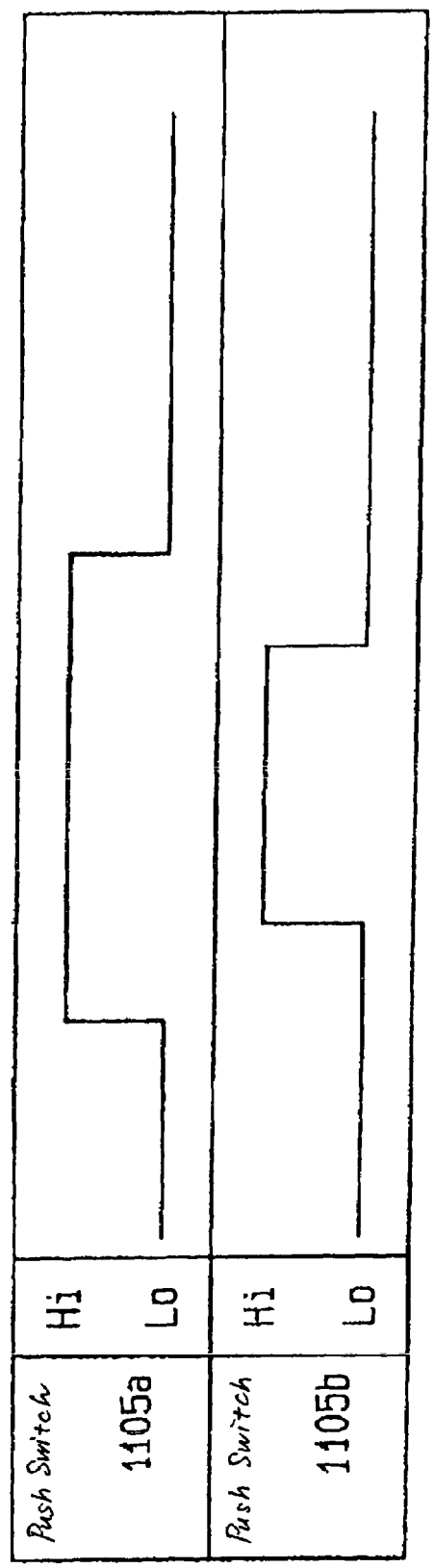
FIG. 47 is a timing chart showing the output of each detecting means of the disc device illustrated in FIG. 26 in the passage of two first discs through the disc inserting and discharging portion.

Accordingly, the disc device can decide that a plurality of discs is inserted into the inner part when the output of the push switch 1105*b* repeats the change from Lo to Hi and the change from Hi to Lo while the output of the push switch 1105*a* is Hi as shown in FIG. 47.

In the case in which a plurality of discs is inserted into the inner part by one inserting operation, the disc device stops the delivery of the disc. Consequently, a plurality of discs can be hindered from being inserted into the inner part by one inserting operation and failures can be prevented.

According to the invention, in the disc device, the control device which is not shown may have such a structure that the roller member 1103 is caused to discharge the disc 15 in the case in which the push switch 1105*b* is to detect the disc plural times when the disc is inserted in the roller member 1103. When a plurality of discs is inserted into the inner part by one inserting operation, the disc is discharged to the outside. Consequently, a plurality of discs can be hindered from being inserted into the inner part by one inserting operation and failures can be prevented.

As described above, the disc device according to the embodiment can stably identify the type of a disc and can insert, record and reproduce the disc irrespective of the light transmittance of the disc.

In the above description, the disc device has such a structure as to deliver the first disc 1111 and the 12 cm disc adaptor 1113 holding the second disc 1112 in the central part to the position in which the loading is to be completed and to forcibly discharge the 12 cm disc adaptor 1113 and the second disc 1112. According to the invention, it is also possible to execute such a structure as to deliver the first disc 111, the 12 cm disc adaptor 1113 holding the second disc 1112 in the central part and the second disc 1112 to the position in which the loading is to be completed and to forcibly discharge the 12 cm disc adaptor 1113.

Moreover, it is also possible to employ such a structure as to deliver at least one of the first disc 111, the 12 cm disc adaptor 1113 holding the second disc 1112 in the central part and the second disc 1112 passing through the end 1100*a*, the central portion 1100*b* and the other end 1100*c* of the disc inserting and discharging portion 1100 in the transverse direction to the position in which the loading is to be completed and to forcibly discharge the residual second discs 1112 passing through the end 1100*a*, the central portion 1100*b* and the other end 1100*c* of the disc inserting and discharging portion 1100 in the transverse direction and the 12 cm disc adaptor 1113.

In the disc device according to the embodiment, moreover, in the case in which the lever member 1107 and the push switch 1110*b* are to detect the disc when the push switch 1105*b* detects the disc, the disc is delivered to the position in which the loading is to be completed because the disc inserted in the disc inserting and discharging portion 1100 is either the first disc 1111 or the 12 cm disc adaptor 1113 holding the second disc 1112 in the central part. According to the invention, it is also possible to employ such a structure as to auto eject the disc in the case in which the lever member 1107 and the push switch 1110*b* do not detect the disc when the lever member 1104 and the push switch 1105*b* are to detect the disc.

In the disc device, the shaft portion 1104*a* of the lever member 1104, and the lever member 1107 and the push switch 1110*b* are provided on the upstream side in the direction of the insertion of the disc from the roller member 1103. Therefore, it is possible to decide to insert the disc into the inner part or discharge the disc to the outside before the disc is inserted by half or more to a downstream side in the direction of the insertion from the roller member 1103, thereby starting the insertion or discharge by the roller member 1103. Thus, an operation feeling can be enhanced.

In the embodiment, moreover, the lever member 1107 and the push switch 1110*b* are provided in such positions as not to detect the second disc 1112 passing through the end 1100*a* of the disc inserting and discharging portion 1100 in the transverse direction when the second disc 1112 is to be detected by the push switch 1105*b* as shown in FIG. 32. According to the invention, the lever member 1107 and the push switch 1110*b* may be provided in such positions as to detect the second disc 1112 passing through the end 1100*a* of the disc inserting and discharging portion 1100 in the transverse direction when the second disc 1112 is to be detected by the push switch 1105*b* in the case in which the disc device delivers the second disc 1112 passing through the end 1100*a* of the disc inserting and discharging portion 1100 in the transverse direction to the position in which the loading is to be completed, for example.

In the case in which the lever member 1107 and the push switch 1110*b* are provided in such positions as to is detect the second disc 1112 passing through the end 1100*a* of the disc inserting and discharging portion 1100 in the transverse direction when the second disc 1112 is to be detected by the push switch 1105*b*, the disc device can identify the first disc 111, the second disc 1112 passing through the end 1100*a* of the disc inserting and discharging portion 1100 in the transverse direction, and the 12 cm disc adaptor 1113 holding the second disc 1112 in the central part and can insert them to the position in which the loading is to be completed by the fact that the lever member 1107 and the push switch 1110*b* detect the disc when the push switch 1105*b* is to detect the disc.

In the embodiment, moreover, the lever member 1107 and the push switch 1110*b*, and the lever member 1108 and the push switch 1110*c* are provided in such positions that the first disc 1111 and the 12 cm disc adaptor 1113 are inserted in the disc inserting and discharging portion 1100 and are detected by the push switch 1110*b* when they are to be first detected by the push switch 1110*c* as shown in FIGS. 36 and 37, and the second disc 1112 passing through the end 1100*a* of the disc inserting and discharging portion 1100 in the transverse direction is inserted in the disc inserting and discharging portion 1100 and is not detected by the push switch 1110*b* when it is to be first detected by the push switch 1110*c* as shown in FIG. 38. Consequently, the control device can identify the second disc 1112 passing through the end 1100*a* of the disc inserting and discharging portion 1100 in the transverse direction.

According to the invention, however, even if the lever member 1107 and the push switch 1110*b*, and the lever member 1108 and the push switch 1110*c* are provided in such positions that the first disc 1111 and the 12 cm disc adaptor 1113 are inserted in the disc inserting and discharging portion 1100 and are detected by the push switch 1110*b* when they are to be first detected by the push switch 1110*c*, and the second disc 1112 passing through the end 1100*a* of the disc inserting and discharging portion 1100 in the transverse direction is inserted in the disc inserting and discharging portion 1100 and is not detected by the push switch 1110*b* when it is to be first detected by the push switch 1110*c*, the control device which is not shown can identify the second disc 1112 passing through the end 1100*a* of the disc inserting and discharging portion 1100 in the transverse direction, which is not shown.

In the embodiment, moreover, the lever member 1109 and the push switch 1110*d*, and the lever member 1108 and the push switch 1110*c* are provided in such positions that the first disc 1111 and the 12 cm disc adaptor 1113 are inserted in the disc inserting and discharging portion 1100 and are detected by the push switch 1110*c* when they are to be first detected by the push switch 1110*d* as shown in FIGS. 39 and 40, and the second disc 1112 passing through the end 1100*a* of the disc inserting and discharging portion 1100 in the transverse direction and the second disc 1112 passing through the central portion 1100*b* of the disc inserting and discharging portion 1100 in the transverse direction are not detected by the push switch 1110*d* as shown in FIGS. 32 and 34, and the second disc 1112 passing through the other end 1100*c* of the disc inserting and discharging portion 1100 in the transverse direction is inserted in the disc inserting and discharging portion 1100 and is not detected by the push switch 1110*c* when it is to be first detected by the push switch 1110*d* as shown in FIG. 35. Therefore, the control device which is not shown can identify the second disc 1112 passing through the other end 1100*c* of the disc inserting and discharging portion 1100 in the transverse direction.

According to the invention, however, even if the lever member 1109 and the push switch 1110*d*, and the lever member 1108 and the push switch 1110*c* are provided in such positions that the first disc 1111 and the 12 cm disc adaptor 1113 are inserted in the disc inserting and discharging portion 1100 and are detected by the push switch 1110*c* when they are to be first detected by the push switch 1110*d*, and at least one of the second disc 1112 passing through the end 1100*a* of the disc inserting and discharging portion 1100 in the transverse direction and the second disc 1112 passing through the central portion is 1100*b* of the disc inserting and discharging portion 1100 in the transverse direction is inserted in the disc inserting and discharging portion 1100 and is detected by the push switch 1110*c* when it is to be first detected by the push switch 1110*d*, and the others are not detected by the push switch 1110*d*, and the second disc 1112 passing through the other end 1100*c* of the disc inserting and discharging portion 1100 in the transverse direction is inserted in the disc inserting and discharging portion 1100 and is not detected by the push switch 1110*c* when it is to be first detected by the push switch 1110*d*, the control device which is not shown can identify the second disc 1112 passing through the other end 1100*c* of the disc inserting and discharging portion 1100 in the transverse direction, which is not shown.

According to the embodiment, moreover, even if the lever member 1109 and the push switch 1110*d*, and the lever member 1108 and the push switch 1110*c* are provided in such positions that the first disc 1111 and the 12 cm disc adaptor 1113 are inserted in the disc inserting and discharging portion 1100 and are detected by the push switch 1110*c* when they are to be first detected by the push switch 1110*d*, and the second disc 1112 passing through the end 1100*a* of the disc inserting and discharging portion 1100 in the transverse direction and the second disc 1112 passing through the central portion 1100*b* of the disc inserting and discharging portion 1100 in the transverse direction are inserted in the disc inserting and discharging portion 1100 and are detected by the push switch 1110*c* when they are to be first detected by the push switch 1110*d*, and the second disc 1112 passing through the other end 1100*c* of the disc inserting and discharging portion 1100 in the transverse direction is inserted in the disc inserting and discharging portion 1100 and is not detected by the push switch 1110*c* when it is to be first detected by the push switch 1110*d*, the control device which is not shown can identify the second disc 1112 passing through the other end 1100*c* of the disc inserting and discharging portion 1100 in the transverse direction, which is not shown.

In the embodiment, furthermore, the shaft portion 1104*a* of the lever member 1104, and the lever member 1109 and the push switch 1110*d* are provided in such positions that the first disc 1111 and the 12 cm disc adaptor 1113 are inserted in the disc inserting and discharging portion 1100 and are detected by the push switch 1105*a* when they are to be first detected by the push switch 1110*d* as shown in FIGS. 39 and 40, and the second disc 1112 passing through the end 1100*a* of the disc inserting and discharging portion 1100 in the transverse direction and the second disc 1112 passing through the central portion 1100*b* of the disc inserting and discharging portion 1100 in the transverse direction are not detected by the push switch 1110*d* as shown in FIGS. 32 and 34, and the second disc 1112 passing through the other end 1100*c* of the disc inserting and discharging portion 1100 in the transverse direction is inserted in the disc inserting and discharging portion 1100 and is not detected by the push switch 1105*a* when it is to be first detected by the push switch 1110*d* as shown in FIG. 35. Consequently, the control device can identify the second disc 1112 passing through the other end 1100*c* of the disc inserting and discharging portion 1100 in the transverse direction.

According to the invention, however, even if the shaft portion 1104*a* of the lever member 1104 and the push switch 1110*d* are provided in such positions that the first disc 1111 and the 12 cm disc adaptor 1113 are inserted in the disc inserting and discharging portion 1100 and are detected by the push switch 1105*a* when they are to be first detected by the push switch 1110*d*, and at least one of the second disc 1112 passing through the end 1100*a* of the disc inserting and discharging portion 1100 in the transverse direction and the second disc 1112 passing through the central portion 1100*b* of the disc inserting and discharging portion 1100 in the transverse direction is inserted in the disc inserting and discharging portion 1100 and is detected by the push switch 1105*a* when it is to be first detected by the push switch 1110*d*, and the others are not detected by the push switch 1110*d*, and the second disc 1112 passing through the other end 1100*c* of the disc inserting and discharging portion 1100 in the transverse direction is inserted in the disc inserting and discharging portion 1100 and is not detected by the push switch 1105*a* when it is to be first detected by the push switch 1110*d*, the control device which is not shown can identify the second disc 1112 passing through the other end 1100*c* of the disc inserting and discharging portion 1100 in the transverse direction, which is not shown.

According to the embodiment, moreover, even if the shaft portion 1104*a* of the lever member 1104, and the lever member 1109 and the push switch 1110*d* are provided in such positions that the first disc 1111 and the 12 cm disc adaptor 1113 are inserted in the disc inserting and discharging portion 1100 and are detected by the push switch 1105*a* when they are to be first detected by the push switch 1110*d*, and the second disc 1112 passing through the end 1100*a* of the disc inserting and discharging portion 1100 in the transverse direction and the second disc 1112 passing through the central portion 1100*b* of the disc inserting and discharging portion 1100 in the transverse direction are inserted in the disc inserting and discharging portion 1100 and are detected by the push switch 1105*a* when they are to be first detected by the push switch 1110*d*, and the second disc 1112 passing through the other end 1100*c* of the disc inserting and discharging portion 1100 in the transverse direction is inserted in the disc inserting and discharging portion 1100 and is not detected by the push switch 1105*a* when it is to be first detected by the push switch 1110*d*, the control device which is not shown can identify the second disc 1112 passing through the other end 1100c of the disc inserting and discharging portion 1100 in the transverse direction.

In the embodiment, moreover, the lever member 1107 and the push switch 1110b are provided in such positions as to detect the disc passing by the contact of the roller member 1107a provided on the lever member 1107 with a disc, not to detect the second disc 1112 passing through the end 1110a of the disc inserting and discharging portion 1100 in the transverse direction when the second disc 1112 is to be detected by the push switch 1105b as shown in FIG. 32, and not to detect the 12 cm disc adaptor 1113 when the 12 cm disc adaptor 1113 is to be detected by the push switch 1105b as shown in FIG. 33, and the shaft portion 1104a of the lever member 1104, and the lever member 1109 and the push switch 1110d are provided in such positions that the 12 cm disc adaptor 1113 is inserted in the disc inserting and discharging portion 1100 and is detected by the push switch 1105a when it is to be first detected by the push switch 1110d as shown in FIG. 40, and the second disc 1112 passing through the end 100a of the disc inserting and discharging portion 1100 in the transverse direction is not detected by the push switch 1110d as shown in FIG. 32. Consequently, the control device which is not shown can identify the 12 cm disc adaptor 1113.

According to the invention, however, even if the lever member 1107 and the push switch 1110b are provided in such positions as to detect the disc passing by the contact of the roller member 1107a provided on the lever member 1107 with a disc, not to detect the second disc 1112 passing through the end 1110a of the disc inserting and discharging portion 1100 in the transverse direction when the second disc 1112 is to be detected by the push switch 1105b as shown in FIG. 32, and not to detect the 12 cm disc adaptor 1113 when the 12 cm disc adaptor 1113 is to be detected by the push switch 1105b as shown in FIG. 33, and the shaft portion 1104a of the lever member 1104 and the push switch 1110d are provided in such positions that the 12 cm disc adaptor 1113 is inserted in the disc inserting and discharging portion 1100 and is detected by the push switch 1105a when it is to be first detected by the push switch 1110d, and the second disc 1112 passing through the end 1100a of the disc inserting and discharging portion 1100 in the transverse direction is inserted in the disc inserting and discharging portion 1100 and is not detected by the push switch 1105a when it is to be first detected by the push switch 1110d, which is not shown, the control device which is not shown can identify the 12 cm disc adaptor 1113.

In the embodiment, moreover, the control device which is not shown identifies the second disc 1112 passing through the other end 1100c of the disc inserting and discharging portion 1100 in the transverse direction to control the insertion and discharge based on both the result of the detection of the push switch 1110c which is obtained when the push switch 1110d first detects the disc inserted in the disc inserting and discharging portion 1100 and the result of the detection of the lever member 1104 and the push switch 1105a which is obtained when the push switch 1110d first detects the disc inserted in the disc inserting and discharging portion 1100 as shown in FIG. 35. According to the invention, however, it is also possible to identify the second disc 1112 passing through the other end 1100c of the disc inserting and discharging portion 1100 in the transverse direction, thereby controlling the insertion and discharge based on only either of them.

In the embodiment, furthermore, in the disc device, the lever member 1106 and the push switch 1110a are provided on the upstream side in the direction of the insertion of the disc from the roller member 1103 and in such positions as to detect the first disc 1111 (see FIG. 31) inserted in the disc inserting and discharging portion 1100, the second disc 1112 (see FIG. 32) passing through the end 1100a of the disc inserting and discharging portion 1100 in the transverse direction and the second disc 1112 (see FIG. 34) passing through the central portion 1100b of the disc inserting and discharging portion 1100 in the transverse direction before the first disc 1111 (see FIG. 31), the second disc 1112 (see FIG. 32) passing through the end 1100a of the disc inserting and discharging portion 1100 in the transverse direction and the second disc 1112 (see FIG. 34) passing through the central portion 1100b of the disc inserting and discharging portion 1100 in the transverse direction come in contact with the roller member 1103. Therefore, the roller member 1103 is driven before the first disc 1111 (see FIG. 31), the second disc 1112 (see FIG. 32) passing through the end 1100a of the disc inserting and discharging portion 1100 in the transverse direction, the 12 cm disc adaptor 1113 (see FIG. 33) having an outside diameter which is almost equal to that of the first disc 1111 or the second disc 1112 (see FIG. 34) passing through the central portion 1100b of the disc inserting and discharging portion 1100 in the transverse direction comes in contact with the roller member 1103, and when the first disc 1111 (see FIG. 31), the second disc 1112 (see FIG. 32) passing through the end 1100a of the disc inserting and discharging portion 1100 in the transverse direction, the 12 cm disc adaptor 1113 (see FIG. 33) or the second disc 1112 (see FIG. 34) passing through the central portion 1100b of the disc inserting and discharging portion 1100 in the transverse direction is manually inserted up to the roller member 1103 and comes in contact with the roller member 1103, the first disc 1111 (see FIG. 31), the second disc 1112 (see FIG. 32) passing through the end 1100a of the disc inserting and discharging portion 1100 in the transverse direction, the 12 cm disc adaptor 1113 (see FIG. 33) or the second disc 1112 (see FIG. 34) passing through the central portion 1100b of the disc inserting and discharging portion 1100 in the transverse direction can be started to be inserted by the roller member 1103. Thus, an operation feeling can be enhanced.

According to the invention, however, although the lever member 1106 and the push switch 1110a are simply provided on the upstream side in the direction of the insertion of the disc from the roller member 1103, the disc device can start to insert the disc by the roller member 1103 before the disc to be detected by the push switch 1110a is manually inserted by half or more at the downstream side in the direction of the insertion from the roller member 1103 while coming in contact with the roller member 1103. Thus, the operation feeling can be enhanced.

In the embodiment, moreover, in the disc device, the lever member 1107 and the push switch 1110b are provided on the upstream side in the direction of the insertion of the disc from the roller member 1103 and in such positions as to detect the second disc 1112 inserted in the disc inserting and discharging portion 1100 and passing through the other end 1100c of the disc inserting and discharging portion 1100 in the transverse direction before the second disc 1112 comes in contact with the roller member 1103. Therefore, the roller member 1103 is driven before the second disc 1112 passing through the other end 1100c of the disc inserting and discharging portion 1100 in the transverse direction comes in contact with the roller member 1103, and the second disc 1112 can be started to be inserted by the roller member 1103 when the second disc 1112 is manually inserted up to the roller member 1103 and comes in contact with the roller member 1103. Thus, the operation feeling can be enhanced.

According to the invention, however, although the lever member 1107 and the push switch 1110b are simply provided on the upstream side in the direction of the insertion of the disc from the roller member 1103, the disc can be started to be inserted by the roller member 1103 before the disc to be detected by the push switch 1110*b* is manually inserted by half or more at the downstream side in the direction of the insertion from the roller member 1103 while coming in contact with the roller member 1103. Thus, the operation feeling can be enhanced.

In the embodiment, moreover, in the disc device, the shaft portion 1104*a* of the lever member 1104 is provided on the upstream side in the direction of the insertion of the disc from the roller member 1103. Before the disc to be detected by the push switch 1105*a* is manually inserted by half or more at the downstream side in the direction of the insertion from the roller member 1103 while coming in contact with the roller member 1103, the disc can be started to be inserted by the roller member 1103. Thus, the operation feeling can be enhanced.

In the embodiment, furthermore, in the disc device, the shaft portion 1104*a* of the lever member 1104 is provided on the upstream side in the direction of the insertion of the disc from the roller member 1103. Before the disc to be detected by the lever member 1104 and the push switch 1105*a* is manually inserted by half or more at the downstream side in the direction of the insertion from the roller member 1103 while coming in contact with the roller member 1103, therefore, the disc can be started to be inserted by the roller member 1103. Thus, the operation feeling can be enhanced.

In the disc device, moreover, the roller member 1103 is provided in such a position that the identification of the disc by the control device is ended before the contact with the disc in the insertion is released. While the disc is provided in contact with the roller member 1103, therefore, it is possible to decide whether the disc is to be inserted into the inner part or discharged to the outside, thereby carrying out the insertion or discharge through the roller member 1103. Thus, the disc to be discharged can be prevented from being inserted erroneously.

While the first disc and the second disc are set to be the first disc and the second disc respectively in the embodiment, the outside diameters of the first disc and the second disc do not need to be 12 cm and 8 cm in the invention.

In the embodiment, moreover, the description has been given to the example in which the fifth detecting means and the first detecting means are constituted by the lever member 1104 and the push switches 1105*a* and 1105*b*. According to the invention, if the disc passing through the disc inserting and discharging portion 1100 can be detected by the contact, the fifth detecting means and the first detecting means may have such a structure as to utilize neither the lever member 1104 nor the push switches 1105*a* and 1105*b*, for example, to directly carry out a detection by the push switch without using the lever member 1104, to utilize a photointerruptor, to utilize a photo LED (a light emitting diode) and a phototransistor, or to use a linear position sensor.

In the embodiment, moreover, the description has been given to the example in which the thickness detecting means is constituted by the lever members 1106, 1107, 1108 and 1109 and the push switches 1110*a*, 1110*b*, 1110*c* and 1110*d*. According to the invention, it is also possible to employ any structure capable of detecting a disc passing through the disc inserting and discharging portion 1100 by a contact in which the thickness detecting means utilizes members other than the lever members 1106, 1107, 1108 and 1109 and the push switches 1110*a*, 1110*b*, 1110*c* and 1110*d*, for example, utilizes a photointerruptor, utilizes a photo LED and a phototransistor or uses a linear position sensor.

In the embodiment, furthermore, the fifth detecting means, the first detecting means, the tenth detecting means, the seventh detecting means, the eighth detecting means and the members to be the respective components of the eighth detecting means (for example, the fifth detecting means indicate the lever member 1104 and the push switch 1105*a* and the first detecting means indicate the lever member 1104 and the push switch 1105*b*) are provided on the same plane in the housing of the disc device. As compared with the case in which light detecting means constituted by a combination of a light emitting unit on one of sides in the direction of the thickness of the disc and a light receiving unit on the other side in the same direction as in the conventional art is used, therefore, it is not necessary to provide a unit and a board on both sides in the direction of the thickness of the disc. Correspondingly, the thickness of the device can be reduced.

(Advantage of the Invention)

As described in above, according to the first embodiment, it is possible to provide a disc identifying device for identifying a 12 cm disc having a small data area (fourth disc) in the same manner as an ordinary first disc, and a disc inserting and discharging apparatus comprising the disc identifying device and a disc drive apparatus.

Moreover, according to the second embodiment, the invention has such an advantage as to provide a disc identifying device comprising a disc inserting and discharging portion for inserting and discharging a disc including a first disc, a second disc having a smaller outside diameter than the outside diameter of the first disc, and a third disc having an outside diameter which is almost equal to the outside diameter of the first disc and provided with a hollow hole having a radius which is almost equal to the radius of the second disc in a central part, first detecting means for detecting the disc passing through one end of the disc inserting and discharging portion in a transverse direction by a contact of the disc, seventh detecting means for detecting the disc passing by a contact in the direction of the thickness of the disc, and identifying means for identifying the type of the disc based on a result of the detection of the seventh detecting means which is obtained when the first detecting means is to detect the disc, in which the seventh detecting means is provided in such a position as not to detect the third disc when the first detecting means detects the third disc, thereby stably identifying whether the disc inserted in the disc inserting and discharging portion is either the first disc or the third disc irrespective of the light transmittance of the disc when the disc inserted in the disc inserting and discharging portion is either the first disc or the third disc, a disc inserting and discharging apparatus comprising the disc identifying device, and a disc device, and the disc identifying device, the disc inserting and discharging apparatus and the disc device according to the invention are useful for a disc identifying device for identifying the type of a disc and a disc drive apparatus.

What is claimed is:

1. A disc drive apparatus capable of loading and ejecting: a first disc which has a light shielding effect; a second disc whose outside diameter is smaller than that of the first disc and which has a light shielding effect; a third disc whose outside diameter is almost same as the first disc and which has a light shielding effect and a hollow hole whose outside diameter is almost same as the second disc in central; and a fourth disc whose outside diameter is almost same as the first disc, which has a small data area whose diameter is almost same as the second disc in central and has a light shielding effect, and whose rest area except the small data area is transparent; said apparatus comprising: a disc inserting and discharging portion having a width sufficient to receive the first disc along its outside diameter, the disc inserting and discharging portion allowing the second disc to be inserted and discharged anywhere along the width; a first detector for detecting a disc passing through one end of the disc inserting and discharging portion by physically contacting with the disc wherein the first detector comprises a mechanical switch; a second detector for detecting the disc passing by the light shielding of the disc; and a disc identifier for identifying type of the disc based on a detected result by the second detector when the first detector detects the disc, wherein said second detector is arranged on a position where said second detector is capable of detecting the fourth disc when the first detector detects the fourth disc, and where said second detector does not detect the third disc when the first detector detects the third disc, wherein, in the position where said second detector is arranged, said second detector does not detect the second disc when the first detector detects the second disc in response to the second disc being inserted anywhere along the width of the disc inserting and discharging portion.

2. The disc drive apparatus according to claim 1, further comprising:
    a third detector for detecting the disc passing by the light shielding of the disc,
    wherein, in the position where the second detector is arranged, the second detector is capable of detecting the third disc when the third detector first detects the first disc or the third disc, the second detector is also capable of detecting the fourth disc when the third detector detects the fourth disc, and the second detector does not detect the second disc when the third detector first detects the second disc passing through the one end of the disc inserting and discharging portion, and
    wherein said disc identifier identifies type of the disc based on a detected result of the second detector when the third detector first detects the disc inserted into the disc inserting and discharging portion.

3. The disc drive apparatus according to claim 1, further comprising:
    a third detector for detecting the disc passing by the light shielding of the disc; and
    a fourth detector for detecting the disc passing by the light shielding of the disc,
    wherein a width of said disc inserting and discharging portion is about same as the outer diameter of the first disc,
    wherein said third detector is arranged on a position where the third detector is capable of detecting the first disc and the third disc when the fourth detector first detects the first disc and the third disc, and where the third detector does not detect the second disc when the fourth detector first detects the second disc passing through the other end of the disc inserting and discharging portion, and
    wherein said disc identifier identifies type of the disc based on a detected result of the third detector when the fourth detector first detects the disc inserted into the disc inserting and discharging portion.

4. The disc drive apparatus according to claim 1, further comprising:
    a light detector for detecting the disc passing by the light shielding of the disc; and
    a physical detector for detecting the disc by physically contacting with the disc, wherein the physical detector comprises a mechanical switch,
    wherein a width of said disc inserting and discharging portion is about same as the outer diameter of the first disc,
    wherein said physical detector is arranged on a position where the physical detector is capable of detecting the first disc or the third disc when the light detector first detects the first disc or the third disc, and where the physical detector does not detect the second disc when the light detector first detects the second disc passing through the other end of the disc inserting and discharging portion, and
    wherein said disc identifier identifies type of the disc based on a detected result of the physical detector when the light detector first detects the disc inserted into the disc inserting and discharging portion.

5. The disc drive apparatus according to claim 1, further comprising:
    a light detector for detecting the disc passing by the light shielding of the disc;
    a physical detector for detecting the disc by physically contacting with the disc, wherein the physical detector comprises a mechanical switch; and
    another light detector for detecting the disc passing by the light shielding of the disc,
    wherein said other light detector is arranged on a position where the other light detector is capable of detecting the second disc passing through the disc inserting and discharging portion and undetected by the second detector,
    wherein, in any cases of:
        1) the first disc passes through the disc inserting and discharging portion;
        2) the fourth disc passes through the disc inserting and discharging portion;
        3) the second disc passes through the one end of the disc inserting and discharging portion;
        4) the second disc passes through the other end of the disc inserting and discharging portion; and
        5) the third disc passes through the disc inserting and discharging portion,
    said light detector and said physical detector are arranged on portions where any one of the light detector and the physical detector is capable of detecting the disc during the period from when any one of the other light detector and the second detector first detects the disc to when neither the other light detector nor the second detector detects the disc, and
    in a case of:
        6) the second disc passes through a central portion in width direction of the disc inserting and discharging portion,
    said light detector and said physical detector are arranged on portions where neither the light detector nor the physical detector detects the disc during the period from when any one of the other light detector and the second detector first detects the disc to when both the other light detector and the second detector do not detect the disc, and
    wherein said disc identifier identifies type of the disc based on both detected results of the light detector and the physical detector during the period from when any of the other light detector and the second detector first detects the disc to when both the other light detector and the second detector do not detect the disc.

6. The disc drive apparatus according to claim 1, further comprising:
    a disc transporting portion for loading and ejecting a disc in the disc inserting and discharging portion by transporting the disc; and a controller for controlling the loading and ejecting operation of the transporting portion based on an identified result of the disc identifier, wherein, in a case of that the first detector detects multiple discs inserted into the disc inserting and discharging portion, said controller controls the transporting portion to stop loading the disc.

7. The disc drive apparatus according to claim 1, further comprising:

a transporting portion for loading and ejecting a disc in the disc inserting and discharging portion by transporting the disc; and a controller for controlling the loading and ejecting operation of the disc transporting portion based on an identified result of the disc identifier, wherein, in a case of that the first detector detects multiple discs inserted into the disc inserting and discharging portion, said controller controls the transporting portion to eject the disc.

8. The disc drive apparatus according to claim 1, wherein said disc inserting and discharging portion has a regulating portion for regulating the plural discs passing in a direction of the thickness of the disc.

9. The disc drive apparatus according to claim 1, wherein said transporting portion has a limiting portion for limiting movement in the direction of the thickness of the disc passing through the disc inserting and discharging portion.

10. The disc drive apparatus according to the claim 4, further comprising:

a transporting portion for loading and ejecting disc in the disc inserting and discharging portion by transporting the disc;

a controller for controlling the loading and ejecting operation of the transporting portion based on an identified result of the disc identifier, wherein, in a case of that the physical detector multiple detects the disc inserted into the disc inserting and discharging portion, said controller controls the transporting portion to stop loading the disc.

11. The disc drive apparatus according to claim 4, further comprising:

a transporting portion for loading and ejecting a disc in the disc inserting and discharging portion by transporting the disc; and a controller for controlling the loading and ejecting operation of the disc transporting portion based on an identified result of the disc identifier, wherein, in a case of that the physical detector multiple detects the disc inserted into the disc inserting and discharging portion, said controller controls the transporting portion to eject the disc.

12. The disc drive apparatus according to claim 1, further comprising:

a transporting portion for loading and ejecting a disc in the disc inserting and discharging portion by transporting the disc; and a controller for controlling the loading and ejecting operation of the disc transporting portion based on an identified result of the disc identifier, wherein, in a case of that the disc loading operation is not completed within a predetermined period after insertion of the disc, said controller controls the transporting portion to eject the disc.

* * * * *